United States Patent
Sayad et al.

(10) Patent No.: US 12,248,440 B1
(45) Date of Patent: *Mar. 11, 2025

(54) DATA LEARNING AND ANALYTICS APPARATUSES, METHODS AND SYSTEMS

(71) Applicant: AdTheorent, Inc., New York, NY (US)

(72) Inventors: Saed Sayad, Toronto (CA); Anthony J. Iacovone, Huntington, NY (US)

(73) Assignee: ADTHEORENT, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,496

(22) Filed: Feb. 3, 2022

Related U.S. Application Data

(63) Continuation of application No. 13/797,903, filed on Mar. 12, 2013, now Pat. No. 11,288,240.

(51) Int. Cl.
   *G06F 16/21* (2019.01)
(52) U.S. Cl.
   CPC .................................. *G06F 16/211* (2019.01)
(58) Field of Classification Search
   CPC .. G06F 16/211; G06F 16/285; G06Q 30/0273
   See application file for complete search history.

(56) References Cited

U.S. PATENT DOCUMENTS

| | | | |
|---|---|---|---|
| 8,315,904 B2 | 11/2012 | Black | |
| 10,600,121 B1 | 3/2020 | Malamut | |
| 2001/0038347 A1 | 11/2001 | Avery | |
| 2004/0153430 A1* | 8/2004 | Sayad | G06F 16/285 |
| | | | 707/E17.005 |
| 2008/0114571 A1 | 5/2008 | Campbell | |
| 2008/0195664 A1 | 8/2008 | Maharajh | |
| 2010/0117837 A1 | 5/2010 | Stirling | |
| 2010/0217568 A1 | 8/2010 | Takeuchi | |
| 2011/0258049 A1* | 10/2011 | Ramer | G06Q 30/0273 |
| | | | 705/14.69 |

(Continued)

FOREIGN PATENT DOCUMENTS

| | | | | |
|---|---|---|---|---|
| WO | WO2004029828 | | 4/2004 | |
| WO | WO-2004029828 A2 * | | 4/2004 | G06F 17/30592 |

OTHER PUBLICATIONS

"Deep Symmetry Networks", Gens et al., NIPS 2014.

(Continued)

*Primary Examiner* — Brittany N Allen
*Assistant Examiner* — William P Bartlett
(74) *Attorney, Agent, or Firm* — Hanchuk Kheit LLP; Walter G. Hanchuk

(57) ABSTRACT

The DATA LEARNING AND ANALYTICS APPARATUSES, METHODS AND SYSTEMS ("DLA") provides a data learning platform that analyzes and incorporates data knowledge from new data event updates (e.g., in a real-time stream, in a batch, etc.). In one implementation, the DLA provides a real-time data mining mechanism that accommodates an ever increasing data load instantaneously with reduced complexity, e.g., without re-building the data analytical model in its entirety whenever new data is received. In this way, the DLA provides an incremental learning mechanism for data analytics and thus the latency for real-time data assessment is reduced and the data processing efficiency is improved.

20 Claims, 32 Drawing Sheets

Example CTR Model Building

(56) References Cited

U.S. PATENT DOCUMENTS

| | | |
|---|---|---|
| 2012/0116687 A1 | 5/2012 | Kanderian |
| 2012/0323551 A1 | 12/2012 | Beyer |
| 2012/0323674 A1 | 12/2012 | Simmons |
| 2015/0006081 A1 | 1/2015 | Versteeg |
| 2015/0206055 A1 | 7/2015 | Sengupta |
| 2016/0260109 A1 | 9/2016 | Feng |
| 2020/0090073 A1 | 3/2020 | Zhan |

OTHER PUBLICATIONS

Saeidi et al., "A search-based approach to multi-view clustering of software system", 2015.
Hagenau et al., "Autimated news reading: stock proce prediction based on financial news using context- capturing features", 2012.
Zbikowski et al., "Application of machine learning algorithms for bitcoin automated trading", 2015.
"Real Time Mining", Saed Sayad, 2011, SelfHelp Publishers.

\* cited by examiner

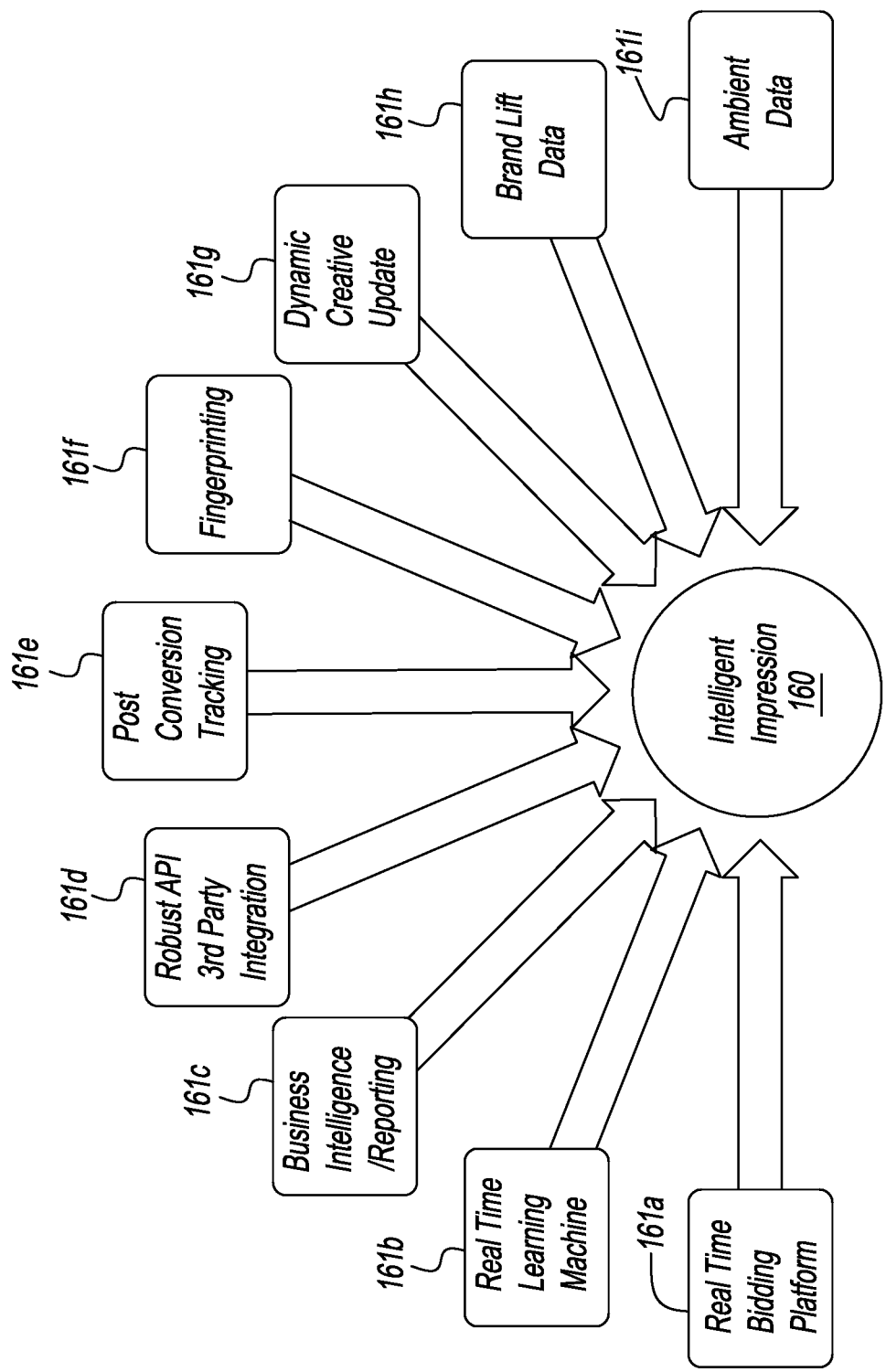

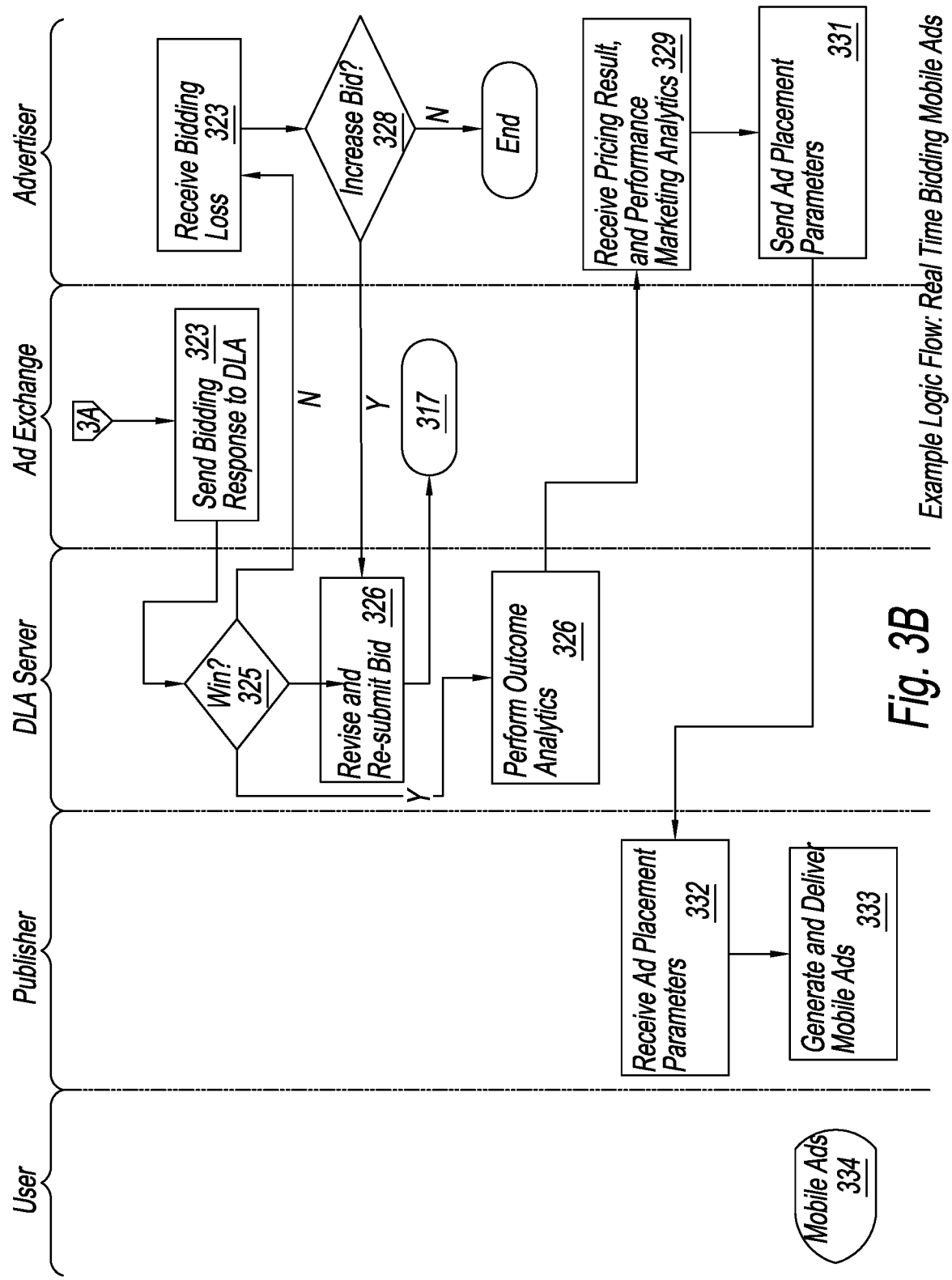

Example Data Flow: Real-Time Mobile Bid

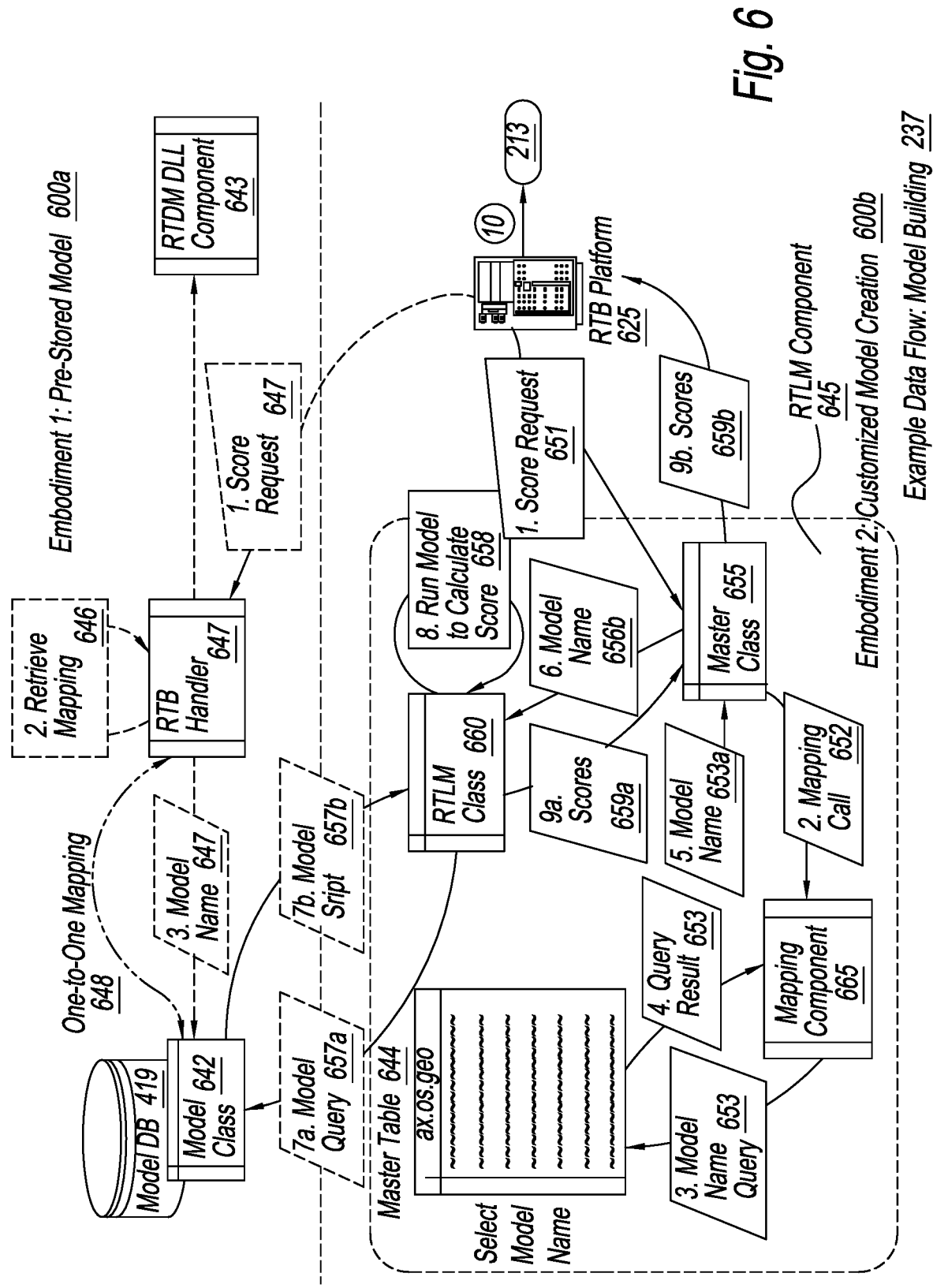

Example Data Layer: Model Attributes Hierarchy

|     | $X_1$ | $X_2$ | $X_3$ | ... |
|-----|-------|-------|-------|-----|
| $X_1$ | $N_{11}$<br>$\Sigma X_1$<br>$\Sigma X_1$<br>$\Sigma X_1 X_1$<br>$\Sigma X_1^2$<br>$\Sigma X_1^2$<br>$\Sigma (X_1 X_1)^2$ | $N_{12}$<br>$\Sigma X_1$<br>$\Sigma X_2$<br>$\Sigma X_1 X_2$<br>$\Sigma X_1^2$<br>$\Sigma X_2^2$<br>$\Sigma (X_1 X_2)^2$ | $N_{13}$<br>$\Sigma X_1$<br>$\Sigma X_3$<br>$\Sigma X_1 X_3$<br>$\Sigma X_1^2$<br>$\Sigma X_3^2$<br>$\Sigma (X_1 X_3)^2$ | ... |
| $X_2$ | $N_{21}$<br>$\Sigma X_2$<br>$\Sigma X_1$<br>$\Sigma X_2 X_1$<br>$\Sigma X_2^2$<br>$\Sigma X_1^2$<br>$\Sigma (X_1 X_1)^2$ | $N_{22}$<br>$\Sigma X_2$<br>$\Sigma X_2$<br>$\Sigma X_2 X_2$<br>$\Sigma X_2^2$<br>$\Sigma X_2^2$<br>$\Sigma (X_2 X_2)^2$ | $N_{23}$<br>$\Sigma X_2$<br>$\Sigma X_3$<br>$\Sigma X_2 X_3$<br>$\Sigma X_2^2$<br>$\Sigma X_3^2$<br>$\Sigma (X_2 X_3)^2$ | ... |
| $X3$ | $N_{31}$<br>$\Sigma X_3$<br>$\Sigma X_1$<br>$\Sigma X_3 X_1$<br>$\Sigma X_3^2$<br>$\Sigma X_1^2$<br>$\Sigma (X_3 X_1)^2$ | $N_{32}$<br>$\Sigma X_3$<br>$\Sigma X_2$<br>$\Sigma X_3 X_2$<br>$\Sigma X_3^2$<br>$\Sigma X_2^2$<br>$\Sigma (X_3 X_2)^2$ | $N_{33}$<br>$\Sigma X_3$<br>$\Sigma X_3$<br>$\Sigma X_3 X_3$<br>$\Sigma X_3^2$<br>$\Sigma X_3^2$<br>$\Sigma (X_3 X_3)^2$ | ... |
| ... | ... | ... | ... | ... |

*Example BET Table*

FIG. 8C

Example Logic Flow: Modeling Process

Example Logic Flow: Data Learning

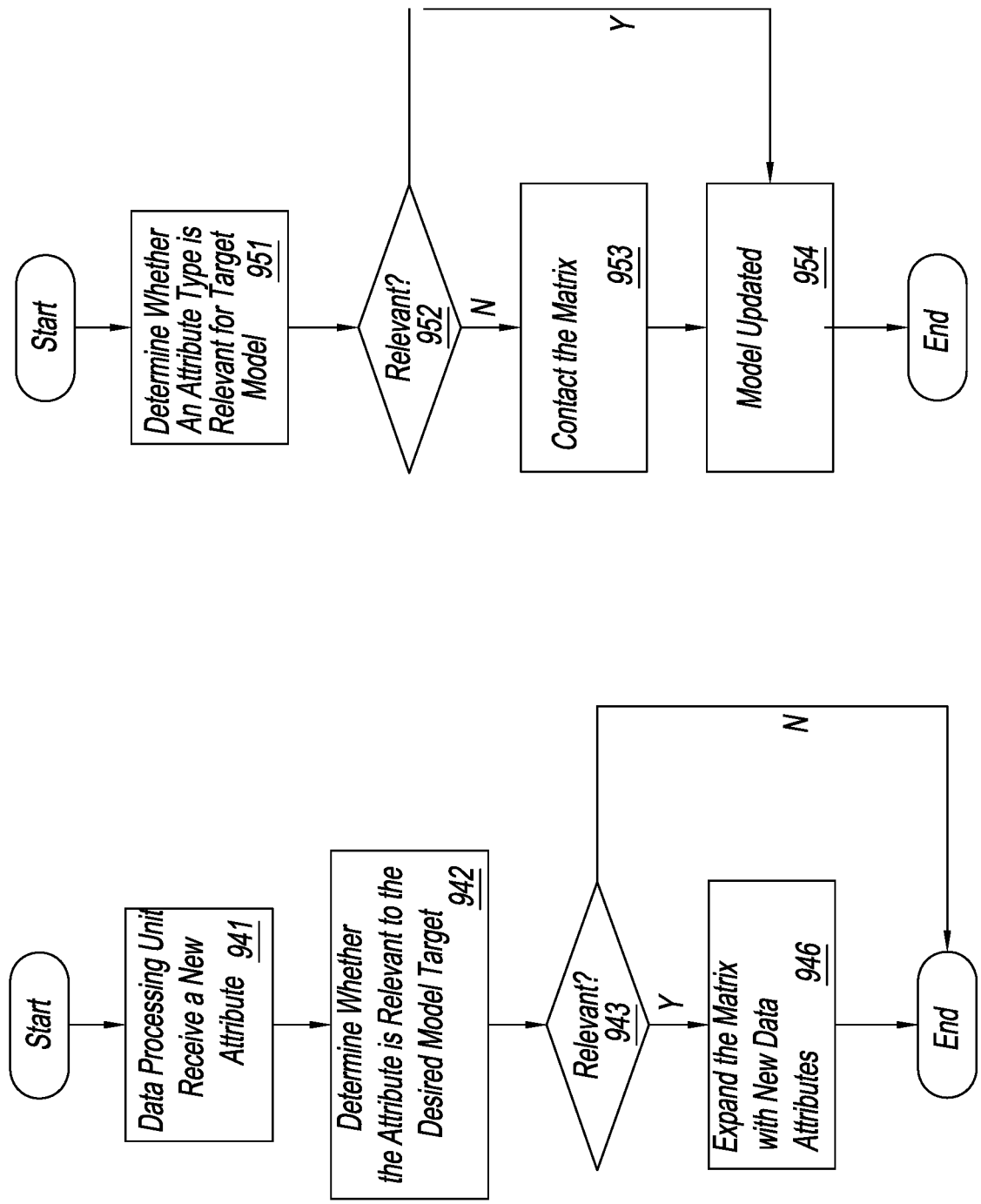

Example DLA Architecture

Example DLA Architecture

Example DLA Architecture

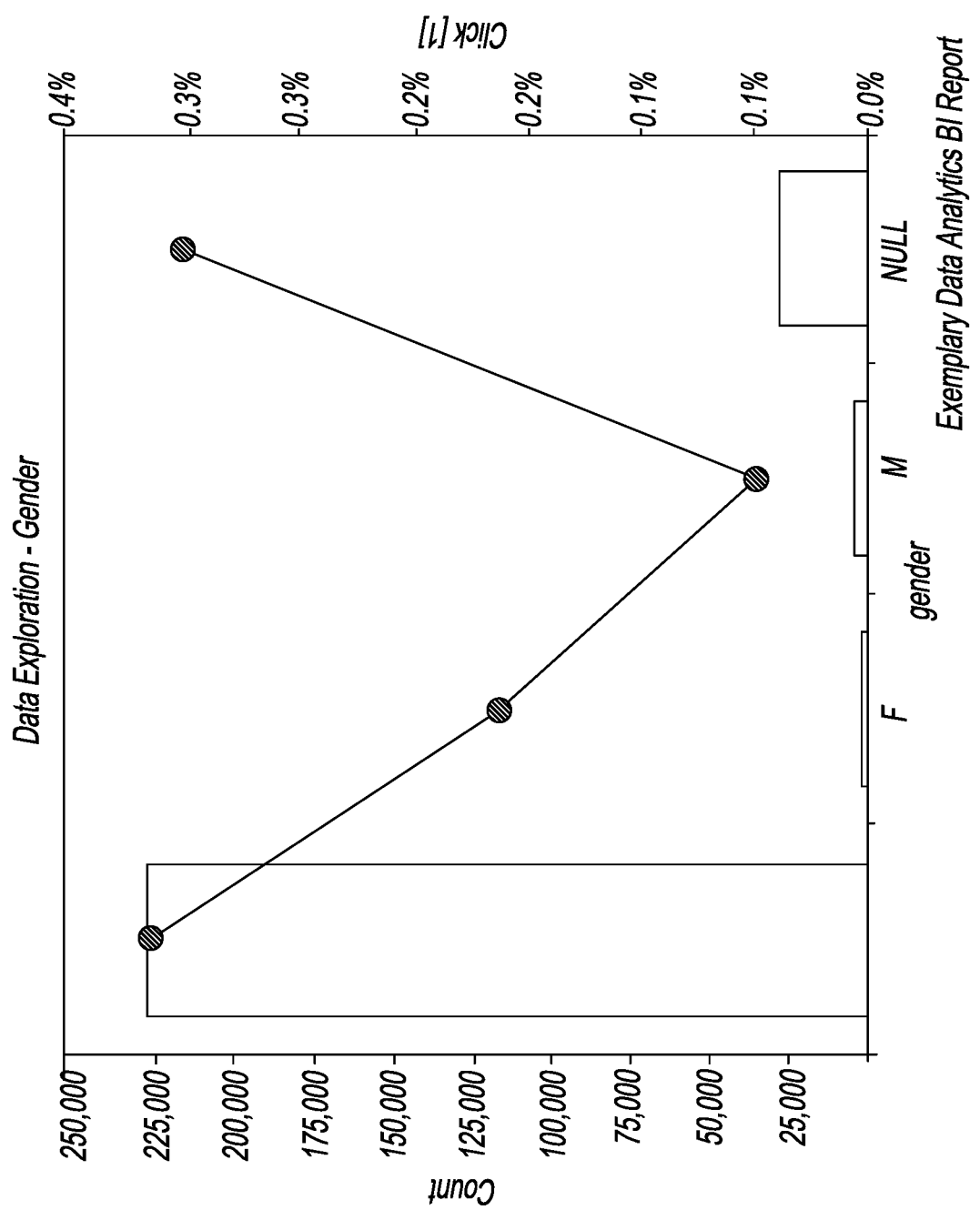

DATA LEARNING AND ANALYTICS APPARATUSES, METHODS AND SYSTEMS

PRIORITY CLAIM AND OTHER APPLICATION(S)

Applicant hereby claims benefit to priority under 35 USC § 120 as a continuation of: U.S. patent application Ser. No. 13/797,903, filed Mar. 12, 2013, entitled "Data Learning and Analytics Apparatuses, Methods and Systems". Furthermore, the following applications are hereby expressly incorporated by reference: U.S. application Ser. No. 13/797,873, filed Mar. 12, 2013, entitled "Real-Time Bidding Data Monitoring and Aggregation Apparatuses, Methods and Systems", and U.S. application Ser. No. 10/668,354, filed Sep. 24, 2003, entitled "Method and Apparatuses for Data Analysis", which claims priority to U.S. provisional application No. 60/412,812 filed on Sep. 24, 2002. The entire contents of the aforementioned applications are herein expressly incorporated by reference.

This application for letters patent discloses and describes various novel innovations and inventive aspects of DATA LEARNING AND ANALYTICS technology (hereinafter "DLA") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for data learning of real-time event updates, and more particularly, include DATA LEARNING AND ANALYTICS APPARATUSES, METHODS AND SYSTEMS ("DLA").

BACKGROUND

Content publishers such as newspapers, magazines and news websites provide an advertising channel to advertisers. Content publishers receive an advertisement request from an advertiser, designs and incorporates an advertisement into their content display such as a general news website page. A user accessing the content publishers' website via a URL address will see the advertisement, and develops an interest in the advertised product/service. The advertiser needs to pay an advertising fee to the content publisher. The content publisher then charges the advertising fee from the advertiser.

BRIEF DESCRIPTION OF THE DRAWINGS

The accompanying appendices, drawings, figures, images, etc. illustrate various example, non-limiting, inventive aspects, embodiments, and features ("e.g.," or "example(s)") in accordance with the present disclosure:

FIGS. 1C-1D provide exemplary diagrams illustrating predictive campaign analytics and data mining within embodiments of the DLA;

FIGS. 3A-3B provide logic flow diagrams illustrating real-time mobile bidding within embodiments of the DLA;

FIG. 6 provides a data flow diagram illustrating aspects of predictive model building 237 within embodiments of the DLA;

FIG. 8C provides an exemplary basic element table within embodiments of the DLA;

FIGS. 9C-9D provide logic flow diagrams illustrating aspects of the data learning process at a learner component within embodiments of the DLA;

FIG. 11A-11G provide exemplary business intelligence data analytics plots within embodiments of the DLA.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

The DATA LEARNING AND ANALYTICS technology (hereinafter "DLA") provides a data learning platform that analyzes and incorporates data knowledge from new data event updates (e.g., in a real-time stream, in a batch, etc.). For example, the DLA may provide a real-time mobile ad bidding data management platform that processes streams of ad impression data to generate optimal bids for advertisers based on real-time data-driven predictive modeling. In one implementation, the DLA May employ an intelligent learning mechanism to build real-time data-driven predictive models, which may learn and change as data evolves, to provide estimates of client desired target parameters, such as but not limited to target ad click through rate (CTR), target ad cost per mile (CPM), target cost per click (CPC), target cost per action (CPA), and/or the like. In one implementation, the DLA may facilitate the advertisers to make a bidding decision (e.g., whether to bid or not, how much to bid, etc.) based on the forecasted target performance parameters, and thus deliver optimal performance with every ad impression served across any mobile device, tablet or e-readers.

For example, many conventional data mining algorithms operate in a batch mode require having all of the relevant data at once. Although data mining algorithms are widely used in extremely diverse situations, in practice, one or more major limitations almost invariably appear and significantly constrain successful data mining applications. Frequently, these problems are associated with large increases in the rate of data generation, the quantity of data and the number of attributes (variables) to be processed. Increasingly, the data situation is now beyond the capabilities of conventional data mining methods. In one implementation, the DLA provides a real-time data mining algorithm that accommodates an ever increasing data load instantaneously with reduced complexity, e.g., without re-building the datan analytical model in its entirety whenever new data is received. In this way, the DLA provides an incremental learning mechanism for data analytics and thus the latency for real-time data assessment is reduced and the data processing efficiency is improved.

Data Learning and Analytics (Dla)

Figure 1A:
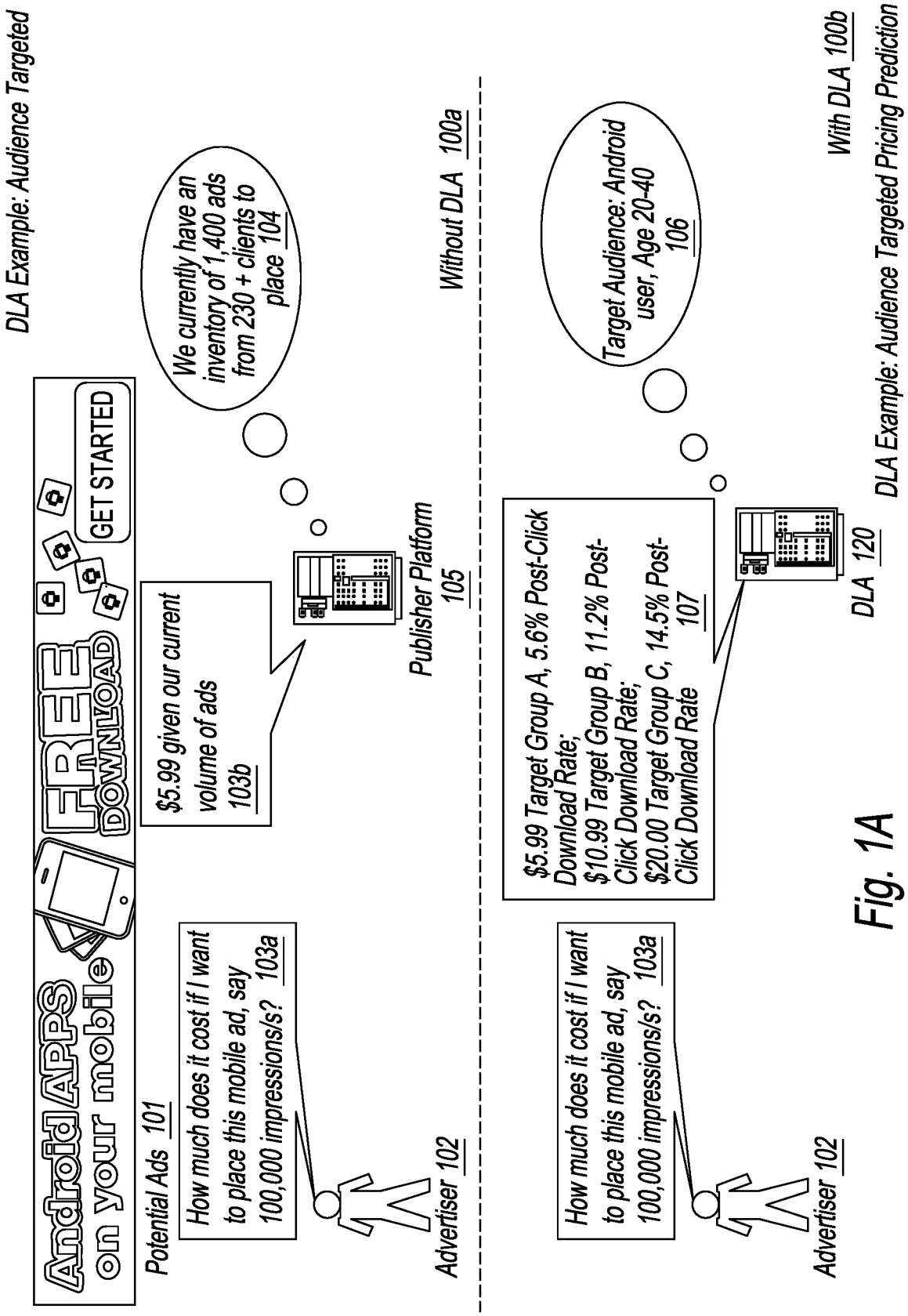
FIG. 1A provides an illustrative example showing advertiser-publisher pricing decisions with and without DLA within embodiments of the DLA.

FIG. 1A provides an illustrative example showing advertiser-publisher pricing decisions with and without DLA within embodiments of the DLA. As shown at 100a, under most traditional mobile advertising schemes, advertisers 102 may buy mobile advertising in which mobile impressions are bought in bulk, at a price based on the publisher's perceived value of its own inventory, and without regard to the unique attributes of individual advertising impressions (users) or the specific objectives of each advertiser. For example, when the advertiser 102 desires to place an advertisement 101 to 100,000 impressions 103a, the publisher 105 may provide a price quote based on how much mobile ad and/or impression inventory they have 104. In this way, publishers 105 may not achieve their desired CPM rates as only a few "big name" and high-inventory publishers may be selected by a mobile ad exchange for ad publication with desirable rates.

Within an alternative embodiment, as shown at 100b, DLA may determine price points based on an advertiser's needs and market dynamics, rather than the proposed "supply side" value of pre-negotiated blocks of generic ad impressions. For example, DLA may determine a target group for the advertiser 102, e.g., 106, and respond to ad bid requests from mobile ad exchanges when the user belongs to the determined target group. In one implementation, the ad bid price may be determined based on an impression-by-impression basis according to the target performance metric desired by the advertiser 107 (e.g., CTR, CPM, CPC, CPA, etc.), for all measurably valuable inventory, regardless of the size of the publisher's inventory pool.

Figure 1B:
FIG. 1B provides an illustrative example showing aspects of real time mobile bidding within embodiments of the DLA.

FIG. 1B provides an illustrative example showing aspects of real time mobile bidding within embodiments of the DLA. In one implementation, an Internet user 103 may attempt to load a web page via a personal device (e.g., a laptop computer, a desktop computer, a tablet computer, a Smartphone, and/or the like), e.g., at 112. The publisher server 105b, which may capture the user access, may determine the characteristics of the impression event, e.g., the user demographic information, user previously visited topics, user previous search terms, user device type, user location, and/or the like. Such user characteristics may be obtained and/or retrieved from the user's browser cookie storing the user's Internet activities with the publisher server 105b. In one implementation, the publisher server 105b may send the impression event in real time to DLA to invite a mobile ad bid 113.

In one implementation, the DLA may obtain attribute from the ad bid request 113, and for each client advertiser 102a-b, determine a bid strategy. For example, the DLA may determine whether to bid for an advertiser based on whether the user belongs to the target audience of the advertiser, e.g., based on the user characteristics, DLA may determine advertiser "FreeApp.com" 102a who has an ad for a free Android app should bid for the impression 118, rather than advertiser "Devil Cosmetics" 102b who has an ad for cosmetic products.

Figure 1C:
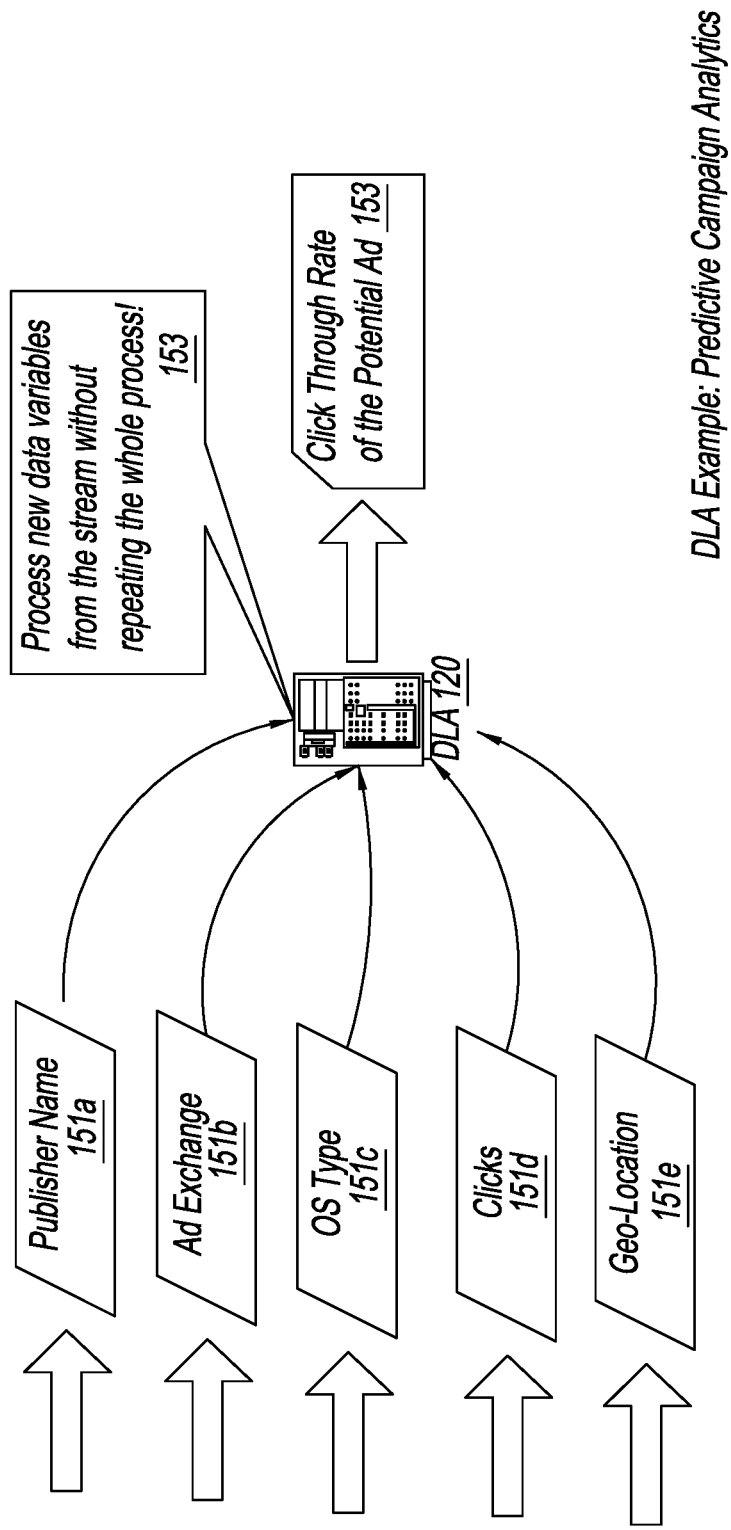

FIG. 1C provide an exemplary diagram illustrating predictive campaign analytics within embodiments of the DLA. Within implementations, the DLA may adopt a predictive model to generate performance forecasting for a potential mobile ad to be placed with a user impression event, based on which the DLA may determine whether to place a bid for the user impression event with the publisher. In one implementation, such predictive model may employ data analysis tools, such as, but not limited to data mining, statistical analysis, artificial intelligence, machine learning, process control, and/or the like, to process a collection of previously stored data for forecasting.

In one implementation, the predictive model building may involve database management for determining relationships between data variables, which May allow the value of one variable to be predicted in terms of the other variables. In one implementation, the data variables may evolve frequently in dynamic environments, e.g., DLA may receive more than 1,000,000 different impression data events every second, each of which may be associated with a different user, having different data attributes such as publisher name 151a, ad exchange name 151b, device OS type 151c, clicks 151d, source geo-location 151e, and/or the like. Under the circumstances, predictive models generally need to be "retrained" or "recalibrated" frequently in order to reflect changes of the data variables, and thus require an efficient computational speed.

For example, as shown in FIG. 1C, DLA may receive a real-time stream of data 151 of user impression events instead of a static database of data variables, e.g., from a mobile ad exchange. In one implementation, storage requirement of the real-time data stream may rapidly outgrow the available computer storage available, and existing computer facilities may become insufficient to accomplish model re-calibration. As such, using a whole database for re-calibration of a predictive model may be inefficient and at times impractical, if the data model needs to be rebuilt every time there is a data update. In one implementation, the DLA 120 provides a predictive model that may process the incoming data stream 151 to process new data variables from the stream without repeating a whole data model building process 153, and update/re-produce the predictive performance metric instantly, e.g., a click through rate of the potential ad 152.

FIG. 1D provides an example data diagram illustrating aspects of various usages of ad impression data within embodiments of the DLA. Within embodiments, ad impression data 160, e.g., a user interactive event with a mobile ad placed on the user device such as user clicking on the ad, user following a link in the ad, user placing the mouse over the ad, user performing required actions by the ad (e.g., answering a questionnaire, etc.), etc., may be employed by the DLA for data analysis to build predictive models to generate an intelligent bid for real time mobile ad bidding, and to generate performance forecast.

In one implementation, such impression data 160 may include data attributes such as, but not limited to publisher names, publisher server address, publisher description, ad description, user OS type, user action, mobile ad exchange name, conversion result, and/or the like (e.g., see 1119*l* in FIG. 11). Within implementations, such impression data may be fed to a real time bidding platform 161*a* (e.g., see FIGS. 2-3B, etc.) for real-time mobile bidding, to a real time learning machine 161*b* (e.g., see 455 in FIGS. 4A-4B, etc.); to generate Business intelligence reports 161*c* (e.g., see 460 in FIG. 4B, etc.); to integrate a 3$^{rd}$ party data service via API 161*d* (e.g., see 250 in FIG. 2); for post conversion tracking 161*e*, e.g., post user click transactions, etc.; for fingerprinting 161*f* (e.g., see 1005 in FIG. 10A), dynamic creative ad generation 161*g* (e.g., see 1006 in FIG. 10A), and/or the like. In further implementations, the intelligent impression 160 may be used for analyze brand lift data 161*h* (e.g., consumer perception of a brand, etc.), ambient data 161*i* (e.g., various market, economy indicators, etc.).

Figure 2:
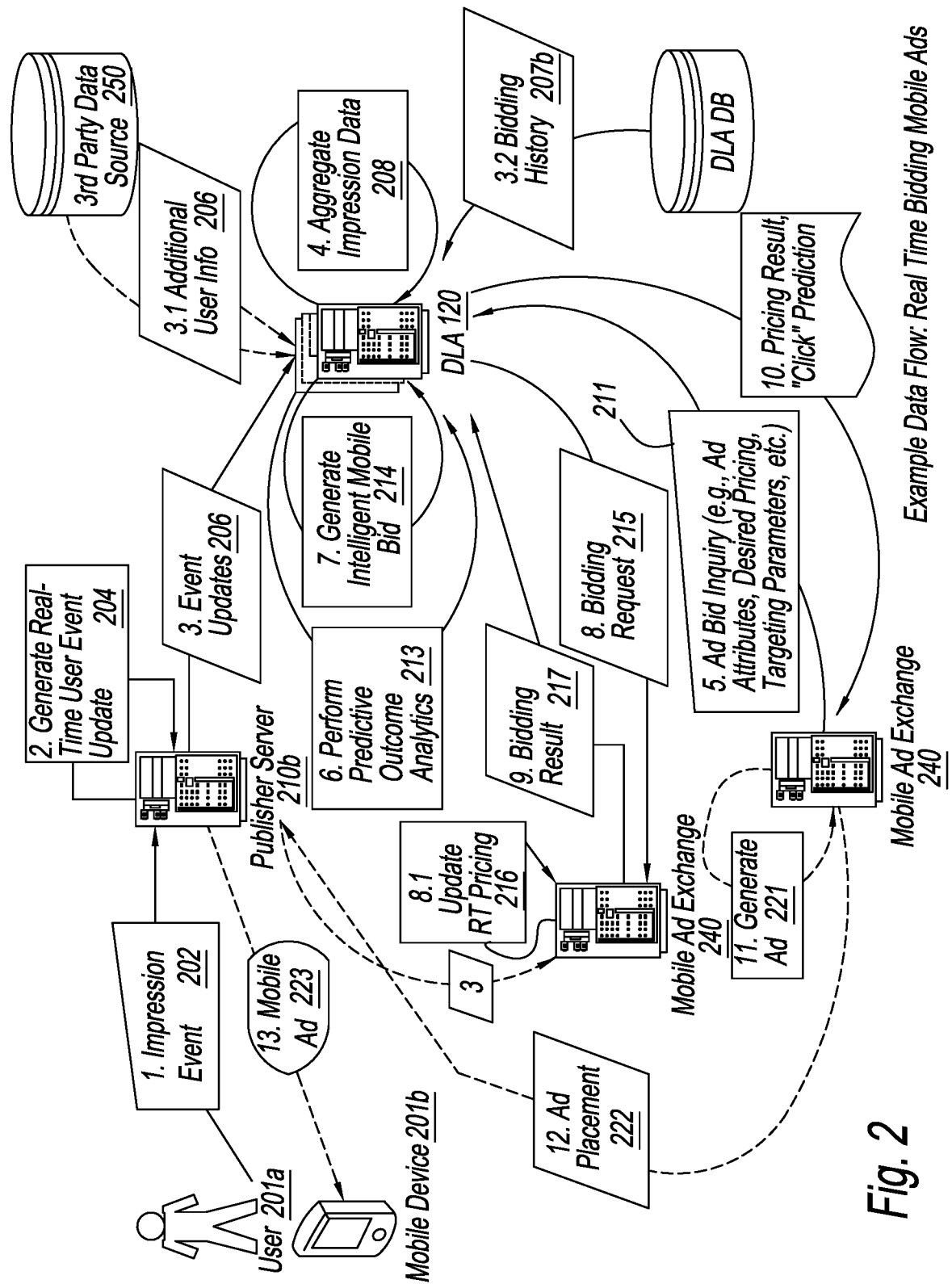
FIG. 2 provides a data flow diagram illustrating data flows between the DLA server and its affiliated entities for DLA real-time mobile bidding within embodiments of the DLA.

FIG. 2 provides a data flow diagram illustrating data flows between the DLA server 220 and its affiliated entities for DLA real-time mobile bidding within embodiments of the DLA. Within embodiments, Internet user(s) 201*a* with their mobile device(s) 201*b*, a publisher server 210, a DLA server 220, 230, a mobile ad exchange 240, an advertiser server 230, a DLA database 219, and/or the like, may interact via a communication network.

In one embodiment, a user 201*a* may operate a mobile device 201*b*, which may include any of a desktop computer, a laptop computer, a tablet computer, a Smartphone (e.g., a BlackBerry, an Apple iPhone, a Google Android, a HTC, a Samsung Galaxy, etc.), and/or the like. In one implementation, the user 201*a* may submit an impression event 202, via the mobile device 201*b*, to the publisher server 210, e.g., by attempting to access a URL link hosted by the publisher server 210, by loading a webpage hosted by the publisher server 210, and/or the like. For example, in one implementation, the mobile device 201*b* may generate a (Secure) Hypertext Transfer Protocol ("HTTP(S)") POST message including an impression event (access request) for the publisher server 210 in the form of data formatted according to the extensible Markup Language (XML). An example listing of an impression message 202, substantially in the form of a HTTP(S) POST message including XML-formatted data, is provided below:

```
POST/impression.php HTTP/1.1
Host: 192.168.23.126
Content-Type: Application/XML
Content-Length: 867
<? XML version="1.0" encoding="UTF-8" ?>
<impression>
    <session_id>4SDASDCHUF^GD& </session_id>
    <cookie_id>^&DEddee22d</cookie_id>
    <timestamp>2014-02-22 15:22:43</timestamp>
    <impression_id>ACCESS00231</impression_id>
    <client_details>
       <client_IP>192.168.23.126</client_IP>
       <client_HD_id>000000000</client_HD_id>
       <client_type>smartphone</client_type>
       <client_model>HTC Hero</client_model>
       <OS>Android 2.2</OS>
       <GPS>NA</GPS>
       . . .
    </client_details>
    <impression_type>click </impression_type>
    <url>www.todaynews.com </url>
    . . .
    <geo-location> new York </geo-location>
    . . .
</impression>
```

In the above example, the publisher server 210 may obtain user mobile device identification information (e.g., hardware ID, OS type, etc.) from the impression message 202. In another implementation, the publisher server 210 may determine a geo-location of the user, e.g., by GPS coordinates if user mobile device is GPS enabled, by cellular tower triangular projection, by IP address, etc. In one implementation, the publisher server 210 may generate a real-time user event update 204 by pulling available user information, and send such event update 206 to the DLA server 220 for mobile ad bidding. In another implementation, the event update message 206 may be sent to a mobile ad exchange 240 wherein the ad exchange 240 may generate a bid invite (e.g., see 424*a* in FIG. 4B) to the DLA server, such as but not limited to Nexage, AdMeld, Smaato, Mopub, and/or the like. In further implementations, the mobile ad exchange 240 may include major ad exchange platforms, such as Google Ads, AdECN, Right Media, ContextWeb's Exchange, DoubleClick Ad Exchange, QZedia, Ayha, Adbrite, Zinc Exchange, OpenX and AppNexus, and/or the like. Within various implementations, the mobile ad exchange 240 may broadly include a demand side platform (DSP), and/or a supply side platform (SSP).

In one implementation, the event update message 206 may include additional fields of the publisher server, e.g., publisher id, publisher name, publisher description, and/or the like, and previously stored user information, e.g., user browsing history, user search terms, user answered questionnaires, previously stored user characteristics, etc.

An example listing of the event update message 206, substantially in the form of a HTTP(S) POST message including XML-formatted data, is provided below:

```
POST/event-update.php HTTP/1.1
Host: www.todaynews.com
Content-Type: Application/XML
Content-Length: 867
<? XML version="1.0" encoding="UTF-8" ?>
<event_update>
    <event_id>3423455</event_id>
    <publisher_id> TN001</publisher_id>
    <publisher_url>www.todaynews.com </publisher_url>
    <publisher_background>
       <tag1> tech </tag1>
       <tag2> world news </tag2>
       . . .
    </publisher_background>
    <server_id>34235fswe </server_id>
    <event_url>www.todaynews.com/tech</event_url>
    <timestamp>2014-02-22 15:22:43</timestamp>
    <client_details>
       <client_IP>192.168.23.126</client_IP>
       <client_HD_id>000000000</client_HD_id>
       <client_type>smartphone</client_type>
       <client_model>HTC Hero</client_model>
       <OS>Android 2.2</OS>
       <GPS> NA</GPS>
       . . .
    </client_details>
    <user_info>
       <user_demo> asian </user_demo>
       <geo-location> new York </geo-location>
```

```
        <user_tag>    technology,    electronics,    news
            </user_tag>
        <user_search_term>Android,    charger    </us-
            er_search_term>
        . . .
    </user_info>
    . . .
</event_update>
```

In one implementation, the DLA server 220 may obtain additional information 207a pertaining to the user from various 3$^{rd}$ party data sources 250. For example, the additional information 207a may comprise user browsing history/clicks/views/activities (e.g., participated surveys, answered questionnaires, etc.) from publishers other than the publisher 210, user social media activities (e.g., Facebook "likes," comments, Facebook profile "interests," Twitter hashtags, tweets, and/or the like), user search terms at search engines, and/or the like. An example listing of the additional user information message 207a comprising a data record of user Internet activities, substantially in the form of a HTTP (S) POST message including XML-formatted data, is provided below:

```
POST /user_activities.php HTTP/1.1
Host: www.3rd-party_data.com
Content-Type: Application/XML
Content-Length: 867
<?XML version = "1.0" encoding = "UTF-8"?>
<user_activity>
    <source> Million Data Service </source>
    <timestamp> 10:12:34 2014-04-25 </timestamp>
        </client_details>
    <user_info>
        <user_demo> asian </user_demo>
        <geo-location> new York </geo-location>
        <user_tag> technology, electronics, news </user_tag>
        <user_search_term> Android, charger </user_search_term>
        ...
    </user_info>
    </client_details>
    ...
    <activity_record>
        <activity_id> 000123 </activity_id>
        <activity_type> social media </activity_type>
        <source> Facebook.com </source>
        <activity_content>
            <action> like </action>
            <object> Techcrunch.com </object>
            ...
        </activity_content>
        ...
    </activity_record>
    ...
</user_activity>
```

In another implementation, the DLA server 220 may obtain bidding history 207b from the DLA database 219. In one implementation, the bidding history may be categorized per advertiser, per user characteristics (e.g., demographic target, geo-location target, occupation target, etc.), per ad exchange, per publisher, and/or the like. An example listing of a bidding history record 207b, categorized by a publisher "www.todaynews.com." substantially in the form of a HTTP (S) POST message including XML-formatted data, is provided below:

```
POST/bidding_log.php HTTP/1.1
Host: www.DLA.com
Content-Type: Application/XML
Content-Length: 867
<? XML version="1.0" encoding="UTF-8"?>
<bidding_log>
<timestamp>10:12:34 2014-04-25</timestamp>
<publisher_id>123323423</publisher_id>
<publisher_url>www.todaynews.com </publisher_url>
<log_1>
    <time>10:12:34 2014-04-23</time>
    <advertiser_id> ad001</advertiser_id>
    <advertiser_name> FreeDev </advertiser_name>
    <user_info>
        <user_demo> asian </user_demo>
        <geo-location> new York </geo-location>
        <user_tag>    technology,    electronics,    news
            </user_tag>
        <user_search_term>Android,    charger    </us-
            er_search_term>
        . . .
    </user_info>
    <target>1000c/s</target>
    <set_price>$0.99 CPC </set_price>
    <result> loss </result>
    . . .
</log_1>
<log_2> . . . </log_2>
. . .
</bidding_log>
```

In one implementation, the DLA server 220 may aggregate the received impression data 208, and obtain ad bid inquiries 211 from advertisers 230. The ad bidding inquiry 211 may include ad attributes, desired pricing range, target performance parameters, and/or the like. An example listing of an ad bidding inquiry message 211 for an ad for "Free Android App Download,", substantially in the form of XML-formatted data, is provided below:

```
POST /ad_inquiry.php HTTP/1.1
Host: www.advertiser.com
Content-Type: Application/XML
Content-Length: 867
<?XML version = "1.0" encoding = "UTF-8"?>
<ad_inquiry>
    <session_id> 4SDASDCHUF ^GD& </session_id>
    <timestamp>2014-02-22 15:22:44</timestamp>
    ...
    <ad_attributes>
        <time> Friday </time>
        <frequency> weekly </frequency>
        ...
        <!--optional parameters-->
        <format>
            <type> banner </type>
            <content> audio </content>
            <size>
                <width> 600 </width>
                <height> 400 </height>
            </size>
            ...
        </format>
        <placement>
            <site> news site </site>
             headline 
            ...
        </placement>
        <content> "Free Android For Download" </content>
        ...
    </ad_attributes>
    <target_clicks> 100,000/s </target_clicks>
    <target_CTR> 4% </target_CTR>
    <target_CPM> $1.99 </target_CPM>
    <target_demo> all </target_demo>
    <target_user_tag> tech, Android </target_user_tag>
    <target_ user_characteristics>
```

```
<activity> site visits </activity>
<site_tag> tech </site_tag>
<frequency> 2 in past week <frequency>
   ...
</target_user_characteristics>
<target_publisher_tag> tech </target_publisher_tag>
   ...
</ad_inquiry>
```

In one implementation, the DLA server 220 may instantiate a predictive DLA analytics model 213 to generate predictive performance forecast based on an ad placed with the received user impression, to determine whether and how much DLA server 220 should generate an intelligent mobile bid 214 for the advertiser 230. Further details of the predictive analytics are discussed in FIGS. 6-9D.

Within implementations, the DLA server 220 may send a bidding request 215 including the generated bid price to the mobile ad exchange 240. For example, in one implementation, the DLA server 220 may generate a HTTP(S) POST message including a bidding request 215 to the mobile ad exchange 240 in the form of data formatted according to the XML. An example listing of a bidding request 215 to the mobile ad exchange 240, substantially in the form of a HTTP(S) POST message including XML-formatted data, is provided below:

```
POST /bidding_request.php HTTP/1.1
Host: www.DLA.com
Content-Type: Application/XML
Content-Length: 867
<?XML version = "1.0" encoding = "UTF-8" ?>
   <bidding_request>
      <session_id> server_4SDASDCHUF ˆGD& </session_id>
      <timestamp>2014-02-22 15:22:43</timestamp>
      ...
      <event_id> 3423455 </event_id>
      <publisher_id> TN001 </publisher_id>
      <publisher_url> www.todaynews.com </publisher_url>
      ...
      <event_url> www.todaynews.com/tech </event_url>
      <bid> 1.99 </bid>
      <type> CPM </type>
      ...
      <request>
         ...
         <time_range>
            <start> 2014/01/01 </start>
            <end> 2014/07/01 </end>
         <time_range>
         <ad_attribute_1> news site </ad_attribute_1>
         <ad_attribute_2> new York </ad_attribute_2>
         ...
      </request>
   ...
</bidding_request>
```

In one implementation, upon receiving the bid, the ad exchange 240 May update its real-time pricing list 216, and determine whether the bid is a win or a loss for the advertiser. Such bidding result 217, e.g., a win or a loss may be transmitted back to the DLA server 220.

In one implementation, based on the bidding result 217, the DLA server 220 may generate a report comprising the pricing result, performance prediction analytics 218 to the advertiser server 230. For example, such report 218 may comprise user impression data report, performance predictions, business intelligence reports, and/or the like.

In one implementation, when the advertiser has won a bid with the mobile ad, the advertiser server 230 may generate the advertisement 221, and send an ad placement request 222 to the publisher server 210. In one implementation, an example listing of an ad placement request message 222 substantially in the form of XML-formatted data, is provided below:

```
POST /ad_placement.php HTTP/1.1
Host: www.advertiser.com
Content-Type: Application/XML
Content-Length: 867
<?XML version = "1.0" encoding = "UTF-8"?>
<ad_placement>
   <session_id> 4SDASDCHUF ˆGD& </session_id>
   <timestamp>2014-02-22 15:22:44</timestamp>
   <advertiser_id> 0023 </advertiser_id>
   <advertiser_name> FreeDev.com </advertiser_name>
   ...
   <publisher_id> TN001 </publisher_id>
   <publisher_url> www.todaynews.com </publisher_url>
   <format>
      <type> banner </type>
      <content> audio </content>
      <size>
         <width> 600 </width>
         <height> 400 </height>
      </size>
      ...
   </format>
   <placement>
      <site> news site </site>
       headline 
      ...
   </placement>
   <content> "Free Android For Download" </content>
   </format>
   ...
</ad_placement>
```

In the above example, the ad placement request 222 includes mobile ad format parameters for the publisher server 210 to generate and place a mobile ad with their published contents (e.g., a webpage, etc.). In another implementation, the ad placement message 222 may include a link to an ad generated by the advertiser server 230, and/or an ad image generated by the advertiser server 230, and/or the like. For example, an example listing of an ad placement request message 222 including generated ad contents from the advertiser server 230 substantially in the form of XML-formatted data, is provided below:

```
POST /ad_placement.php HTTP/1.1
Host: www.advertiser.com
Content-Type: Application/XML
Content-Length: 867
<?XML version = "1.0" encoding = "UTF-8"?>
<ad_placement>
   <session_id> 4SDASDCHUF ˆGD& </session_id>
   <timestamp>2014-02-22 15:22:44</timestamp>
   <advertiser_id> 0023 </advertiser_id>
   <advertiser_name> FreeDev.com </advertiser_name>
   ...
   <publisher_id> TN001 </publisher_id>
   <publisher_url> www.todaynews.com </publisher_url>
   <ad_content>
      <size>
         <width> 600 </width>
         <height> 400 </height>
      </size>
      ...
      <image>
         <name> FreeDev.ad.001 </name>
         <format> JPEG </format>
         <compression> JPEG compression </compression>
         <size> 123456 bytes </size>
```

-continued

```
    <x-Resolution> 72.0 </x-Resolution>
    <y-Resolution> 72.0 </y-Resolution>
    <date_time> 2014:8:11 16:45:32 </date_time>
    ...
    <content> ÿØÿà - JFIF    H H ÿâ'ICC_PROFILE    ▫appl]︎†
mntrRGB XYZ •Ü !! $ acspAPPL öÖÓ-appl
◂desc P bdscm ʹ Šcprt ˡ@ $wtpt ˡd ¶rXYZ ˡx ¶gXYZ ˡŒ
¶bXYZ ˡ ¶rTRC ˡʹ ▫aarg Á vcgt ...
    </content>
    ...
</ image>
<link>
    <trigger> click </trigger>
    <url> www.freedev.com/download/app1001.exe </url>
    <action> download </action>
    ...
</link>
<placement>
    <site> news site </site>
     headline 
    ...
</placement>
...
</ad_placement>
```

In one implementation, the publisher server 210 may deliver the mobile ad 223 to the user's mobile device 201b.

Figure 3A:
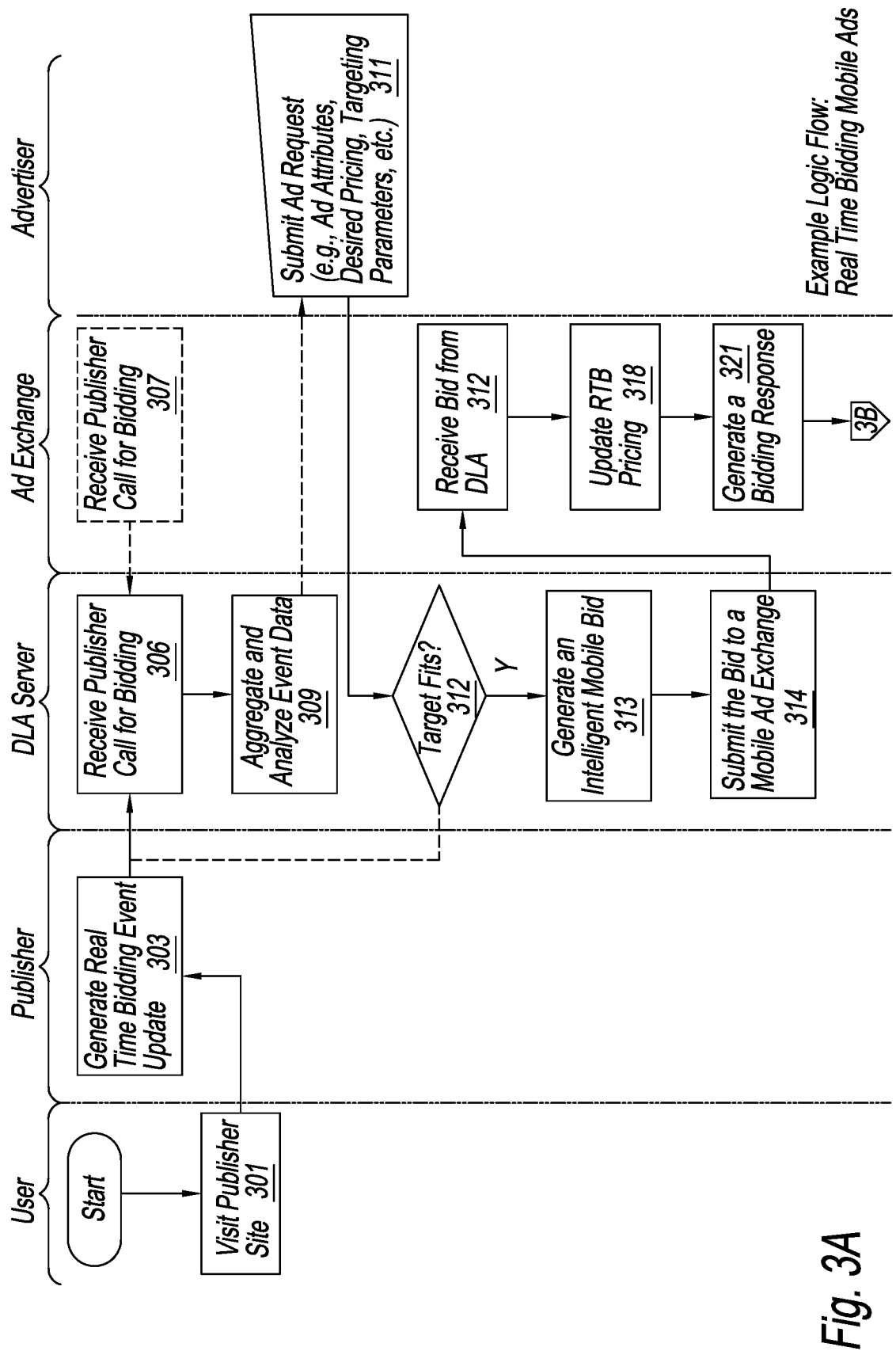

FIGS. 3A-3B provide logic flow diagrams illustrating real-time mobile bidding within embodiments of the DLA. As shown in FIG. 3A, in one implementation, a user may initiate the process by visiting a publisher site 301 via a computing device. The publisher may generate a real-time bidding event update 303 including information about the user event. For example, the publisher may retrieve user device footprint information such as hardware identification, physical address, OS type, app in use, and/or the like. In another implementation, the publisher may query for the user's browsing history with the same publisher, and/or user's other browsing trail if a cookie stores and provides such information to the publisher. In another implementation, a cookie session running on the user's browser session may further provide to the publisher the user's previously used search terms, comments from social media platforms, and/or the like to the publisher for user characteristics mining.

In one implementation, the DLA server may receive a publisher call for bidding 306 (e.g., see 206 in FIG. 2), and aggregate and analyze the event data 309. For example, the DLA may instantiate a predictive model, as discussed in FIGS. 6-9D, to generate predictive performance metrics for advertisers. In an alternative implementation, the DLA may receive the call for bidding from a mobile ad exchange platform.

In one implementation, an advertiser may submit an ad inquiry request (e.g., 211 in FIG. 2) to the DLA server 311. The DLA server may first determine whether the user fits the target audience group of the potential ad 312, e.g., whether the user demographic information, device information and/or the like satisfies any advertiser specified characteristics. If not, the DLA server may not proceed for further analytics. If yes, the DLA server may instantiate a predictive model for performance forecasting and consequently generate an intelligent mobile bid 313. The DLA server may submit the bid (e.g., see 215 in FIG. 2) to a mobile ad exchange platform 314, which, upon receiving the bid 317, may determine whether the bid would be a win or loss, and update its real-time bid pricing inventory accordingly 318. In one implementation, the ad exchange may generate a bidding response 321 to the DLA server.

Continuing on with FIG. 3B, upon ad exchange providing a bidding response to DLA, the DLA server may determine whether the bid is a win or loss 325. If the bid succeeds, the DLA may further instantiate a predictive analytics model to perform outcome analytics 326 and provide the pricing result and performance analytics to the advertiser 329. In another implementation, if the bid does not succeed, upon receiving the bidding loss 327, the advertiser may optionally determine to increase budget range. If the advertiser determines to increase the bidding range 328, the DLA server may receive such information and revise and re-submit the bid 331, and repeat the bidding inquiry process with the ad exchange at 317.

In one implementation, upon successfully winning a bid at the mobile ad exchange, the advertiser may send ad placement parameters (e.g., see 222 in FIG. 2) to the publisher server 311, which may receive the ad placement parameters 332 and generate a mobile ad for delivery 333 to the user. The user may then see a mobile ad 334 displayed at the user mobile device.

Figure 4A:
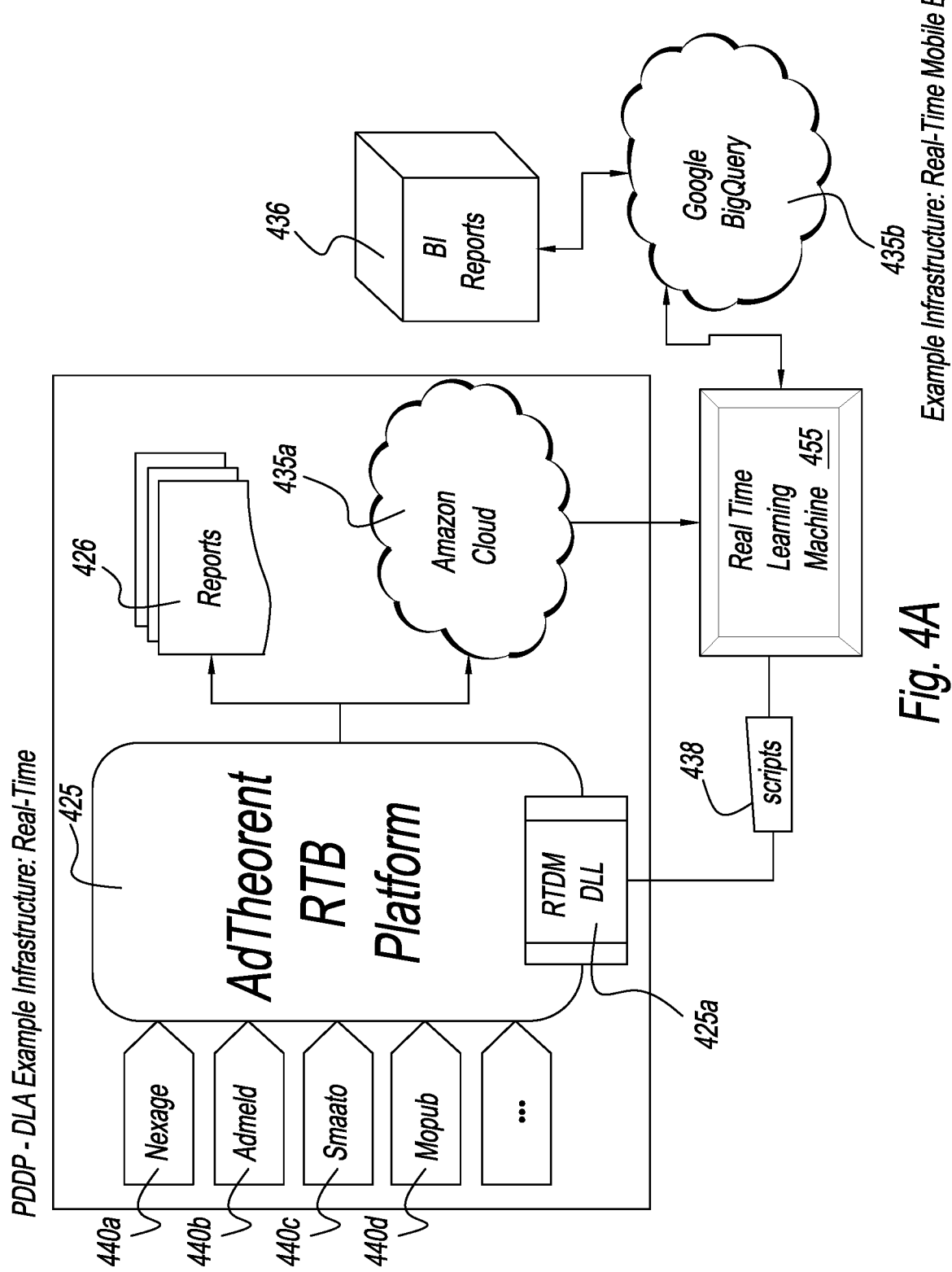
FIGS. 4A-4B provide exemplary block diagrams illustrating aspects of the infrastructure of the real-time mobile bidding platform the data flows between various entities in the DLA infrastructure within embodiments of the DLA.

FIG. 4A provides an exemplary block diagram illustrating aspects of the infrastructure of the real-time mobile bidding platform within embodiments of the DLA. Within implementations, the DLA may include a real-time bidding (RTB) platform (e.g., an AdTheorent RTB, etc.) 425, which receives data inputs (e.g., user impression events, ad bid invites, etc.) from various mobile ad exchanges such as but not limited to Nexage 440a, Admeld 440b, Smaato 440c, Mopub 440d, and/or the like. In one implementation, the obtained ad impression data may be used to generate reports 426, and/or uploaded to a cloud storage 435a (e.g., Amazon S3, etc.).

The RTB platform 425 may include a real-time data management (RTDM) dynamic-link library (DLL) 425a, which may receive analytics model scripts 438 from a real-time learning machine (RTLM) component 455. The RTLM component 455 May further load previously stored data from the Amazon cloud 435a and Google cloud 435b for model building. Analytics models and results may be uploaded to the Google cloud 435b for storage. In one implementation, the impression data, model analytics, and/or the like, which are stored in clouds 435a-b, may be used to generate business intelligence reports 436. For example, the business intelligence reports 436 may comprise a business report document in various formats, such as but not limited to Microsoft Word/Powerpoint/Excel/Access, Acrobat PDF, and/or other document/data file formats. In one implementation, the business intelligence report may comprise information analyzing industrial market performance data (e.g., see FIGS. 11A-11G, etc.), which may be built upon data described in 433, and thereby may be used as feedback for RTLM analysis, for example, adding sell-through information that may be of further use, as described throughout. Within implementations, the RTLM May obtain new and updated data in a stream continuously, on demand, periodically, intermittently, and/or the like, based on the preferred deployment.

Figure 4B:
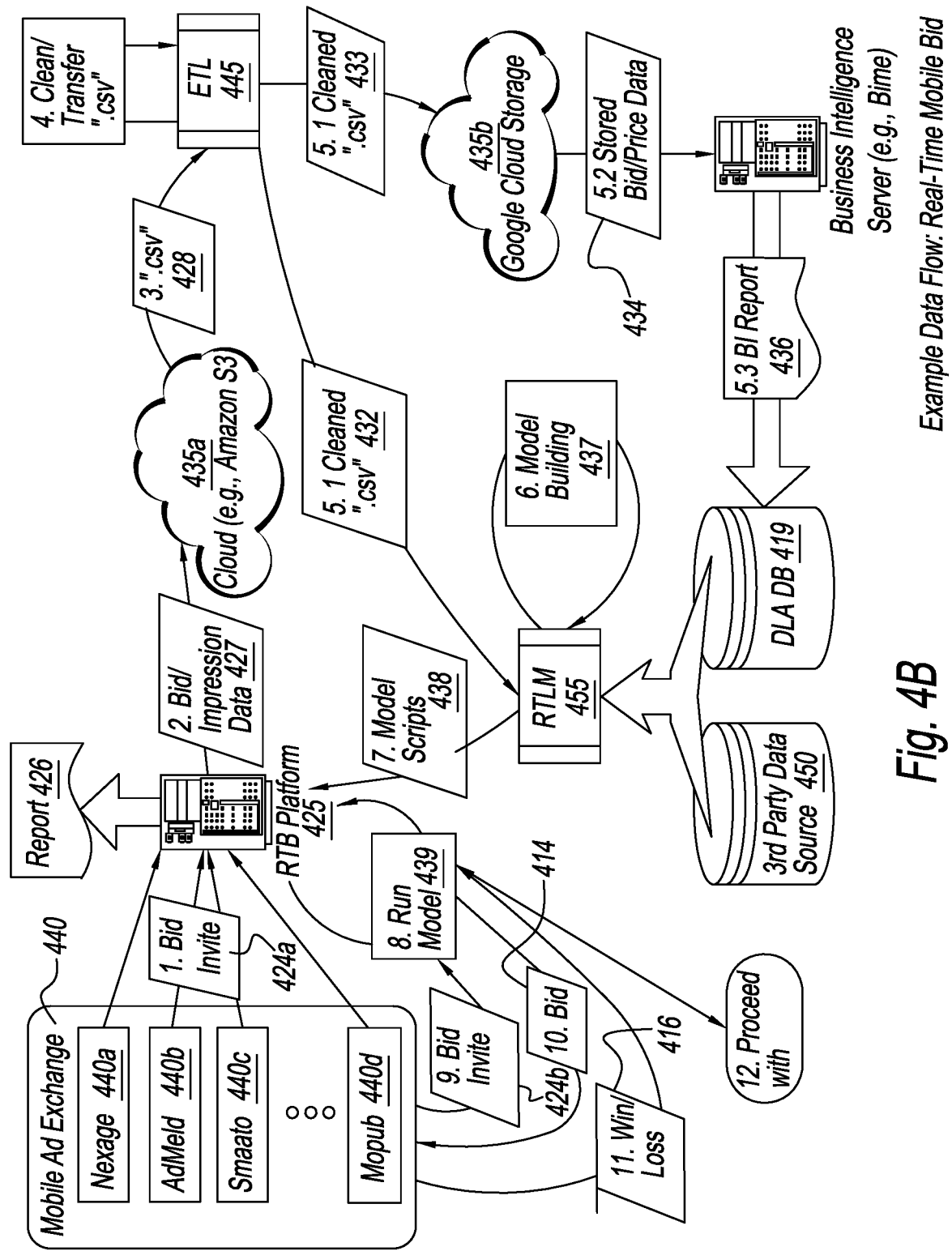

FIG. 4B provides a data flow diagram detailing the data flows between various entities in the DLA infrastructure as illustrated in FIG. 4A, within various embodiments of the DLA. As previously discussed in FIG. 2, the DLA server May pull additional user information 207a, and bidding history 207b from various data sources and databases to aggregate received impression data (e.g., 208), and build a predictive analytics model (e.g., 217). FIG. 4B describes data flows and interactions between the RTB platform 425, storage clouds 435a-b, a RTLM component 455, an data extract, transform, and load (ETL) component 445, external entities such as a business intelligence server 460, and/or the like, which details aspects of the data aggregation and model building (e.g., 208-217) as shown in FIG. 2.

Within embodiments, the RTB platform may receive a bid invite 424a from various mobile ad exchanges 440a-440d. Such bid invite 424a may comprise a request for advertisers, RTB platforms, agents, etc. to bid for a mobile ad that is to be placed with a publisher whose web sites are being accessed by an Internet user; the bid invite message 424a generated by the mobile ad exchange 440 may include attributes, such as but not limited to the ad exchange name, OS type of the user mobile device, geo-location of the user, and/or the like. In further implementations, the bid invite message 424a may contain user demographic information, user interests obtained from user previously viewed pages, ads, search terms, etc. provided by the publisher (e.g., see 303 in FIG. 3A).

Various examples of the bid invite messages 424a obtained at the RTB platform 425 are provided below:

rtb.log.31:2014-06-17 20:44:34, 268 DEBUG [com.nexage.ops.rtb.biddertelemetry] (http-0.0.0.0-8080-4) =======BIDREQUEST: {"bidderId":197, "url": "http://nexage.adtheorem.com/nexage/nexagereq.ashx", "id":"c776e004-cfa1-4741-821e-ddb2d0506f06", "at":2, "imp":[{"impid":"c776e004-cfa1-4741-821e-ddb2d0506f06-1", "h":36, "w":216}], "site":{"sid":"7087","name":"MyYearBook—Mobile Web", "pub":"Insider Guides, Inc.", "pid":600, "cat": ["IAB19", "IAB14", "IAB25"],"keywords":"teen,fun, meet,new, free,date,dating,love,sexy,hot,girls,guys, singles,single,onlinedating,find love,friends, classmates,reunion,teens,flirt","page":"http:// m.meetme.com/mobile/friendrequests/", "ref":"http:// m.meetme.com/mobile/livefeed/" }, "device": {"ip": "208.54.32.248", "country":"USA","ua": "SAMSUNG-SGH-T359/T359UVJI2 SHP/VPP/R5 NetFront/3.5 SMM-MMS/1.2.0 profile/MIDP-2.1 configuration/CLDC-1.1", "make": "Samsung", "model": "SGH T359/Smiley" osv":"2.3.6","os":"Android"}, "user":{"gender":"F","zip":"98258","country":"US", "keywords":"teen,fun,meet,new,free,date,dating,love, sexy,hot,girls,guys,singles, single,onlinedating,find-love,friends,classmates,reunion,teens,flirt", "nex_marital": "S","nex_state":"WA"},"restrictions": {"bcat":["IAB14","IAB26"], "badv":["Badoo.com", "skout.com","howaboutwe.com","zoosk.com"]}}

In the above example, the bid invite message specifies the mobile ad exchange as "nexage," the OS type of the mobile device as "Android," and geo-location as "WA," and/or the like.

Another example of the bid invite messages 424a obtained at the RTB platform 425 is provided below:

rtb.log.31:2012-06-17 20:44:34, 279 DEBUG [com.nexage.ops.rtb.biddertelemetry] (http-0.0.0.0-8080-2613) BIDREQUEST: {"bidderId":197,"url":"http://nexage.adtheorem.com/nexage/nexagereq.ashx","id": "e7d319de-2e24-4f86-b856-8cdc8b2410aa", "at": 2, "imp": [{"impid": "e7d319de-2e24-4f86-b856-8cdc8b2410aa-1","h":50,"w":320}],"app":{"aid": "14822","name":"Sevenlogics-Countdown and Baby Names-Android", "pub": "Sevenlogics, Inc.","pid": 3577,"domain":"http://www.weddingcaddy.com/default.php","cat":["IAB6"],"nex_sdkv":"1.0.0.10595"}, "device":{"ip":"66.87.99.221","country":"USA","carrier":"NEXTEL","ua":"Mozilla/5.0 (Linux; U; Android 2.3.6; en-us; SPH-D710 Build/GINGERBREAD) AppleWebKit/533.1 (KHTML, like Gecko) Version/4.0 Mobile Safari/533.1","make":"Samsung", "model":"SPH-D710","osv":"2.3.6","os":"Android"}, "restrictions":{"bcat":["IAB14","IAB23", "IAB24", "IAB25","IAB26"]}} rtb.log.31:2012-06-17 20:44:34, 289 DEBUG [com.nexage.ops.rtb.biddertelemetry] (http-0.0.0.0-8080-1648) =BIDREQUEST: {"bidderId":197,"url":"http://nexage.adtheorem.com/nexage/nexagereq.ashx", "id": "6434576a-3a21-4dfb-aeal-de8050a53670","at":2, "imp":[{"impid":"6434576a-3a21-4dfb-aeal-de8050a53670-1","h":50,"w":320,"btype":[4]}], "app":{"aid":"12092","name":"Smarter Apps-Chat on Facebook-BB","pub":"Smarter Apps Inc.","pid":1315, "domain":"www.smarter-apps.com","cat":["IAB1", "IAB14","IAB9"],"nex_sdkv":"2"},"device":{"ip": "174. 129.84.8","country":"USA","carrier":"ZAIN", "ua":"BlackBerry9300/5.0.0.977 Profile/MIDP-2.0 Configuration/CLDC-1.1 VendorID/600","make": "RIM","model":"BlackBerry 9300 Curve 3G","osv": "5.0.0.977","os":"RIM"},"user":{"gender":"F", "country":"JO"},"restrictions":{"bcat":["IAB14", "IAB24","IAB25","IAB26"],"badv":["skout.com"]}}

Another example of the bid invite messages 424a obtained at the RTB platform 425 is provided below:

rtb.log.31:2012-06-17 20:44:34, 296 DEBUG [com.nexage.ops.rtb.biddertelemetry] (http-0.0.0.0-8080-587) =======BIDREQUEST: {"bidderId":197,"url": "http://nexage.adtheorem.com/nexage/ nexagereq.ashx", "id":"451596c6-3878-4cd1-ad0b-711dbdf60733","at":2,"imp":[{"impid":"451596c6-3878-4cd1-ad0b-711dbdf60733-1","h":50,"w":320}], "app":{"aid":"13990","name":"StuckPixel—Epic Fail—iOS", "pub":"StuckPixel, Inc.","pid":3278,"domain":"http://stuckpixelinc.com/","cat":["IAB1", "IAB14", "IAB9"],"nex_sdkv":"1.0.0"},"device": {"ip":"174.254.112.102","country":"USA", "carrier": "VERIZON","ua":"Mozilla/5.0 (iPhone; U; CPU iphone OS 4_2_6 like Mac OS X; en-us) AppleWebKit/ 528.18 (KHTML, like Gecko) Version/4.0 Mobile/ 7A341 Safari/528.16","make":"Apple","model":"iPhone","osv":"4_2_6","os":"iOS"},"restrictions": {"bcat":["IAB23","IAB24","IAB25","IAB26"]}}

Another example of the bid invite messages 424a obtained at the RTB platform 425 is provided below:

rtb.log.31:2012-06-17 20:44:34, 308 DEBUG [com.nexage.ops.rtb.biddertelemetry] (http-0.0.0.0-8080-2932) =======BIDREQUEST: {"bidderId":197,"url": "http://nexage.adtheorem.com/nexage/ nexagereq.ashx","id":"3581f63d-4b6a-4cc8-9b90-38be921b310c","at":2,"imp":[{"impid":"3581f63d-4b6a-4cc8-9b90-38be921b310c-1","h":50,"w":320}], "app":{"aid":"13574","name":"Enflick-TextNow+ Voice—iOS","pub":"Enflick","pid":3200,"domain": "http://www.enflick.com/","cat":["IAB1","IAB14", "IAB9"] }, "device": {"dpid": "64d36afe51e423824f49af31439f0659d350 a4c7", "nex_dpidmd5": "33951E9E5D2355837FA32F2F679C1799","ip": "174.102.25.164", "country":"USA","ua":"Mozilla/ 5.0 (iPod; U; CPU iphone OS 4_3_5 like Mac OS X; en-us) AppleWebKit/533.17.9 (KHTML, like Gecko) Mobile/8L1","make":"Apple","model":"iPod Touch", "osv":"4_3_5","loc":"39.758948, −84.191607","os": "iOS"},"restrictions":{"bcat":["IAB23","IAB24", "IAB25","IAB2 6"],"badv":["AolMessenger", "ChatON","FacebookMessenger","Go Chat","Gogii", "TextPlus","HeyWire","Indoona","Infinite SMS", "Kik","Line","Moco","ooVoo Video Chat","Pinger", "TextFree","Skype","TalkFree","Talkatone","Tango", "Text Me!","Textie","Tiki","TiKL","Viber","Vonage", "Voxer","Vtok (Google Talk)", "WeChat", "WhatsApp", "Yahoo Messenger"]}}

Another example of the bid invite messages 424a obtained at the RTB platform 425 is provided below:

rtb.log.31:2012-06-17 20:44:34, 396 DEBUG [com.nexage.ops.rtb.biddertelemetry] (http-0.0.0.0-8080-3608) =======BIDREQUEST: {"bidderId":197,"url": "http://nexage.adtheorem.com/nexage/ nexagereq.ashx","id":"9b1e12b1-f086-48c3-9e6d-f8ecf91f40ea","at":2,"imp":[{"impid":"9b1e12b1-f086-48c3-9e6d-f8ecf91f40ea-1", "h":50,"w":320}], "app":{"aid":"13977","name":"StuckPixel— FunnyPics—iOS", "pub": "StuckPixel, Inc.", "pid": 3278,"domain":"http://stuckpixelinc.com/","cat": ["IAB1","IAB14", "IAB9"], "nex_sdkv":"1.0.0"}, "device":{"ip":"108.232.81.4","country":"USA","carrier":"AT&T","ua":"Mozilla/5.0 (iPhone; U; CPU iphone OS 5_1_1 like Mac OS X; en-us) AppleWebKit/ 528.18 (KHTML, like Gecko) Version/4.0 Mobile/ 7A341 Safari/528.16","make":"Apple","model":"iPhone","osv":"5_1_1","os":"iOS"},"restrictions": {"bcat":["IAB23","IAB24","IAB25","IAB26"]}}

Another example of the bid invite messages 424a obtained at the RTB platform 425 is provided below:

rtb.log.31:2012-06-17 20:44:34,396 DEBUG [com.nexage.ops.rtb.biddertelemetry] (http-0.0.0.0-8080-4) =======BIDREQUEST: {"bidderId":197,"url": "http://nexage.adtheorem.com/nexage/ nexagereq.ashx", "id": "31c5ed09-7f68-4c83-b0c7-1efc2db8a8f5","at":2, "imp":[{"impid":"31c5ed09-7f68-4c83-b0c7-1efc2db8a8f5-1","h":50,"w":320}], "app":{"aid":"14029","name":"StuckPixel—Funny, Demotivational Pics and Epic Fails—Android", "pub": "StuckPixel, Inc.","pid":3278,"domain":"http://stuckpixelinc.com/","cat":["IAB1","IAB9"], "nex_sdkv": "1.0.0.10595"},"device":{"ip":"66.87.70.207","country":"USA","carrier":"NEXTEL","ua":"Mozilla/5.0 (Linux; U; Android 2.3.6; en-us; SPH-M820-BST Build/GINGERBREAD) AppleWebKit/533.1 (KHTML, like Gecko) Version/4.0 Mobile Safari/ 533.1","make":"Samsung","model":"SPH-M820", "osv":"2.3.6","os":"Android"},"restrictions":{"bcat": ["IAB23", "IAB24", "IAB25","IAB26" ] } }

Another example of the bid invite messages 424a obtained at the RTB platform 425 is provided below:

rtb.log.31:2012-06-17 20:44:34, 446 DEBUG [com.nexage.ops.rtb.biddertelemetry] (http-0.0.0.0-8080-965) =======BIDREQUEST: {"bidderId":197,"url": "http://nexage.adtheorem.com/nexage/ nexagereq.ashx","id":"d6cf5af1-38ed-4bed-99d7-17bfed683a9e","at":2,"imp":[{"impid":"d6cf5af1-38ed-4bed-99d7-17bfed683a9e-1","h":50,"w":320}], "app":{"aid":"14835","name":"Sevenlogics— Countdown and Baby Names—iPhone", "pub": "Sevenlogics, Inc.","pid":3577,"domain":"http:// www.weddingcaddy.com/default.php","cat":["IAB6"], "nex_sdkv":"1.0.0"},"device":{"ip":"68.81.51.10", "country": "USA", "ua":"Mozilla/5.0 (iPhone; U; CPU iphone OS 5_1_1 like Mac OS X; en-us) AppleWebKit/ 528.18 (KHTML, like Gecko) Version/4.0 Mobile/ 7A341 Safari/528.16","make":"Apple","model":"iPhone","osv":"5_1_1","os":"iOS"},"restrictions": {"bcat":["IAB14","IAB23","IAB24","IAB25", "IAB26"]}}

Another example of the bid invite messages 424a obtained at the RTB platform 425 is provided below:

rtb.log.31:2012-06-17 20:44:34, 447 DEBUG [com.nexage.ops.rtb.biddertelemetry] (http-0.0.0.0-8080-3119) =======BIDREQUEST: {"bidderId":197,"url": "http://nexage.adtheorem.com/nexage/ nexagereq.ashx", "id":"0bde65d4-2864-4f49-ba28-5f4492aa4f97","at":2,"imp":[{"impid":"0bde65d4-2864-4f49-ba28-5f4492aa4f97-1","h":50,"w":320}], "app":{"aid":"13574","name":"Enflick–TextNow+ Voice–iOS","pub":"Enflick","pid":3200,"domain": "http://www.enflick.com/", "cat":["IAB1","IAB14", "IAB9"]},"device":{"dpid": "2774ca91a7819687fc5ddf558909960986df 9cc9", "nex_dpidmd5": "93FE9C6D5F94E946635ADC427027D563","ip": "174.126.80.133", "country":"USA","ua":"Mozilla/ 5.0 (iPod; U; CPU iphone OS 4_3_5 like Mac OS X; en-us) AppleWebKit/533.17.9 (KHTML, like Gecko) Mobile/8L1","make":"Apple","model":"iPod Touch", "osv":"4_3_5","loc":"33.448377,–112.074037","os": "iOS"},"restrictions":{"bcat":["IAB23", "IAB24", "IAB25","IAB 26"],"badv":["AolMessenger", "ChatON","Facebook Messenger","Go Chat","Gogii", "TextPlus","HeyWire","Indoona","Infinite SMS", "Kik","Line","Moco","ooVooVideo Chat","Pinger", "TextFree","Skype","TalkFree","Talkatone","Tango", "Text Me!","Textie","Tiki","TiKL","Viber","Vonage", "Voxer","Vtok(Google Talk)", "WeChat", "WhatsApp", "Yahoo Messenger"]}}

In one implementation, the RTB platform 425 may generate a report 426 based on information included in the received bid invite messages 424a, e.g., summarizing the impression data within a period of time, from a certain mobile ad exchange, with an OS type, etc.

Within implementations, the DLA may employ a three-stage data analysis approach that refines billions of bid requests/invites 424a, removes extraneous data, or noise and delivers the most accurate and efficient targeting for advertiser's mobile campaigns. In one implementation, as the first stage, the RTB platform 425 may send bid impression data 427 and bid invites obtained from the bid invite 424a to a storage cloud 435a for processing and storage (e.g., Amazon S3, etc.), wherein the bid requests/invites and impressions data are extracted, transformed at the RTB 425 prior to uploading to the Amazon Cloud S3. In one implementation, the Amazon S3 cloud may store the original impression data (e.g., which may take a form similar to that in 424a) in CSV format 428.

For example, an exemplary data record 428 substantially in the format of CSV obtained from the Amazon S3 cloud may take a form similar to:

| Key | Count | Sum |
| --- | --- | --- |
| site_base_url:-:stuckpixel-funny pics-ios | 561542 | 2309 |
| category:-:arts & entertainment\|society\|hobbies & interests | 3890190 | 9164 |
| device_country:-:usa | 6351313 | 19174 |
| restriction_badv:-: | 2239137 | 6434 |
| site_base_url:-:blogads-perez hilton | 286693 | 830 |
| category:-:arts & entertainment\|education | 286693 | 830 |
| restriction_badv:-:zoosk.com\|innovid.com | 286693 | 830 |
| site_base_url:-:funpokes-redditpicshd-ios | 630759 | 2314 |

-continued

| Key | Count | Sum |
|---|---|---|
| category:-:arts & entertainment\|hobbies & interests | 1671177 | 10699 |
| site_base_url:-:stuckpixel-wallpapers hd-ios | 32342 | 181 |
| site_base_url:-:fingerarts-solitaire-iphone | 98612 | 1498 |
| restriction_badv:-: hangman\|sudoku\|fourinarow\|solitaire\| klondikesolitaire\|spidersolitaire\|freecellsolitaire\| pyramidsolitaire | 607839 | 6974 |
| site_base_url:-:fingerarts-spider solitaire-iphone | 31580 | 463 |
| site_base_url:-:fingerarts-sudoku-iphone | 463211 | 4776 |
| site_base_url:-:gamecircus-prizeclawhd-ipad | 105514 | 507 |
| restriction_badv:-:zoosk.com | 131508 | 533 |
| site_base_url:-:goal.com-ipad app | 10780 | 23 |
| category:-:sports\|hobbies & interests | 11167 | 24 |
| site_base_url:-:stuckpixel-epic fail-ios | 132087 | 308 |
| site_base_url:-:fingerarts-free cell solitaire-iphone | 9342 | 180 |
| site_base_url:-:fingerarts-hangman rss-iphone | 3213 | 31 |
| category:-:arts & entertainment\|society\|hobbies & interests\|news | 3213 | 31 |
| ... | ... | ... |

In one implementation, as the second stage, the DLA may employ another ETL 445 process to transform and transfer the raw data (e.g., in the ".csv" format 428). For example, the ETL 445 may clean the original data and transform data entries into a unified numeric value 431, e.g., for OS type, "iOS" may be transformed to "001," and "Android" may be transformed to "002," etc. In one implementation, the ETL 445 May upload the cleaned data (e.g., in the ".csv" format 433) to the Google Cloud storage 435*b* and then the stored bid/price data 434 may be forwarded for further data analytics and Business Intelligence (BI) reporting, e.g., with Bime 460. Such cleaned data is more efficient as it is more compact, takes less storage space, may be processed more quickly without requiring additional conversion, and may be transferred more readily and require less bandwidth.

For example, in one implementation, an exemplary data record 433 including cleaned data 433 substantially in the format of CSV obtained from the Amazon S3 cloud may take a form similar to:

| _Ida_ | 1.8684728 | 0.5 |
|---|---|---|
| restriction_badv | 257.364791 | S |
| site_base_url | 230.6337 | S |
| device_country | 162.106114 | S |
| category | −117.537884 | S |

In another implementation, as the third stage, the cleaned data 432 May be sent to the RTLM component 455, which may use the cleaned and transformed data 432, together with optional data obtained from other $3^{rd}$ party data source 450 and DLA database 419 (e.g., existing model parameters, past model analytics data, etc.) to build various CTR/CPC/CPM/CPA predictive models, e.g., 437. In one implementation, the RTLM 455 may process the incoming data and re-use existing models with updated data variables, e.g., see more details in FIG. 6. The RTLM may allow a fast model updating with a stream of incoming data updates. For example, 100 different predictive models may be tested in one second and then 80-90 percent of those noisy or correlated variables may be eliminated on the fly. Further details of the model building and updating 437 are discussed in FIGS. 6-9D.

Within implementations, the RTLM 455 may generate and send model scripts 438, which may comprise linear regression coefficients of the predictive model to RTB. An example segment of the model scripts 438 substantially in SQL, may take a form similar to the following:

CREATE FUNCTION dbo.RTC_Score
(
@restriction_badv float, @site_base_url float, @device_country float, @category FLOAT
)
RETURNS FLOAT
AS
BEGIN
 RETURN
 257.364791*@restriction_badv
 +230.633700*@site_base_url
 +162.106114*@device_country
 −117.537884*@category
END In another example, a segment of the model scripts 438 substantially in Visual Basic, may take a form similar to the following:

Public Function RTC_Score (restriction_badv As Double, site_base_url As Double, device_country As Double, category As Double) As Double
RTC_Score=257.364791*restriction_badv+ 230.633700*site_base_url+162.106114*device_country-117.537884*category
End Function In another example, a segment of the model scripts 438 substantially in Java, may take a form similar to the following:

public double rtc_score(double restriction_badv, double site_base_url, double device_country, double category)
{
return   257.364791*restriction_badv+230.633700* site_base_url+162.106114*device_country-117.537884*category;
}

In one implementation, the RTB may employ predictor component (e.g., see 860 in FIG. 8B) to instantiate the model 439, and in response to a bid invite 424*b* in real-time. For example, the RTB may place a bid 414 based on the predictive analytics, and obtain a win/loss 416 result from the mobile ad exchange 440, which is described in a similar manner in FIG. 2 (e.g., see 214, 216, etc.), and proceed with 221 in FIG. 2.

Figure 5:
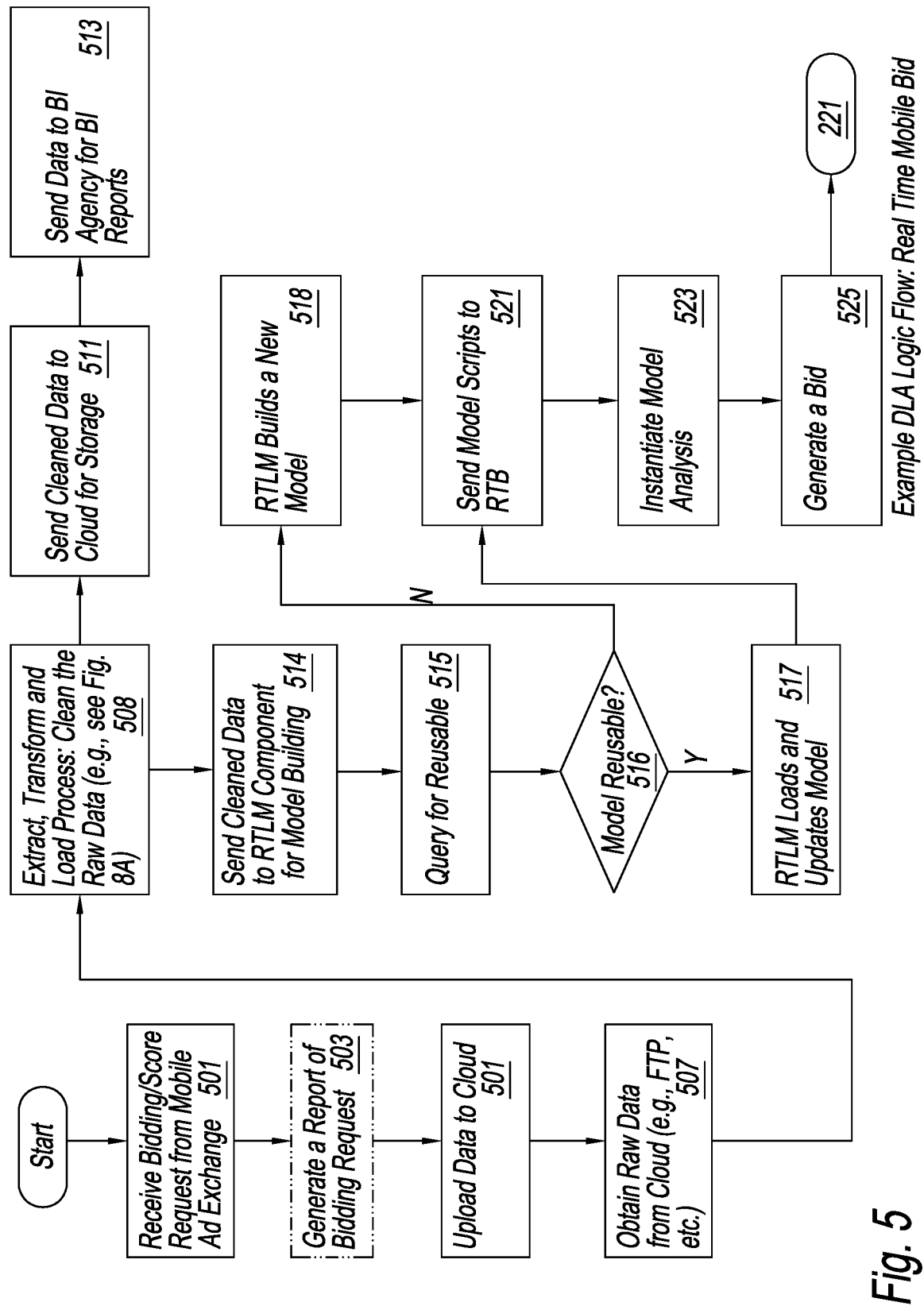
FIG. 5 provides a logic flow illustrating the work flow of real time mobile bid described in FIG. 4B within embodiments of the DLA.

FIG. 5 provides a logic flow illustrating the work flow of real time mobile bid described in FIG. 4B within embodiments of the DLA. Within embodiments, the DLA may receive a bidding/scoring request from a mobile ad exchange 501, including attribute information, user demographic information, and/or the like. In one implementation, the bidding invite/request may include a scoring request that requires the DLA to assess the pending bidding invite based on the user characteristics, etc. (e.g., as further discussed in FIG. 6).

In one implementation, the DLA may generate a report of the bidding invites 503, e.g., by segmenting various bidding invites into categories such as time period, OS type, user demographics, mobile ad exchanges, etc. For example, the generated reports may include a report for "bidding invites during March 2014 from Mopub," and/or the like.

In one implementation, the DLA may upload the raw data to a cloud storage 505 (e.g., Amazon S3), and may obtain previously stored impression data from the cloud 507 for further analytics. In one implementation, the DLA may employ an ETL component to extract, transform and load the raw data 508, e.g., to remove extraneous data, or noise, to format the data in a unified format, etc. In one implementation, the cleaned data may be send to Google cloud for storage 511, which may be further forwarded to a BI agency for BI reports 513.

In another implementation, the cleaned data may be sent to a RTLM component for modeling 514. For a desired model target (e.g., CPM/CPC/CPA/CTR, etc.), the RTLM may query for a reusable model 515. If such reusable model exists 516, the RTLM may load and update the reusable model 517, e.g., by building data coefficients with updated new data variables as discussed in FIGS. 8A-8B. In one implementation, if no reusable model exists 516, RTLM may build a new model 518 based on the target performance metric. In one implementation, the RTLM may send model scripts to RTB 521, which may instantiate the model for performance analytics 523. The DLA may generate a bid 525 when the performance prediction yields positive results, e.g., when the predictive performance achieves an expected level, etc.

FIG. 6 provides a data flow diagram illustrating aspects of predictive model building 237 within embodiments of the DLA. Within implementations, The DLA may leverage technology that processes the incoming data streams from mobile ad exchanges 440 for real-time analysis and scoring (e.g., see FIG. 6), based on various criteria, including: advertiser's demographic data, geographic data, publishers' data and other information, etc. The DLA may allow data variables to be added or removed from analysis on the fly so that, for example, if a demographic data point such as women 25-49 were removed from the analysis, the DLA would almost instantly calibrate the existing predictive models.

In one implementation, the RTB platform 625 may receive a scoring request 651, which may take a form similar to the bidding invite/request 424a in FIG. 4B. The scoring request 651 may include information that a user is attempting to access a publisher site, and requests an assessment of the potential mobile ad opportunity. In one implementation, a score may comprise a numeric value indicating ad desirability of the potential mobile ad opportunity, based on various data attributes associated with the ad opportunity, such as, but not limited to ad exchange name, user OS type, user geo-location, publisher type, publisher name, etc. In one implementation, the score may differ for different model types, e.g., model targets. For example, the score may be a unified numeric value between 0 and 1, indicating a probability that a user may click on the ad should the mobile ad be placed with the mobile ad opportunity, which may be obtained via the CTR model. As other examples, the score may comprise a price of the potential click, e.g., which may be obtained via a CPC model, and/or the like. Within implementations, the DLA may generate a bid price based on the obtained score. For example, if the estimated price of a potential click (e.g., CPC) is $0.99, the DLA may bid at a price slighter lower than $0.95, and may raise the bid until the asking price exceeds $0.99 CPC.

In one embodiment, the DLA may process the score request with pre-stored models 600a. In one implementation, the DLA may maintain a database of models 642, wherein each previously stored model has a one-to-one mapping 648 to a series of RTB handlers 641. In one implementation, when the RTB handler receives the scoring request 651, the handler may retrieve a model name 647 based on the score request 651 and a mapping relationship list 646. For example, in one implementation, when the scoring request 651 indicates a target performance metric as CTR, the handler may retrieve a CTR model from the model database 642.

Within alternative implementations, DLA may facilitate customized dynamic model creation and updating 600b. In one implementation, the scoring request 651 may be routed to a RTDM DLL component 643, which may in turn direct the scoring request to its master class component 655. The master class component 655 may facilitate searching for a model name for the scoring request 651. For example, the master class component 655 may obtain attribute values from the scoring request 651, e.g., the ad exchange name, OS type, geo-location, etc., and generate a mapping call 652 including such parameters to the mapping component 665. For example, an exemplary PHP call to invoke a mapping component 665 may take a form similar to:

<? PHP
header ('Content-Type: text/plain');
//call mapping function
mapping (ax, os_type, geo, $MasterTable);
?>

The mapping component 665 may generate a model name query 653 on a master table 644. For example, the master table 644 may be a relational database responsive to Structured Query Language ("SQL") commands. The mapping component 665 may execute a hypertext preprocessor ("PHP") script including SQL commands to query the master table 644 for a model name. An example model name query 653, substantially in the form of PHP/SQL commands, is provided below:

<? PHP
header ('Content-Type: text/plain');
mysql_connect ("254.93.179.112", $DBserver, $password);//access database server
mysql_select_db ("DLA_DB.SQL");//select database table to search
//create query
$query="SELECT model_name, FROM MasterTable WHERE model_ax LIKE '%' "Mopub" AND model_geo LIKE '%' "New York" AND model_os LIKE '%' "Android";
$result=mysql_query($query);//perform the search query
mysql_close ("DLA_DB.SQL");//close database access
?>

In one implementation, the model name stored in the master table 644 may take a form similar to a concatenation of ad exchange name, OS type, and geo-location attributes from the scoring request 651. For example, if a model is previously built for scoring requests from the ad exchange "Mopub," mobile device OS type "Android," and an Internet user from "New York," the model may be stored under the name "mopub.android.newyork," and/or the like. In one implementation, the model query may be conducted through a hierarchy of model attributes, e.g., as discussed in FIG. 8A.

Within implementations, the mapping component 665 may obtain the query result 654, which contains the model name 656a, and forward it to the master class component 655. In one implementation, the master class 655 may forward the model name 656b to a RTLM class component 660, which may query for the model 657 within the model database 642 based on the model name. An example model query 657a, substantially in the form of PHP/SQL commands, is provided below:

<? PHP
header ('Content-Type: text/plain');
mysql_connect("254.93.179.112",$DBserver,$password); //access database server mysql_select_db("DLA_DB.SQL"); //select database table to search
//create query
$query="SELECT model_version,model_target, model_date, model_type,
  model_output, model_input_1, model_input2, model_input3,
  model coefficient a, model coefficient_b1, model_coefficeint_b2,
  model coefficient_b3, model_script, FROM ModelTable WHERE model name LIKE '%' "mopub.android.newyork";
$result=mysql_query ($query);//perform the search query
mysql_close ("DLA_DB.SQL");//close database access
?>

Figure 8A:
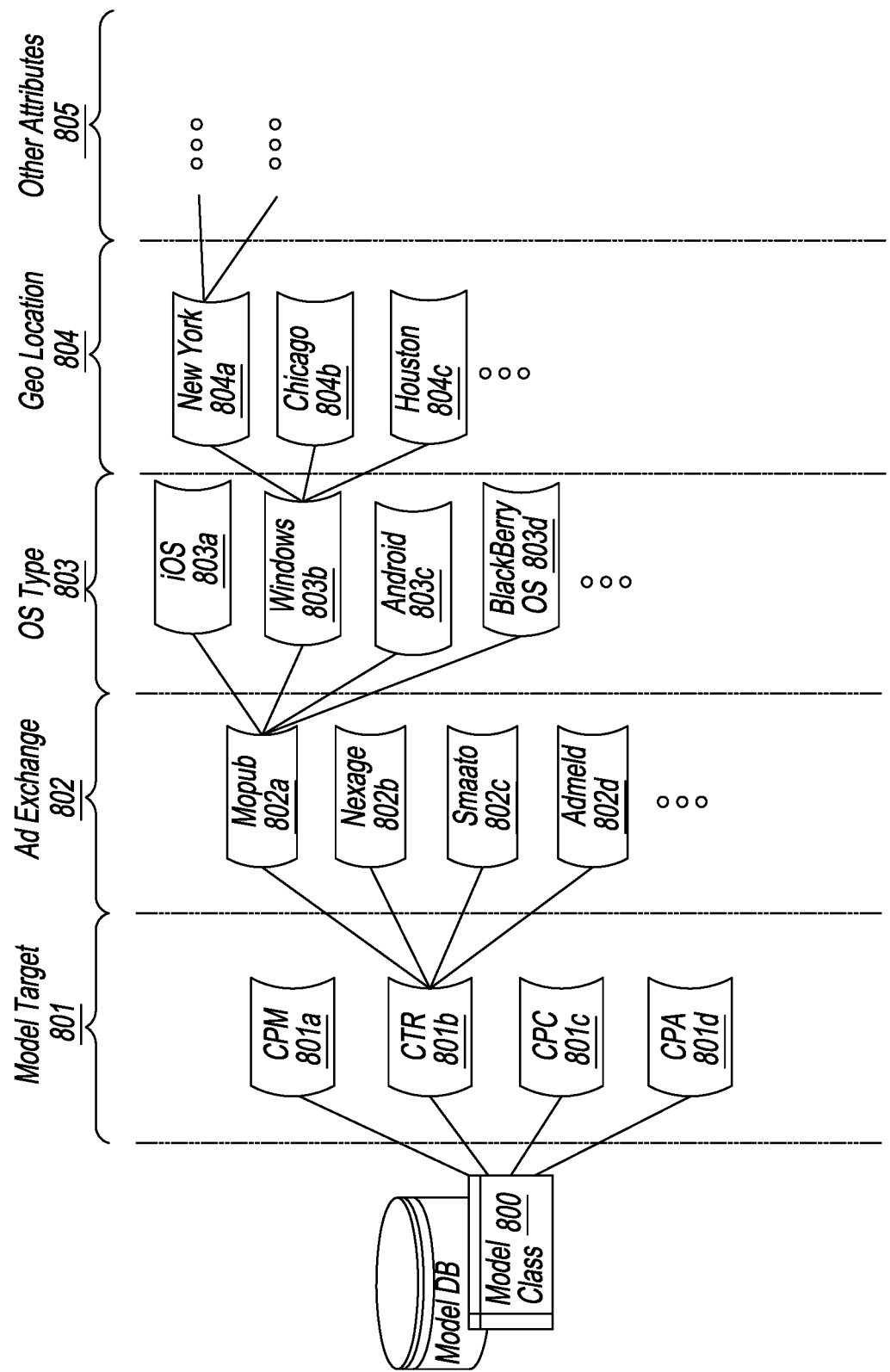
FIG. 8A provides a data diagram illustrating exemplary aspects of a DLA predictive model attribute hierarchy within embodiments of the DLA.
Figure 8B:
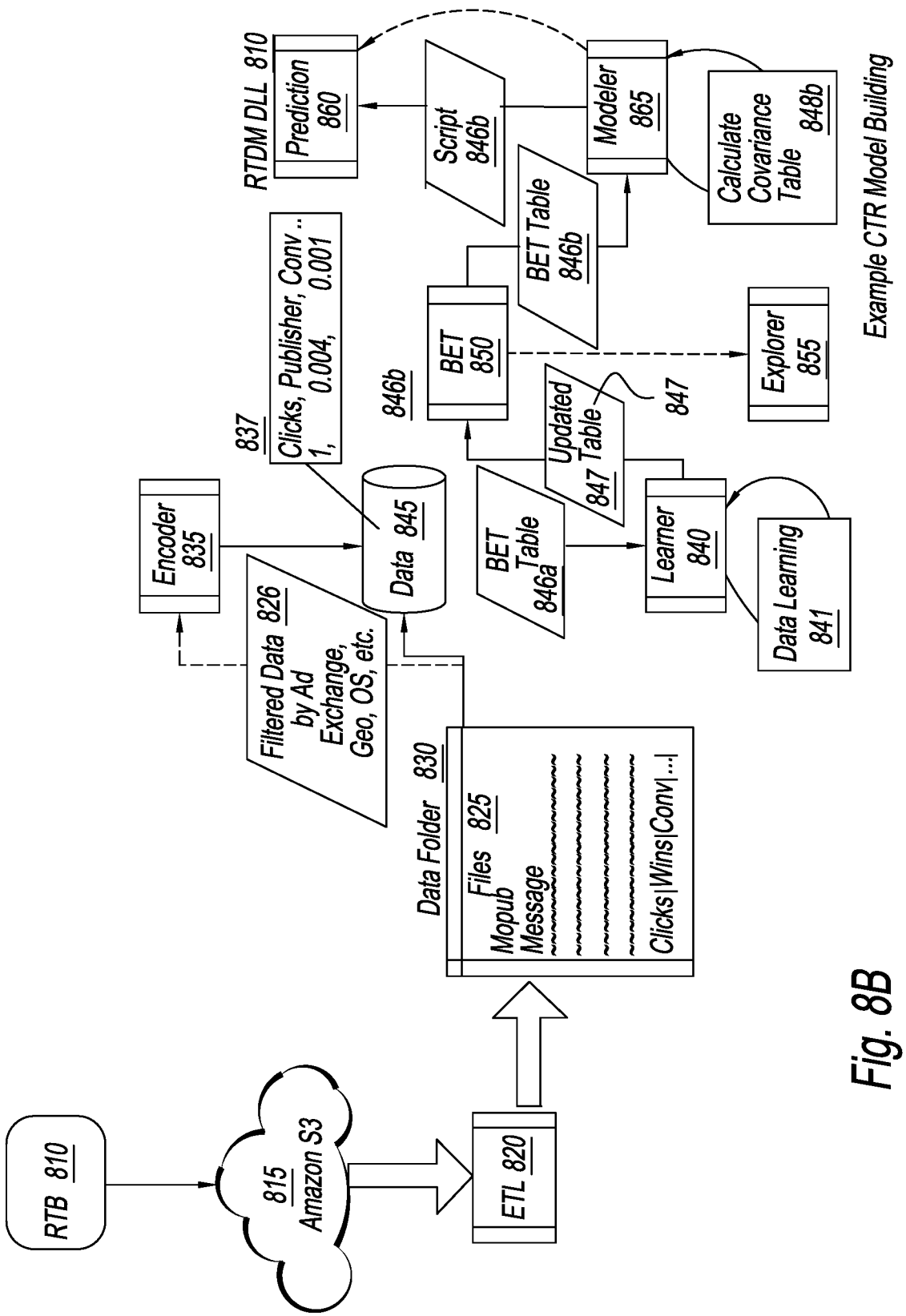
FIG. 8B provides an exemplary combined data and logic flow diagram illustrating aspects of building a CTR model based on RTB bid request input within embodiments of the DLA.

In one implementation, the RTLM class 660 may obtain model script 657b (e.g., the model scripts may comprise a regression formula with a plurality of regression coefficients, as discussed in FIG. 8B, etc.) from the model database as a result of the query 657a. In one implementation, the RTLM class 660 may instantiate and run the model to calculate an assessment score 658, and return the score 659b to the RTB platform 625 for bid generation. For example, an example listing of a score response message 659b including a generated score, substantially in the form of XML-formatted data, is provided below:

POST/score_response.php HTTP/1.1
Host: www.DLA.com
Content-Type: Application/XML
Content-Length: 867
<? XML version="1.0" encoding="UTF-8" ?>
<score_response>
  <session_id>4SDASDCHUF ^GD& </session_id>
  <timestamp>2014-02-22 15:22:48</timestamp>
  <advertiser_id>0023</advertiser_id>
  <advertiser_name> FreeDev.com </advertiser_name>
  <publisher_id> TN001</publisher_id>
  <publisher_url>www.todaynews.com </publisher_url>
  . . .
  <metric> CTR </metric>
  <score>0.04</score>
  . . .
</score_response>

Figure 7A:
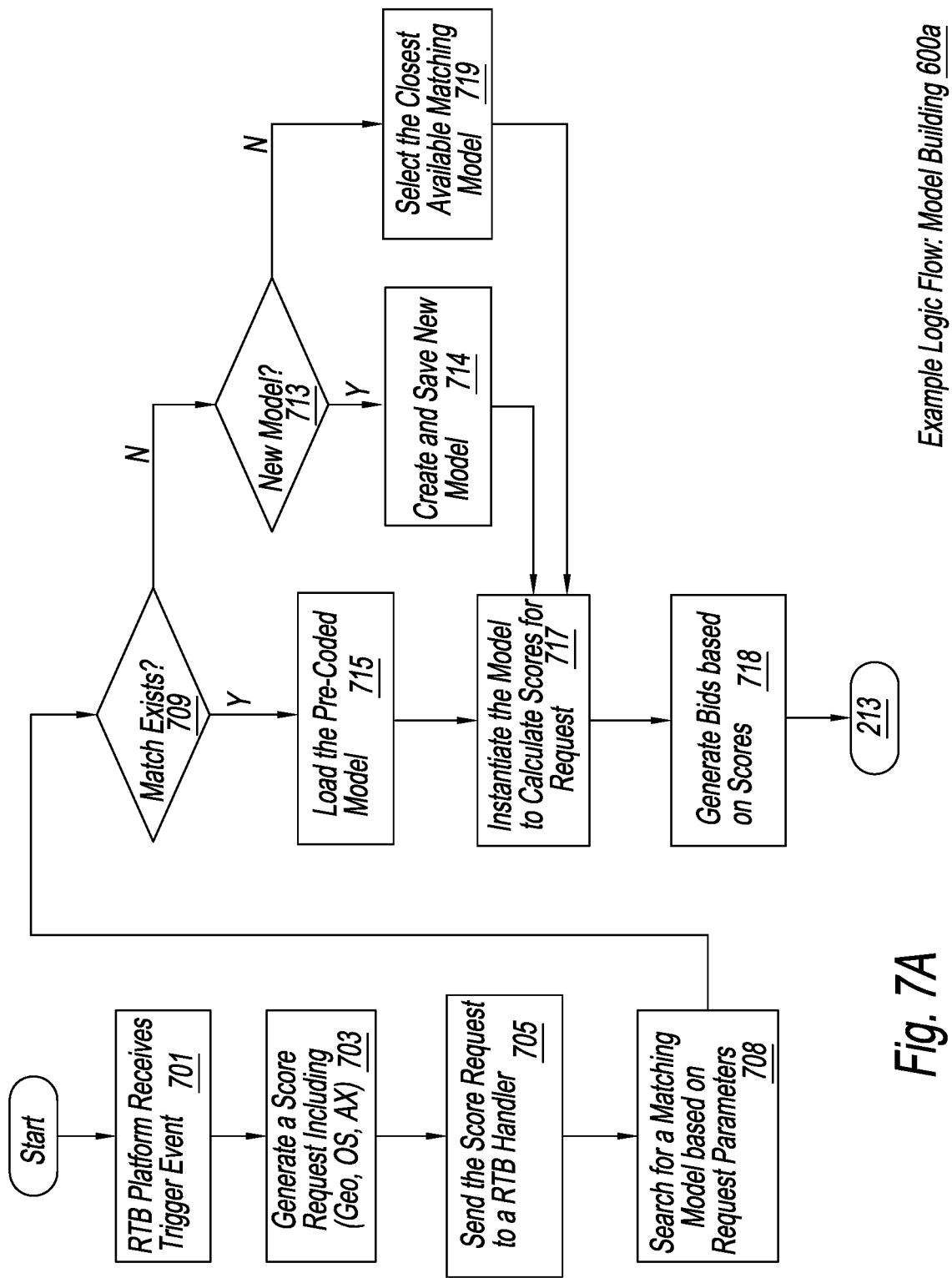
FIGS. 7A-7B provide logic flows illustrating alternative embodiments of model building 600a-b within embodiments of the DLA.
Figure 7B:
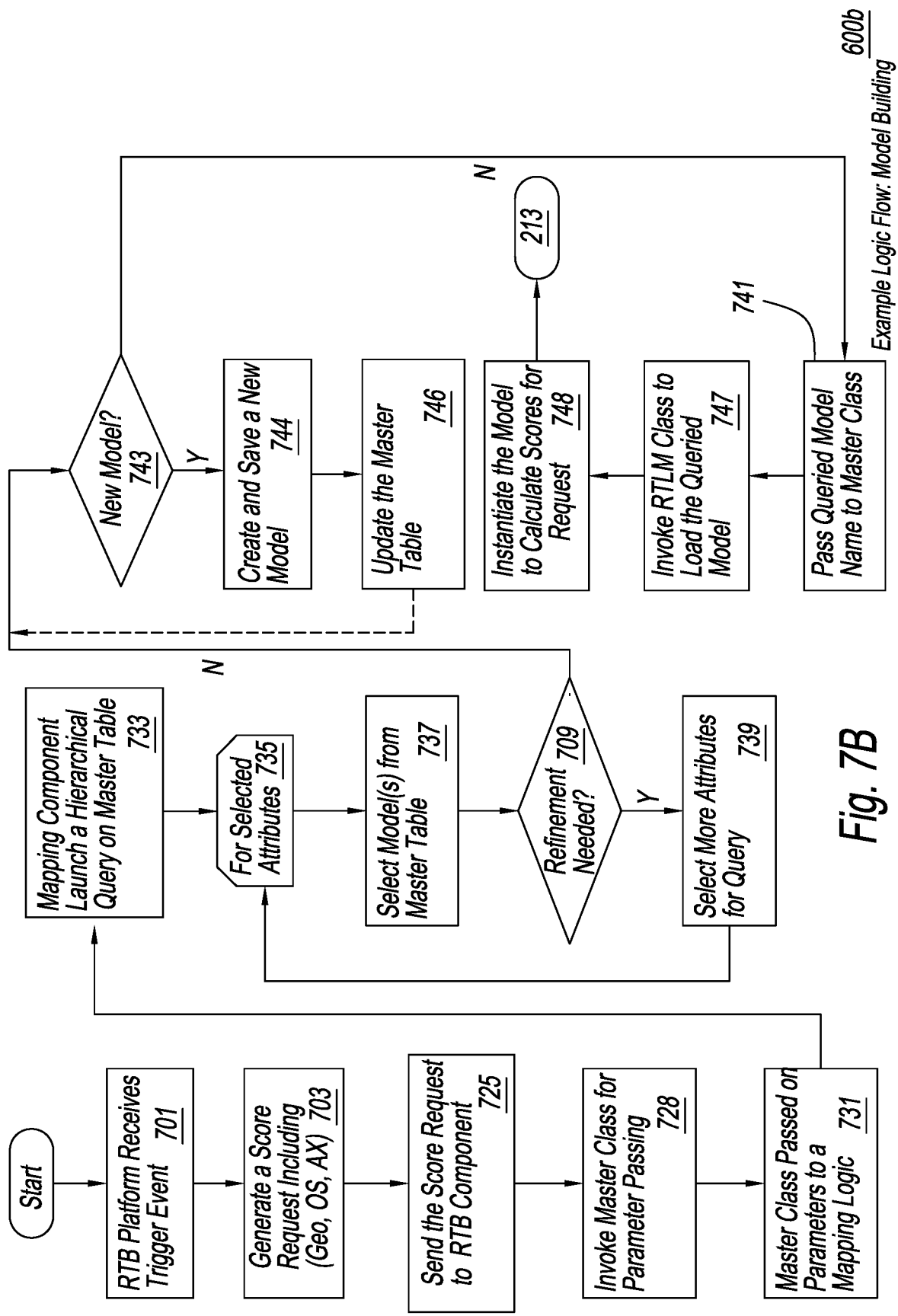

FIGS. 7A-7B provide logic flows illustrating alternative embodiments of model building 600a-b within embodiments of the DLA. With reference to FIG. 7A, the DLA may receive a trigger event 701 from a mobile ad exchange, e.g., when an Internet user attempts to load a publisher page, etc. The DLA may generate a score request which may include the attributes mobile ad exchange name, OS type, geo-location, and/or the like 703, and send such score request to a RTB handler 705. The RTB handler may search for a matching model based on the parameters in the score request 708. If a matching model exists 709, the DLA may load the pre-coded model stored in the model database 715. If not, the DLA may determine whether to build a new model 713 based on the parameters in the score request. If a new model is to be build, the DLA may create and save a new model 714, e.g., see FIGS. 9A-9B. Otherwise, the DLA may select the closest available matching model 719, e.g., by relaxing one or more parameter constraint in the query.

In one implementation, the DLA may instantiate the obtained model to calculate an assessment score for the scoring request 717, and generate a bid based on the score 718.

With reference to FIG. 7B, the DLA may employ a customized dynamic model updating mechanism for model building and selection 600b. In one implementation, continuing on with 703, the DLA may send the score request to a RTLM component 725, which may invoke a master class component for parameter passing 728. For example, the master class may pass on the parameters in the score request to a mapping logic component 731, which may launch a hierarchical query on a master table 733 for a model name.

For example, for each selected attribute 735, the DLA may select and query a model(s) from the master table 737. In one implementation, if more than one model names are returned (e.g., when the query conditions are overly loose, etc.), the DLA May determine whether a refinement is needed 738. If yes, the DLA may select more attributes to refine the query result 739. For example, when the DLA queries on the ad exchange name, OS type, and the geo-location, there may be more than one models that satisfy "mopub," "Android" and "New York." The DLA may further add query terms such as target parameters, user demographics, etc., to narrow down the query results.

In one implementation, if the model query does not return a result, the DLA may determine whether a new model 743 is to be built. If yes, the DLA may create and save a new model 744 to the model database, and update the master table 746 with a new model name. If no new model is necessary 743, the DLA may pass the queried model name to the master class 741, which may invoke a RTLM class to load the queried model 747 from a model database, and instantiate the model to calculate an assessment score 748.

FIG. 8A provides a data diagram illustrating exemplary aspects of a DLA predictive model attribute hierarchy within embodiments of the DLA. Within embodiments, DLA may retrieve a model from the model database, e.g., a model class table 800, based on the attributes included in the bid request. In one implementation, the DLA may identify a category of the model based on desired model target 801. For example, a CPM model 801a may target at optimizing the cost-return per ad impression; a CTR model 801b may target at optimizing the click through rate of the ad; a CPC model 801a may target at optimizing the cost per click, pay per click to seek for an optimal price for the ad; and a CPA model may target at a combination of various parameter attributes such as ad conversion (whether a user proceed to buy or perform the desired action from the ad), install (e.g., a user downloads and installs an advertised app, etc), and/or the like. In one implementation, the CPM/CTR/CPC/CPA models 801a-d may serve as the fundamental models, based on which DLA may generate new customized models upon client (advertiser) requests. For example, DLA may combine different attributes as target parameters, such as, but not limited to targeted demographic groups, targeted geo-location, targeted device users, and/or the like. In further implementations, the DLA may generate and instantiate a predictive model based on a combination of one or more fundamental models 801a-d.

In one implementation, a DLA predictive model may be segmented by mobile ad exchange type 802, e.g., a bid request notifying that a user is loading a webpage may be supplied from different RTB ad exchange, such as but not limited to Mopub 802a, Nexage 802b, Smaato 802c, Admeld 802d, and/or the like. The DLA May retrieve a category of models based on ad exchange type 802 accordingly.

In one implementation, a DLA predictive model may be further segmented by the mobile OS type 80e, e.g., a bid request notifying that a user is loading a webpage may include information about the OS type associated with the user device, such as but not limited to Apple IOS 803a, Microsoft Windows 803*b*, Android 803*c*, BlackBerry OS 803*d*, and/or the like. The DLA may retrieve a category of models based on OS type 803 accordingly.

In a further implementation, a DLA predictive model may be further segmented by ge-location 804, e.g., a bid request notifying that a user is loading a webpage may indicate the geo-location of the user and/or user device (e.g., based on the IP address, cellular triangular location, GPS coordinates, etc.), such as but not limited to New York 804*a*, Chicago 804*b*, Houston 804*c*, and/or the like. In one implementation, the geo-location attributes may be represented by a geo-political district, a zip code, etc. . . . In another implementation, the geo-location may be represented by a range of IP address, GPS coordinates, and/or the like. The DLA may retrieve a category of models based on the geo-location 804 accordingly.

In further implementations, the DLA predictive models may be further segmented based on various model attributes 805, such as, but not limited to user previously search terms, user conversion rate, user browsing patterns, user social media activities (e.g., "likes" on Facebook, hashtags in Tweets, etc.) and/or the like.

In one implementation, the predictive model selection and instantiation may be performed in a progressive manner. For example, the DLA may select and instantiate a model to generate a mobile bid for RTB (e.g., see 215 in FIG. 2). The DLA may then monitor the performance of the ad, e.g., the ad conversion rate. For example, if the mobile ad features a test drive of a new make of a brand-name automobile, DLA may monitor the number of new test drives during a period of time (e.g., 3-4 days, etc.) subsequent to the ad placement. In one implementation, the DLA may calculate the CPM/CTR/CPC/CPA value of such ad placement during this period of time, and determine whether the ad placement meets the target goal per its calculated CPM/CTR/CPC/CPA values. If the mobile ad is satisfactory, DLA may build a handler (e.g., see 641 in FIG. 6) for the selected model, and launch the ad campaign (e.g., the test drive campaign) based on the model, which may generate predictive ad performance analytics accordingly.

In one implementation, the ad campaign predictive models may be stored, modified and re-used by other campaigns. For example, DLA may further segment predictive models based on ad campaign type, product/service industry, campaign length, and/or the like, so that similar ad campaigns may re-use a predictive model. For example, a mobile ad campaign for "Marriot Hotel Christmas Season" may adopt a model previously used for "Ritz Carlton Hotel Christmas Season," and/or the like.

FIG. 8B provides an exemplary combined data and logic flow diagram illustrating aspects of building a CTR model based on RTB bid request input within embodiments of the DLA. Within embodiments, as previously discussed in more detail in FIG. 4B, a RTB platform 810 may send a stream of bidding requests and impression data to a cloud, e.g., the Amazon S3 815, for data collection, wherein the Amazon S3 storage cloud may in turn provide impression data and the bid request to an ETL component 820. For example, the raw impression data from the Amazon S3 cloud may include a series of impression event data (e.g., with a timestamp) including various data parameters such as, but not limited to mobile ad exchange names, user click events, ad bid wins, user conversion events, user browsing counts, user mouse-place-over event, and/or the like.

In one implementation, the ETL component 820 may extract relevant data input from the Amazon S3 cloud, transform and load it with a specific data format into a data folder 830. For example, an example data file 825 saved in the target data folder may be categorized as "data messages from Mopub," which may include user clicks, bid wins, conversion events, and/or the like.

For example, in one implementation, for CTR model building, the formatter data file 825 may include a data table similar to the following:

TABLE 1

Exemplary Data File 825

| Timestamp | Click | Win/Loss | Conversion | . . . |
|---|---|---|---|---|
| 19:45 Jan. 1, 2014 | N | L | N | . . . |
| 19:56 Jan. 1, 2014 | Y | W | N | . . . |
| 19:58 Jan. 1, 2014 | Y | W | Y | . . . |
| . . . | . . . | . . . | . . . | . . . |

Within implementations, the formatted data files 825 may be filtered based on desired data attributes, e.g., by the specified ad exchange, user geo-location, and user device OS type, included in the bid request (e.g., see 427 in FIG. 4B) from RTB. In one implementation, the data filter may employ a hierarchical mechanism similar to that described in FIG. 8A to filter the data in the data folder 830.

In one implementation, the filtered data 826 may take a similar form and comprise similar parameters as that in the original streams of impression data 825, but only with the CTR model desired attributes, e.g., ad exchange, geo-location and OS type, etc. In one implementation, such filtered data 826 may be fed to a data encoder 835 for encryption. Within implementations, the encoder 835 may be applied for textual data included in the data file 825. For example, the data file 825 may include publisher information, which may have various textual contents. In one implementation, the encoder may change the textual content into numerical representations, e.g., by converting a textual description of the publisher into "publisher 1," "publisher 2," etc. The encoder 835 may translate the textual publisher content to a numeric value, e.g., Neflix to 0.004 (which may be the CTR rate of the publisher, etc.). The encoder 835 may encode and categorize publishers so that publishers of similar ad CTR rates may be grouped together, and in this way DLA may treat different publishers with similar ad CTR rates with equal weights. Within implementations, the encoder 835 may adopt different encoding procedures, which may differ for different models.

In this example, for CTR models, the CTR rates of each publisher may be used as the encoding result of a publisher identifier. As another example, for a CPC model, the CPC value of each publisher may be used as the encoding result of a publisher identifier so that publishers of similar CPC value may be grouped together. As further examples, values of various target parameters, such as frequency, action rate, conversion rate, etc., may be used for encoding, which may reflect the model target of ad click counts, the action counts, the conversion counts, and/or the like.

In one implementation, the encoder 835 may forward the encoded data to a data processing unit 845, wherein the encoded data includes data fields all in numeric values. For example, an exemplary encoded data table may take a form similar to the following:

TABLE 2

| Encoded Data | | | |
|---|---|---|---|
| Click | Publisher | Conversion | ... |
| 1 | 0.004 | 0.001 | ... |
| 2 | 0.004 | 0.0012 | ... |
| 3 | 0.004 | 0.0008 | ... |
| ... | ... | ... | ... |

In one implementation, as shown in FIG. 8C, the data processing unit 845 may transform the encoded data 837 into an orthogonal matrix, e.g., the basic element table (BET) table 846a having a row and a column for each of the data parameter in the encoded data table 837. In one implementation, the intersection of each row and column of 846a may represent a cell in which a set of combination of the variables from the encoded data 837 in the respective row and column may be accumulated.

FIG. 8C provides an exemplary BET table 846a calculated by the data processing unit 845 within embodiments of the DLA. As shown in FIG. 8C, in one implementation, for each paring of variables (e.g., the intersections of the columns and rows). The value of each cell, $N_{ij}$ represents a count of the number of joint occurrences of the two variables $X_i$ and $X_j$. In one implementation, $N_{ij}$ may be calculated via the following formula:

$$N_{ij} = \Sigma X_i + \Sigma X_j + \Sigma X_i X_j + \Sigma X_i^2 + \Sigma X_j^2 + \Sigma (X_i X_j)^2$$

The combination $\Sigma X_i$ represents a summation of all values of the first variable $X_i$, which may be one of the attribute parameters in the encoded data 837 (e.g., clicks, conversion rate, win/loss status, etc.). The second quantity $\Sigma X_j$ represents the total of all values of the second variable $X_j$, which may be another attribute parameters in the encoded data 837 (e.g., clicks, conversion rate, win/loss status, etc.). The third quantity $\Sigma X_i X_j$ represents the summation of the products of two variables. It is noted that the summation "$\Sigma$" represented adding all available variables from the encoded data streams as shown in Table 2, e.g., for variable "clicks," the summation would be adding the three values of "clicks" in the first column of Table 2.

Within implementations, the combination of variables in each cell as shown in FIG. 8C is additive, and accordingly may be computed incrementally. For example, for a stream of variables [1,2,3] for $X_1$, which represents "clicks" in the encoded data 837, the summation would be calculated as $\Sigma X_1 = 1+2+3=6$. If variables are obtained from two collections of impression data, e.g., [1] and [2,3], e.g., the impression data may be collected at different timestamps, different ad exchanges, etc., then the summation may be calculated separately for each sub-collections [1] and [2,3]. As such, the summation of variables may be computed incrementally for successive data variables obtained at different timestamps.

In general, the combinations of parameters accumulated should have the property that given a first and second collection of data, the value of the combination of the collections may be efficiently computed from the values of the collections themselves. In other words, the value obtained for a combination of two collections of data may be obtained from operations on the value of the collections rather than on the individual elements of the collections.

It is also contemplated that the above summations/combinations as shown in FIG. 8C have the property that given a collection of data and additional data, which can be combined into an augmented collection of data, the value of the combination for the augmented collection of data is efficiently computable from the value of the combination for the collection of data and the value of the combination for the additional data. This property allows combination of various collections of measurements.

Within implementations, successive data measurements may be added incrementally to the BET table 846a since the calculation for a new set of data is equal to the sum of the new variables for an old set data with the BET table entries 846a of the additional data. Each of the combinations Fused in the BET table calculation 846a have the exemplary property that F(A∪B)=F(A)+F(B) for datasets A and B. In this way, whenever there is new data stream added to the encoded data table 837, the data processing unit 845 does not need to re-generate the entire BET table 846a in order to update, but just needs to add the new data entries to the cells of the BET table 846a which has a form as an orthogonal matrix, and thus the data processing efficiency is improved. As such, the DLA may provide a viable predictive modeling platform to process incoming data streams with zero latency, and may be able to perform various features include, but not limited to:

1. Incremental learning (Learn), e.g., immediately updating a model with each new observation without the necessity of pooling new data with old data;
2. Decremental learning (Forget), e.g., immediately updating a model by excluding observations identified as adversely affecting model performance without forming a new dataset, omitting this data and returning to the model formulation step;
3. Attribute addition (Grow), e.g., adding a new attribute (variable) on the fly, without the necessity of pooling new data with old data;
4. Attribute deletion (Shrink), e.g., immediately discontinuing use of an attribute identified as adversely affecting model performance;
5. Scenario testing, e.g., rapid formulation and testing of multiple and diverse models to optimize prediction;
6. Real-Time operation, e.g., instantaneous data exploration, modeling and model evaluation;
7. In-Line operation, e.g., processing that can be carried out in-situ (e.g., in a mobile device, in a satellite, etc.);
8. Distributed processing, e.g., separately processing distributed data or segments of large data (that may be located in diverse geographic locations) and re-combining the results to obtain a single model;
9. Parallel processing, e.g., carrying out parallel processing extremely rapidly from multiple conventional processing units (multi-threads, multi-processors or a specialized chip).

Figure 9A:
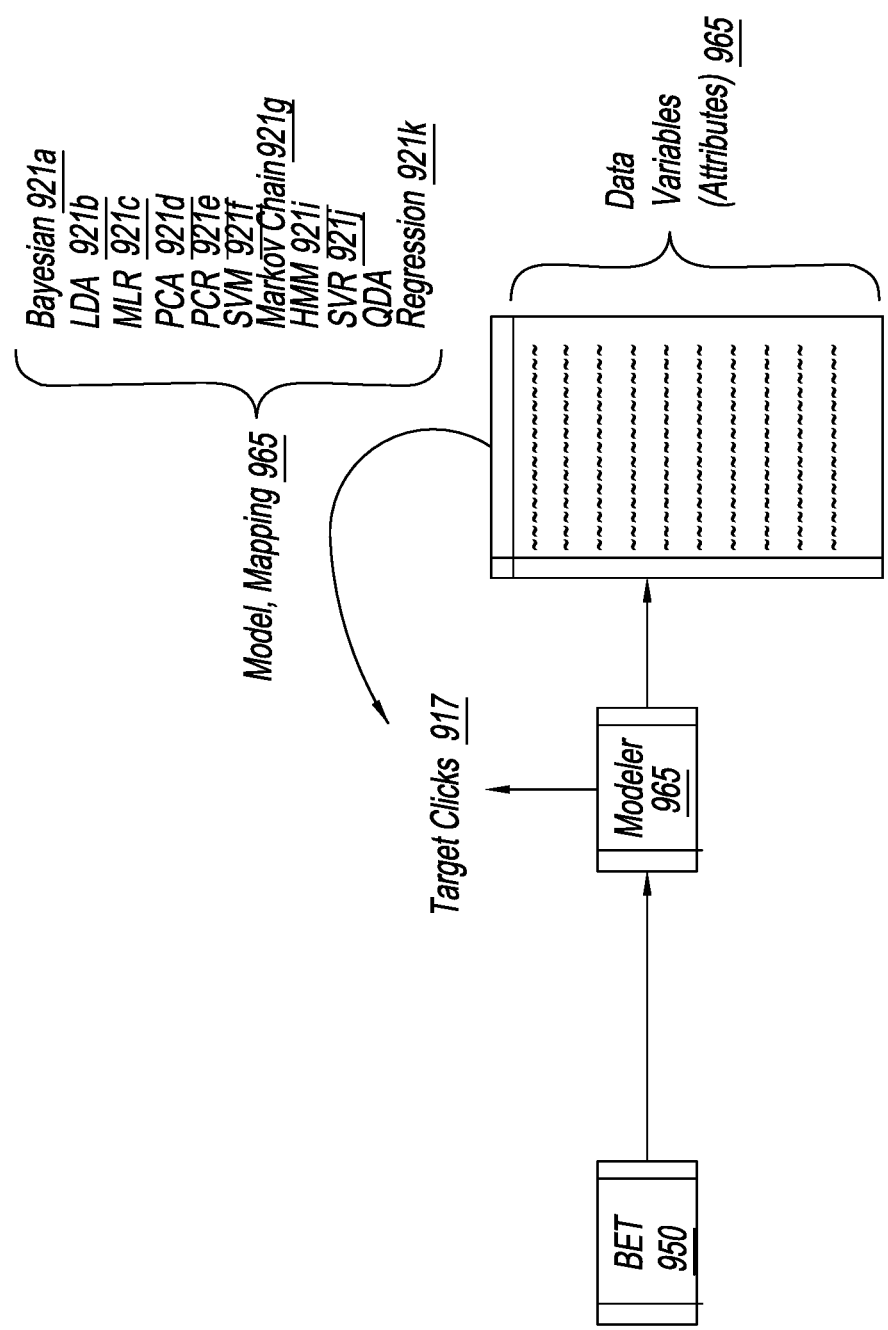
FIG. 9A provides an exemplary flow diagram illustrating aspects of a modeler 965 providing prediction mapping results based on various classification models within embodiments of the DLA.
Figure 9B:
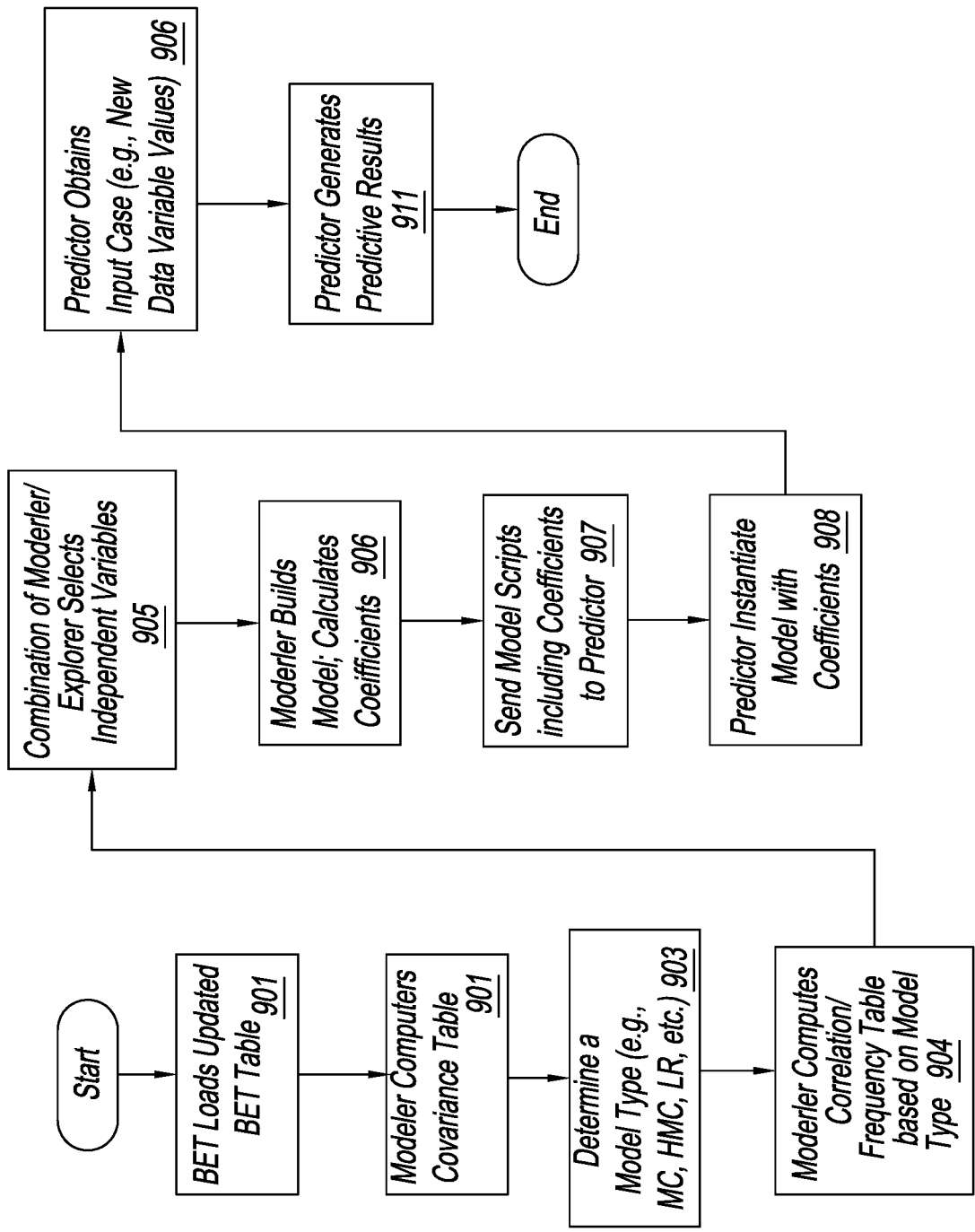
FIG. 9B provide a logic flow diagram illustrating aspects of a modeler regression algorithm for modeling process within embodiments of the DLA.
Figure 9C:
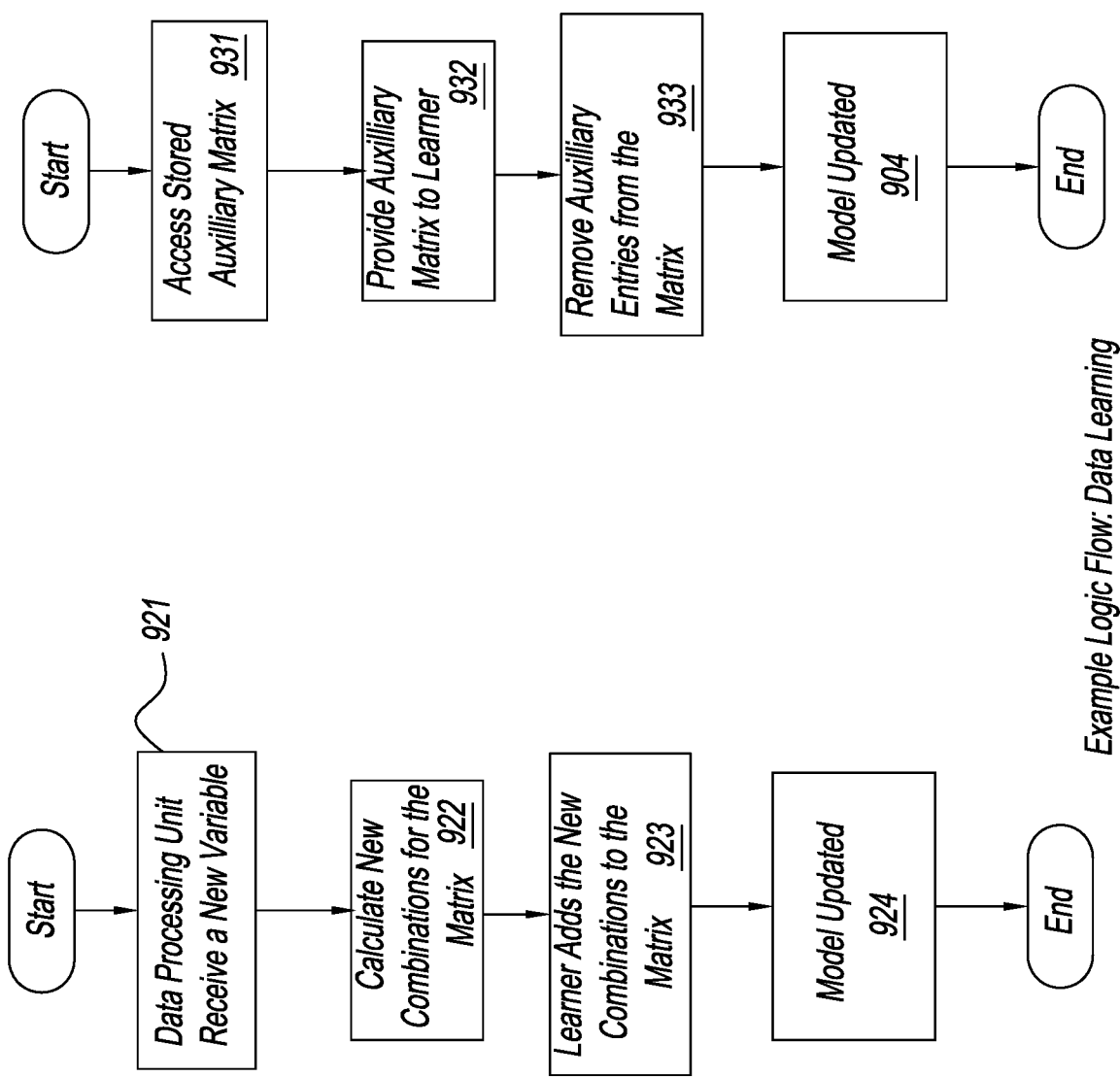

Back to FIG. 8B, the data processing unit 845 may send the calculated basic element table (BET) 846a (e.g., see FIG. 8C) to learner 840, and may update the BET table 847 with BET generator component 850 via the data learning process 841, e.g., the learner 840 may add new data attributes, new data variables to BET table 846b, which may be fed to the modeler 865 for regression, as further discussed in FIGS. 9A-9C. Within implementations, the learner may update data variables, data attributes on an one-by-by basis (e.g., incorporating one new data variable to the BET table, etc.), or in a batch (e.g., incorporating multiple new data variables into the BET table from a data stream, etc.). For example, in one implementation, a new publisher record May arrive at the learner on a one-by-one basis; stock market data may arrive at a batch.

In one implementation, the Modeler 865 may calculate a covariance table 848b based on the updated BET table 846b, e.g., see 902 in FIG. 9B.

Within implementations, the Explorer component 855 may perform statistical analysis of the received data, generating statistical metrics of the variables such as average mean values, standard deviations, covariance, variance, and/or the like. The explorer 855 and modeler 865 may select a subset of optimal variables from the obtained data, and the optimal equation to establish the model, e.g., by determining parameter coefficients of a predetermined model based on the BET table 846a. In one implementation, the modeler 865 may send model scripts 856 (e.g., including coefficient values for a linear regression model, etc.) to the prediction component 860 at RTDM DLL 861 (e.g., see 643 in FIG. 6) to generate predictive results (e.g., click through rates, conversion rates, action rates, etc.). In another implementation, the modeler 865 may connect directly to the prediction model 860, and/or the RTDM DLL component 861.

FIG. 9A provides an exemplary flow diagram illustrating aspects of a modeler 965 providing prediction mapping results based on various classification models within embodiments of the DLA. Within implementations, the modeler 965 may retrieve a dataset of data variables/attributes 918, and map 919 the data variable/attributes 918 via various statistical classifications/models, such as, but not limited to Bayesian 921a, Linear Discriminant Analysis (LDA) 921b, Multiple Linear Regression (MLR) 921c, Principal Component Analysis (PCA) 921d, Principal Component Regression (PCR) 921e, Support Vector Machine (SVM) 921f, Markov Chain 921g, Hidden Markov Chain 921h, Support Vector Regression (SVR) 921i, Quadratic Discriminant Analysis (QDA) 921j, Regression 921k, and/or the like. Within further implementations, the modeler 865 may adopt intelligent versions of other models, including, but not limited to, non-linear regression, linear classification, on-linear classification, robust Bayesian classification, naïve Bayesian classification, Markov chains, hidden Markov models, principal component analysis, principal component regression, partial least squares, and decision tree.

Within implementations, the mapping 819 may generate a predictive estimate of the click through rate 817 (e.g., a probability of a click on the placed ad, etc.) for a CTR model, and respective target predictions for any other models, respectively.

FIG. 9B provide a logic flow diagram illustrating aspects of a modeler regression algorithm for modeling process within embodiments of the DLA. Within implementation, continuing on with the BET loading an updated data variable BET table from the learner 901, e.g., the BET table in the form similar to that depicted in FIG. 8C. The modeler may compute a covariance table (e.g., 848b in FIG. 8B). For example, covariance between two variables $X_i$ and $X_j$ may be calculated according to the following formula:

$$\text{Co var}_{i,j} = \frac{\sum X_i X_j - \frac{\sum X_i \sum X_j}{N_{ij}}}{N_{ij}}$$

In one implementation, the computation of the covariance may be conducted with reduced complexity because each of the covariance value is one of the combinations stored in the BET table 846a at the intersection of row i and column j. As such, computation of the covariance for each pair of the variables may utilize those stored values to reduce processing complexity.

In one implementation, the modeler may load a model and determine the model type (e.g., whether it is a Markov Chain based model, whether it is MLR based, etc.), based on which the modeler may compute a correlation table (e.g., for linear correlation, etc.) and/or a frequency table (e.g., for a Markov Chain based model) 904. For example, a correlation between two variables $X_i$ and $X_j$ may be calculated according to the following formula:

$$R_{i,j} = \frac{\text{Co var}_{i,j}}{\sqrt{\text{Var}_i \text{Var}_j}}$$

Similarly, the computation complexity may be reduced by utilizing stored values of the covariance computed at 902.

In one implementation, the modeler and/or the explorer may select independent data variables as "input" of a regression model 905, and the modeler May obtain coefficients a, $b_1$, $b_2$, $b_3$ for the independent variables $X_1$, $X_2$, $X_3$ in the regression model 906, e.g., $Y = a + b_1 X_1 + b_2 X_2 + b_3 X_3$. In one implementation, the modeler may employ SAS to generate linear regression coefficients in addition to many other implementations. One non-limiting example of SAS code for obtaining regression coefficients a, $b_1$, $b_2$, $b_3$ for the independent variables $X_1$, $X_2$, $X_3$ may be similar to the following form:

PROC REG DATA=&modeldata;
MODEL CTR=click publisher conversion/p clim;
RUN;

In an alternative implementation, the modeler may compute a, $b_1$, $b_2$, $b_3$ based on entries in the correlation table, e.g., $$b_j = R_{i,j}^{-1} R_{y,j} \frac{\sqrt{\text{Var}_y}}{\sqrt{\text{Var}_j}}$$

wherein the value $R_{y,j}$ denotes the covariance between Y and $X_j$.

In one implementation, the modeler may calculate the intercept a by subtraction. In one implementation, the modeler may generate model scripts with the obtained regression coefficients to the predictor 907, which may obtain new inputs of independent variables 908 (e.g., from a bid request 424a in FIG. 4B). The predictor may instantiate a model with the computed coefficients 908, and obtains an input case (e.g., new data variable values from a bid request 424a in FIG. 4B) 909, and generate an estimate of predictive results 911 based on the model $Y = a + b_1 X_1 + b_2 X_2 + b_3 X_3$.

FIGS. 9C-9D provide logic flow diagrams illustrating aspects of the data learning process at a learner component within embodiments of the DLA. Within implementations, as shown in FIG. 9C.(1), when the data processing unit receives new data variable(s) from a new input case 921 (e.g., the data variables may come in streams, etc.), e.g., getting another set of data variables with "clicks," "conversion rate," "publisher," etc., the learner may calculate new combinations for the BET table 922, and due to the additive property of the BET table, learner may add the new combination values to the respective BET table cell 923 without re-starting generating a whole new BET table. In this way, the model may be updated more efficiently with incremental data inputs.

In another example, as shown at FIG. 9C.(2), the learner may access and retrieve a stored auxiliary data BET table 931, which may be a record of previously added data BET table. Alternatively, this may be a record of the data BET table at a specific time. For example, it may be desirable to eliminate the data variables added during a specified period of time, as it may relate to a time-sensitive event which yields the ad impression inaccurate. In one implementation, the auxiliary BET table may be provided to the learner 932. The learner may remove the auxiliary data entries from the BET table by subtracting the auxiliary data entries from the BET table 933, and then update the model 934.

As shown in FIG. 9D, the learner may similarly update the model when there is new data attributes added to the data stream, or may remove certain data attribute type. As shown in FIG. 9D.(1), when the data processing unit receives a new data attribute type 941 (e.g., a new user action type, a new publisher content type such as gaming status of a gaming site, etc.), the data processing unit may determine whether the attribute type is relevant to the desired target model 942. If relevant 943, the learner may expand the BET table 946 by incorporating and adding a new row and a new column for the new data attribute type in the BET table. For example, in one implementation, the data attribute relevancy at 943 may be determined by an existing model type, e.g., each model target CPM/CTR/CPA/CPC, etc., may have an associated list of data attributes. As another example, the DLA may analyze the statistical correlation between the new data attribute and the model target (e.g., CPM/CTR/CPA/CPC, etc.) to determine whether such new data attribute shall be adopted in the model building.

As another example, the DLA may combine two models (e.g., combining a CPM model with a CTR model, etc.), which may be realized by obtaining a new BET table via data learning. For example, the new BET table may be built upon expanding the BET table of the CPM model to include new rows and columns adding new data attributes from the CTR model.

As another example, as shown at FIG. 9D.(2), the learner May determine whether an attribute is relevant for a target model 951. For example, the learner may load a BET table which was built for a CPM model, and may attempt to utilize it for a CTR model. If the data attribute is no longer relevant 952, the learner may contract the BET table by deleting the row and column corresponding to the removed variable, and update the model 954 accordingly.

FIGS. 10A-10D provide various block diagrams illustrating aspects of DLA architecture within embodiments of the DLA. Within embodiments, the DLA platform may comprise a load balancer 1001, e.g., which may receive a bidding event/invite (e.g., see 424a in FIG. 4B, etc.) and distribute the bid request across the data processing center. In one implementation, bidding data (e.g., requests, etc.) May be routed to a front end request handler 1002 including request/response handlers which may be similar to a RTB handler (e.g., see 641 in FIG. 6, etc.) 1002a that serves one or more clients 1002 (e.g., an advertiser, etc.). In one implementation, the request handler 1002a may communicate with a high speed data store 1002c to store impression data, user data, ad data, bidding data, and/or the like.

Within implementations, the DLA platform may employ data enrichment services 1005 to clean, filter and transform raw data collected from the bidding invite, the client, etc. (e.g., similar components may be found at 820, 826 in FIG. 8B, etc.). In one implementation, the DLA platform may further comprise a dynamic and creative advertising platform (e.g., Adacado, etc.) 1006 that facilitates creation, targeting, delivery, measurement and optimization of performance-based mobile ad displays (e.g., see 222-223 in FIG. 2, etc.).

In one implementation, the front end request handler 1002 May communicate with the RTLM component 1003. For example, bid requests 1008 may be maintained at a data queue 1010, during which it may be normalized 1019 and fed into a data learner 1018 to generate BET tables 1016. The BET tables 1016 may be fed to the modeler 1015 and explorer 1017 for model building and prediction rules 1007 generation, as further discussed in FIG. 8B.

In one implementation, the front end handler 1001 may send win/lose bidding responses from mobile ad exchanges to a BI reporting 1020, which may store such bidding record at a storage 1020e to generate business reports 1020a. For example, the reports 1020a may include testing reports 1020b, dashboard/analytics reports 1020c, BI reports 1020d, and/or the like.

In one implementation, the front end handler 1001 may further obtain ad campaign configuration parameters 1011 generated by a campaign management component 1021, which may be either part of the DLA, a third party, and/or a management component at the advertiser. In one implementation, the campaign management may obtain client configurations via application UIs 1024 and provide the configuration parameters into a database 1022, which may be fed to other parties via API calls 1023.

Figure 10A:
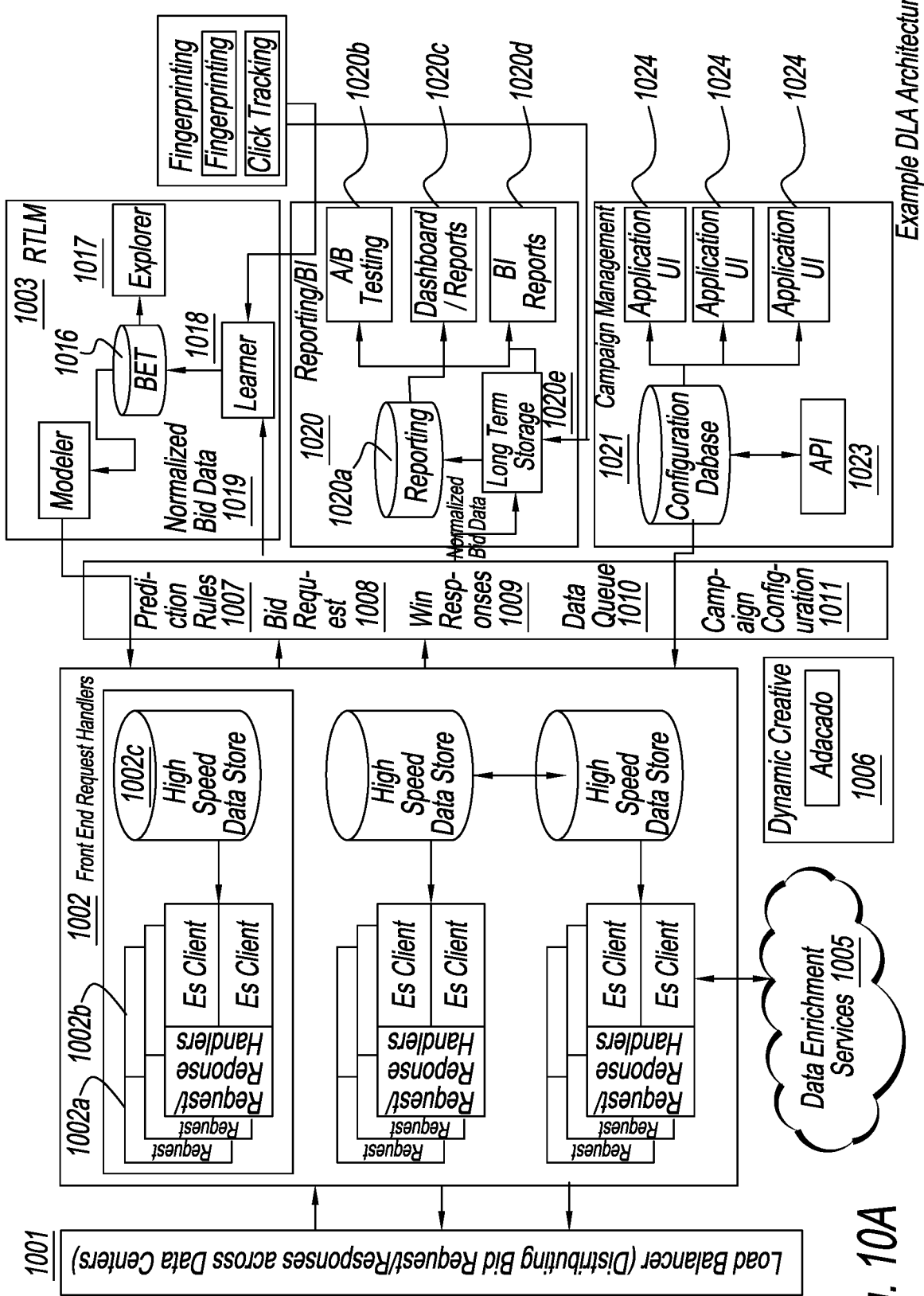
FIGS. 10A-10D provide exemplary block diagrams illustrating aspects of DLA architecture and deployment with various processing networks and data storage elements within embodiments of the DLA.
Figure 10B:
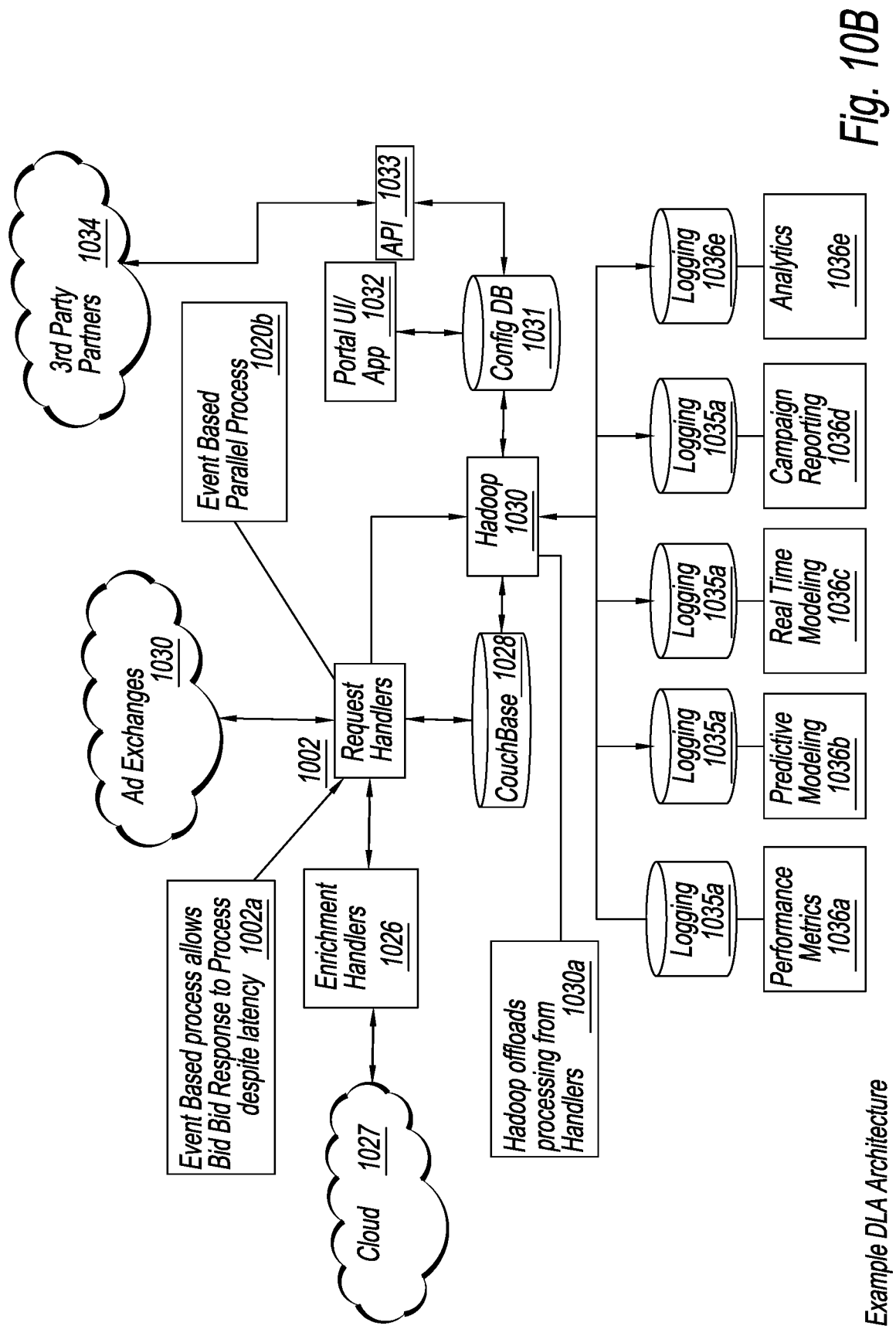

Within another embodiment, as shown at FIG. 10B, the request handler 1002 may obtain bid responses from an exchange 1030, and employ an event based process that allows a bid response to proceed despite latency 1002a. As shown in FIG. 10A, the request handlers 1002 may have multiple units that may carry out event based parallel processes 1002b. Bid responses/requests from the request handlers may be fed to the enrichment handlers 1026, which may upload the cleaned data for cloud storage 1027.

In another implementation, the DLA platform may employ database technologies and distributed data applications to manage the process streams of incoming bidding data, such as but not limited to CouchBase 1028, Hadoop 1030 (e.g., Hadoop may offloads processing from handlers 1030a, etc.), and/or the like. In one implementation, the DLA platform may receive configuration parameters (e.g., for ad campaigns, etc.) from $3^{rd}$ party partners 1034 via API calls 1033, such parameters may be stored at a configuration database 1031, which may be accessed by other parties via an application UI 1032.

Within implementations, the DLA platform may maintain various databases and data tables (e.g., see more details at 1119 in FIG. 11, etc.) such as a logging 1035a database that stores performance metrics 1036a of ads, a modeling database 1035b that stores predictive modeling analytics 1036b, a RTLM database 1035c that stores real-time modeling updates 1036c, a reporting database 1035d that stores campaign reporting 1036d, a BI database 1035e that stores business intelligence reports and analytics 1036e, and/or the like.

Figure 10C:
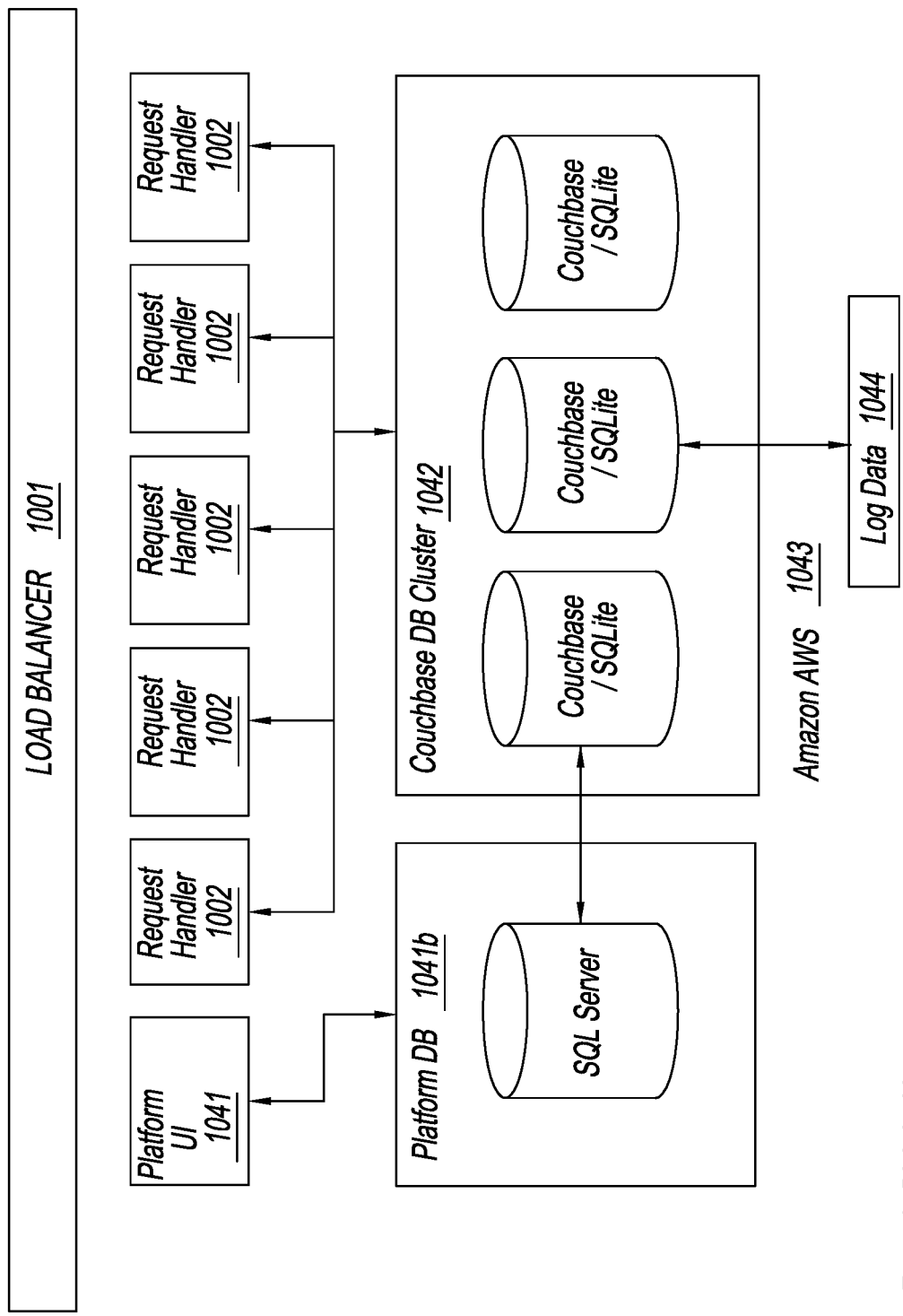

With reference to FIG. 10C, the DLA platform may employ CouchBase databases 1042 to load data from the request handler 1002, as discussed in FIGS. 10A-10B. In one implementation, the platform database 1041b which may be accessed by a platform UI 1041 may employ a SQL server, which communicates with the CouchBase database cluster 1042. In one implementation, log data records 1044 may be uploaded for storage, or obtained from an Amazon cloud service 1043.

Figure 10D:
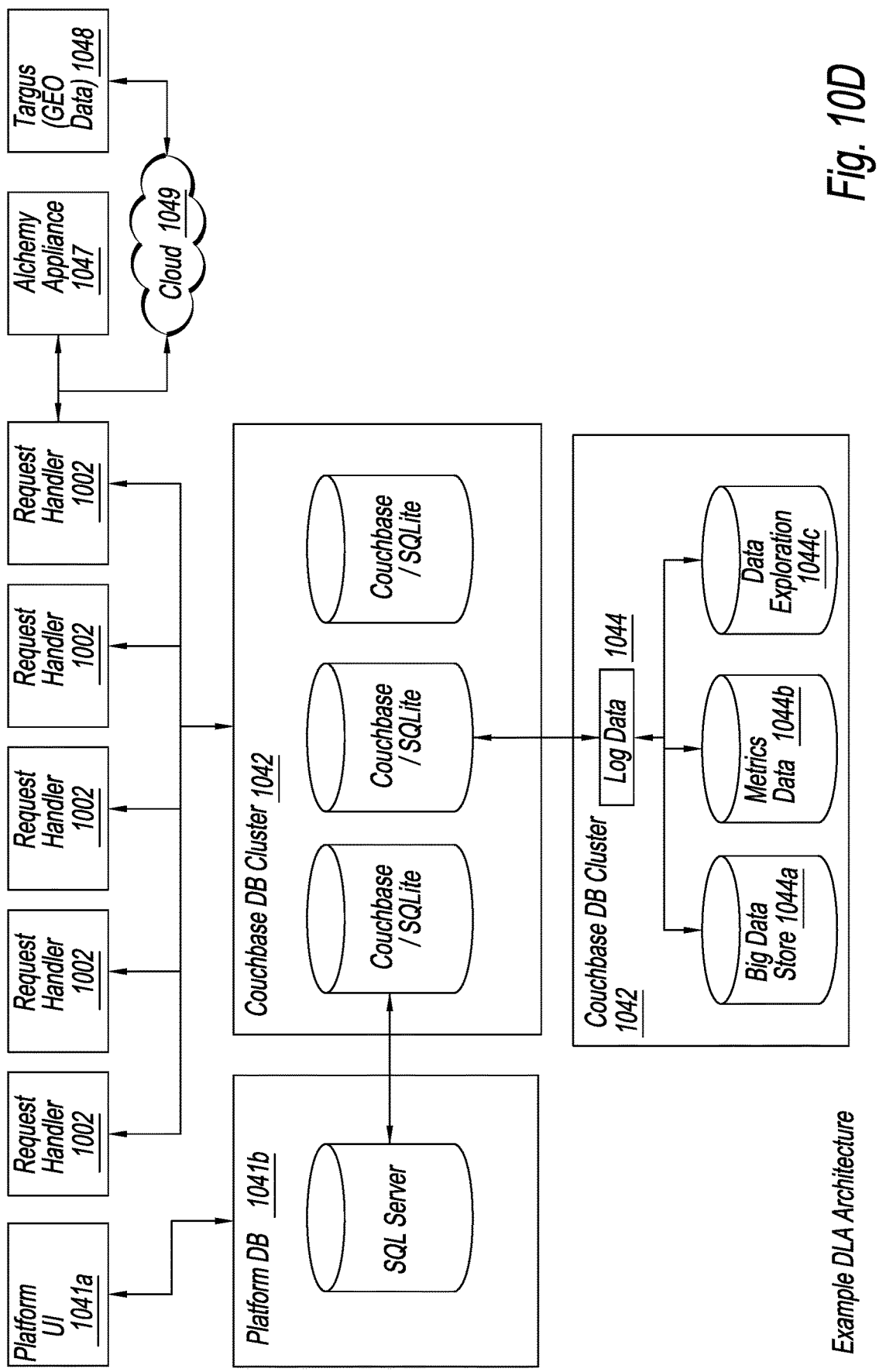

With reference to FIG. 10D, in addition to database servers illustrated in FIG. 10C, the request handler 1002 may communicate with additional third party data services, such as Alchemy Appliance 1047, Targus 1048 (e.g., for geo information, etc.) and/or the like. In one implementation, the data may be obtained or uploaded for storage to a cloud service 1049 (e.g., Google, Amazon S3, etc.).

Figure 11A:
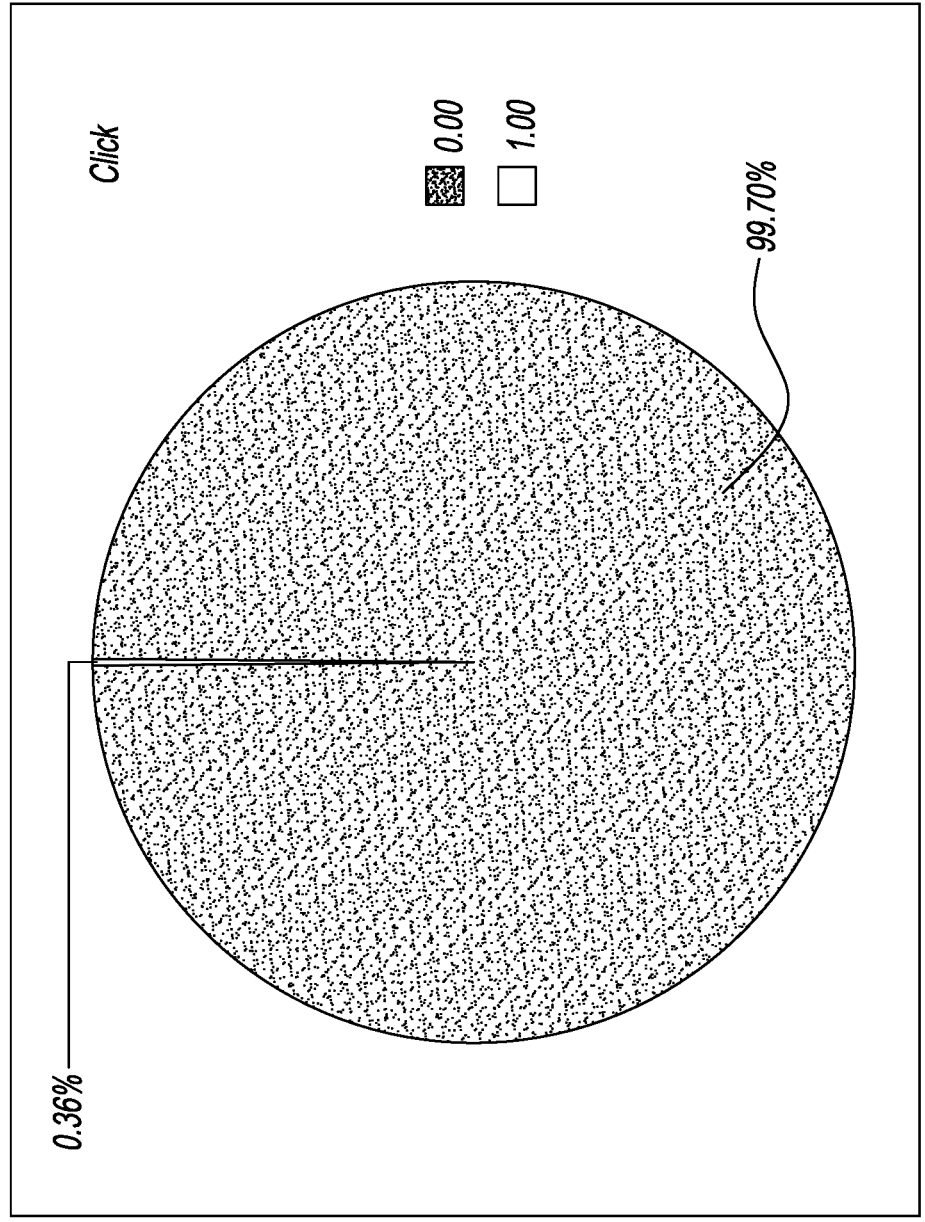
Figure 11B:
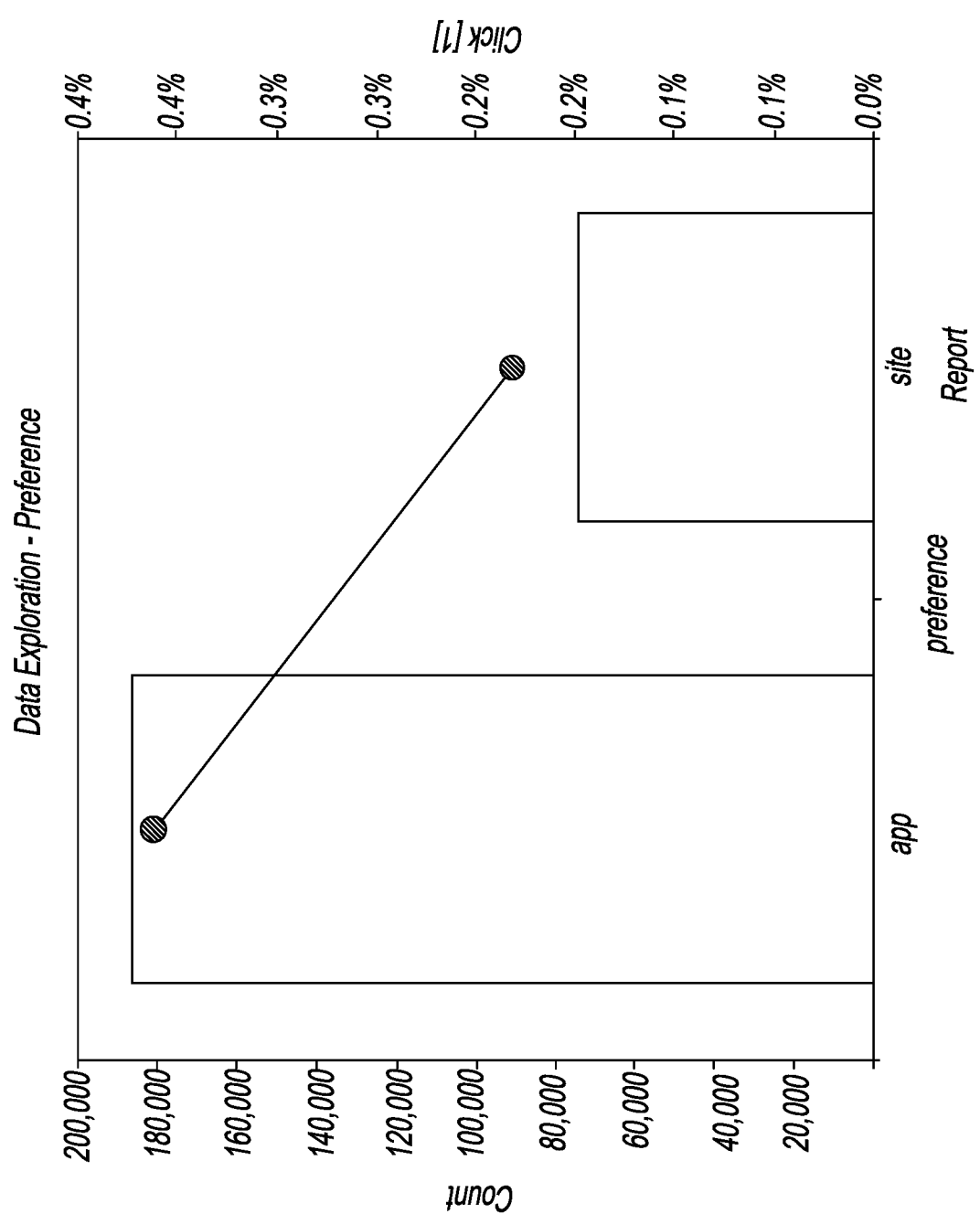
Figure 11C:
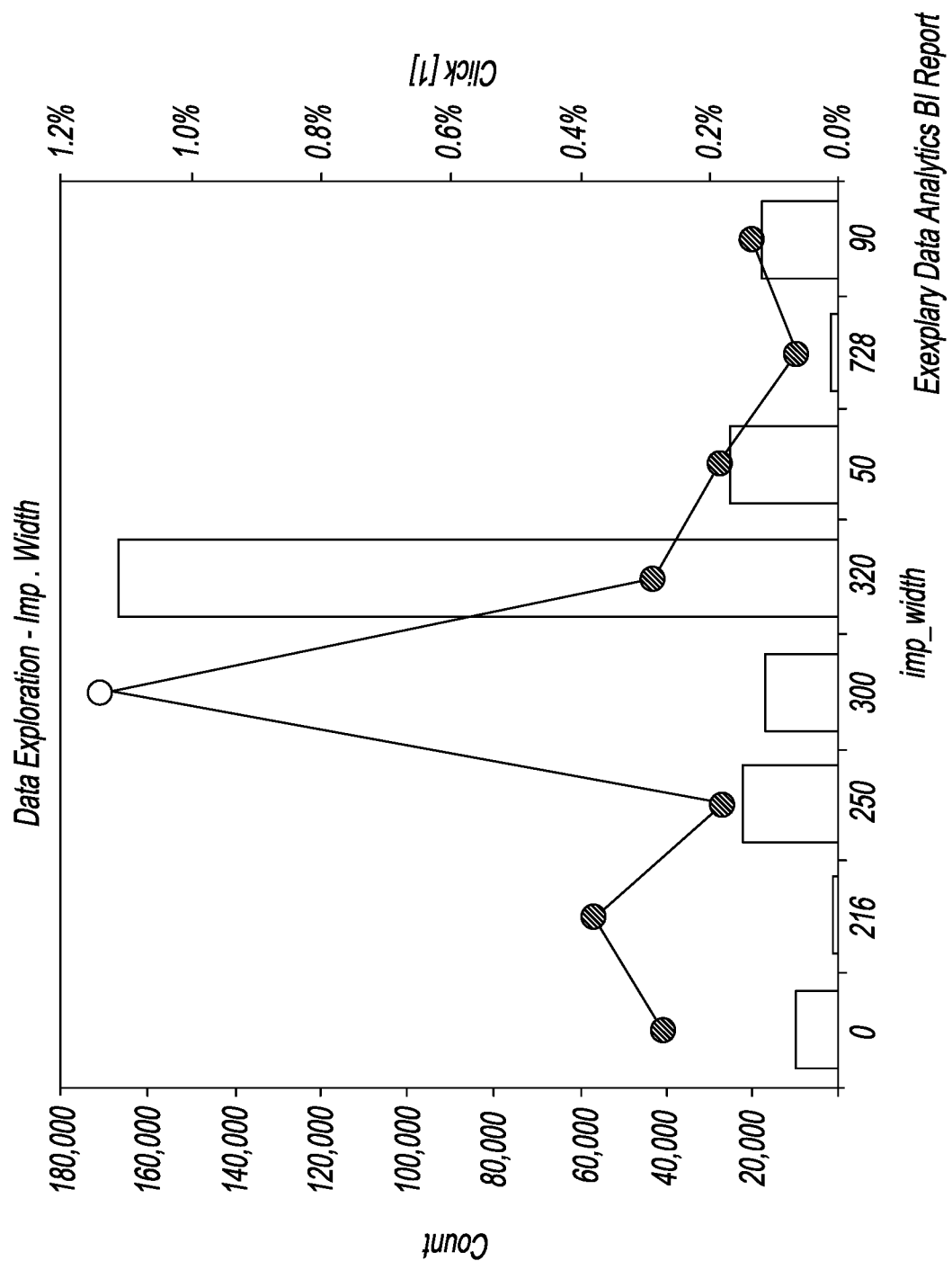
Figure 11D:
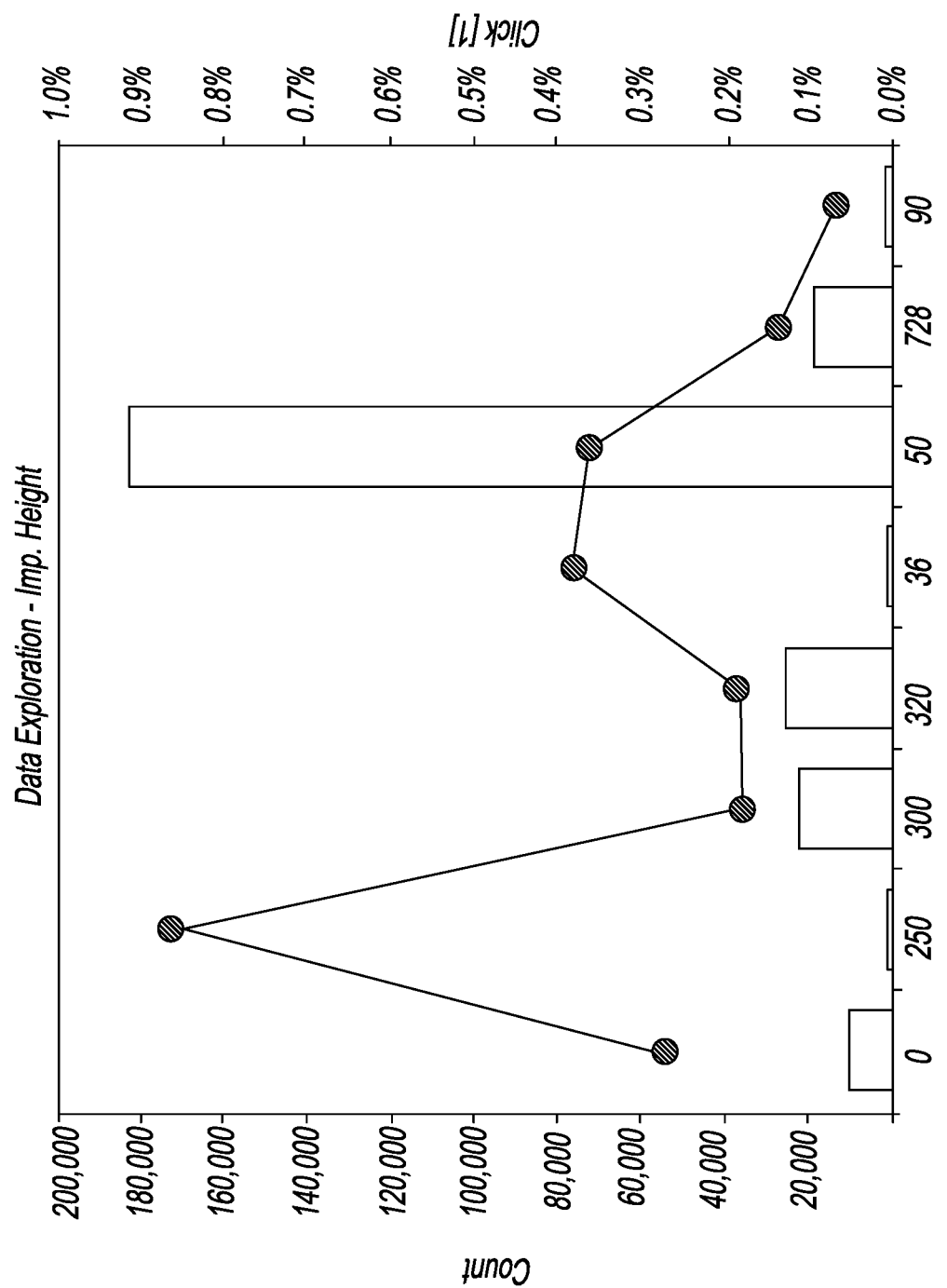
Figure 11E:
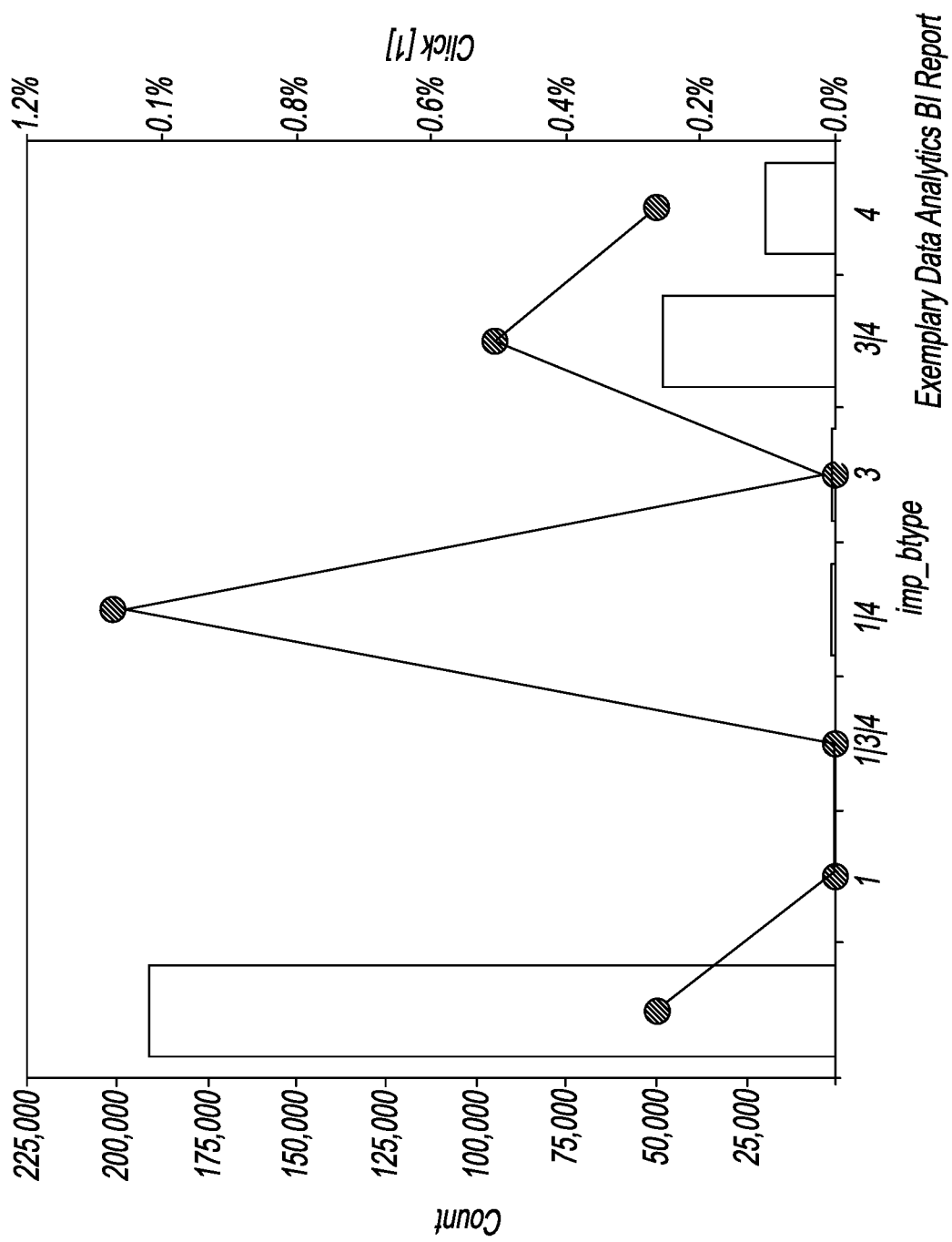
Figure 11G:
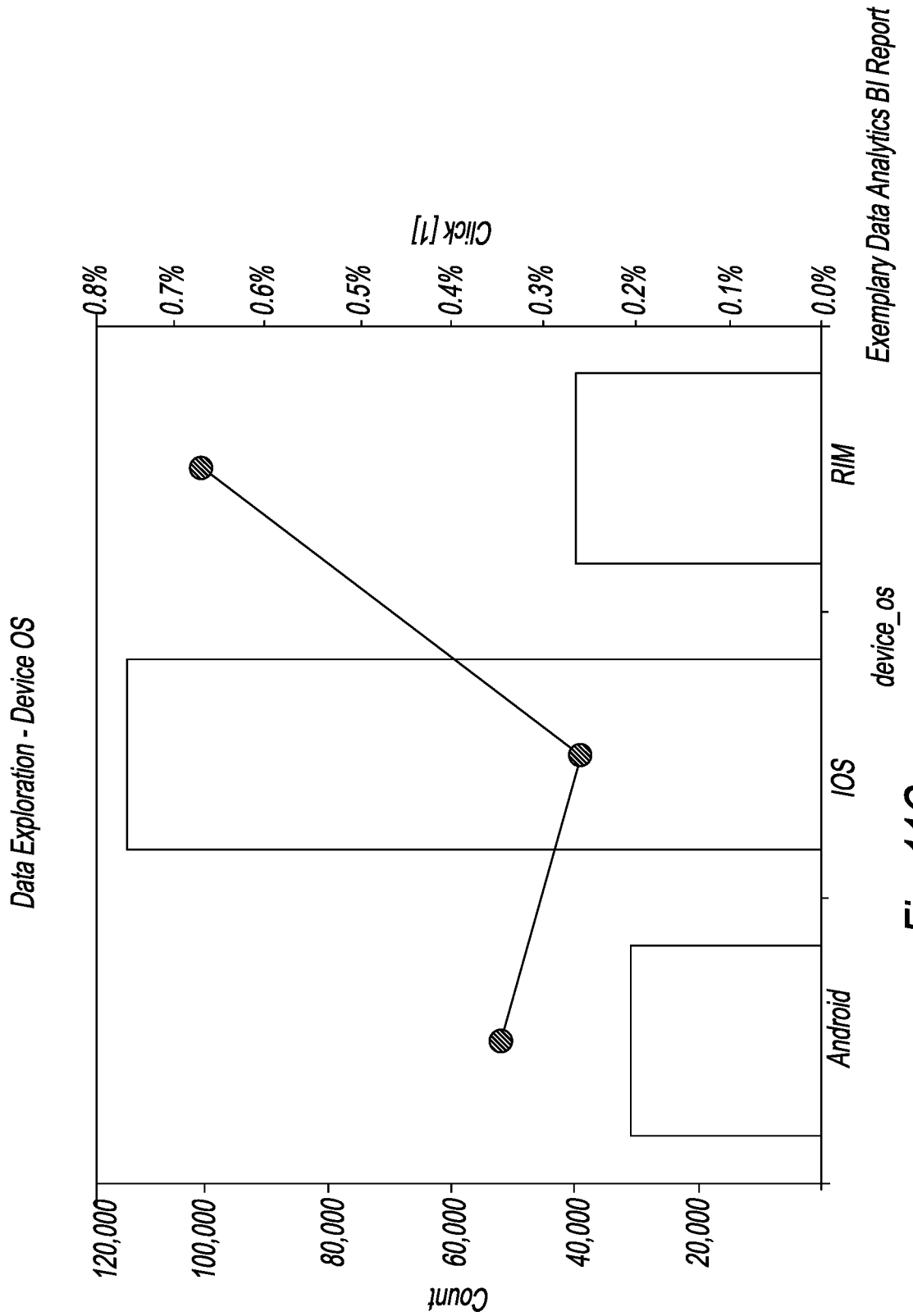

FIGS. 11A-11G provide exemplary screen shots of BI report data analytics within embodiments of the DLA. With reference to FIG. 11A, the exemplary BI reports provide data analytics of clicks of a placed mobile ad, e.g., the red portion may denote clicks that lead to a successful purchase, and the blue portion May denote clicks that do not result in a purchase, etc. With reference to FIG. 11B, the exemplary BI data analytics provide data exploration illustrating consumer preferences, e.g., mobile ads placed with a mobile app versus ads placed within a site, etc. With reference to FIG. 11C, the exemplary BI data analytics provide data exploration illustrating impression width, e.g., the counts, click through rate (ratio per visits, etc.) versus the width of a potential mobile ad. With reference to FIG. 11D, the exemplary BI data analytics provide data exploration illustrating impression height, e.g., the counts, click through rate (ratio per visits, etc.) versus the height of a potential mobile ad. With reference to FIG. 11E, the exemplary BI data analytics provide data exploration illustrating impression type, e.g., the counts, click through rate (ratio per visits, etc.) versus the type of a potential mobile ad (e.g., user click, place mouse over, proceed with the link in the ad, proceed to purchase, and/or any combination of such, and/or the like). With reference to FIG. 11F, the exemplary BI data analytics provide data exploration illustrating gender, e.g., the counts, click through rate (ratio per visits, etc.) versus the gender of the consumers. With reference to FIG. 11G, the exemplary BI data analytics provide data exploration illustrating device OS type, e.g., the counts, click through rate (ratio per visits, etc.) versus the device OS types.

DLA Controller

Figure 12:
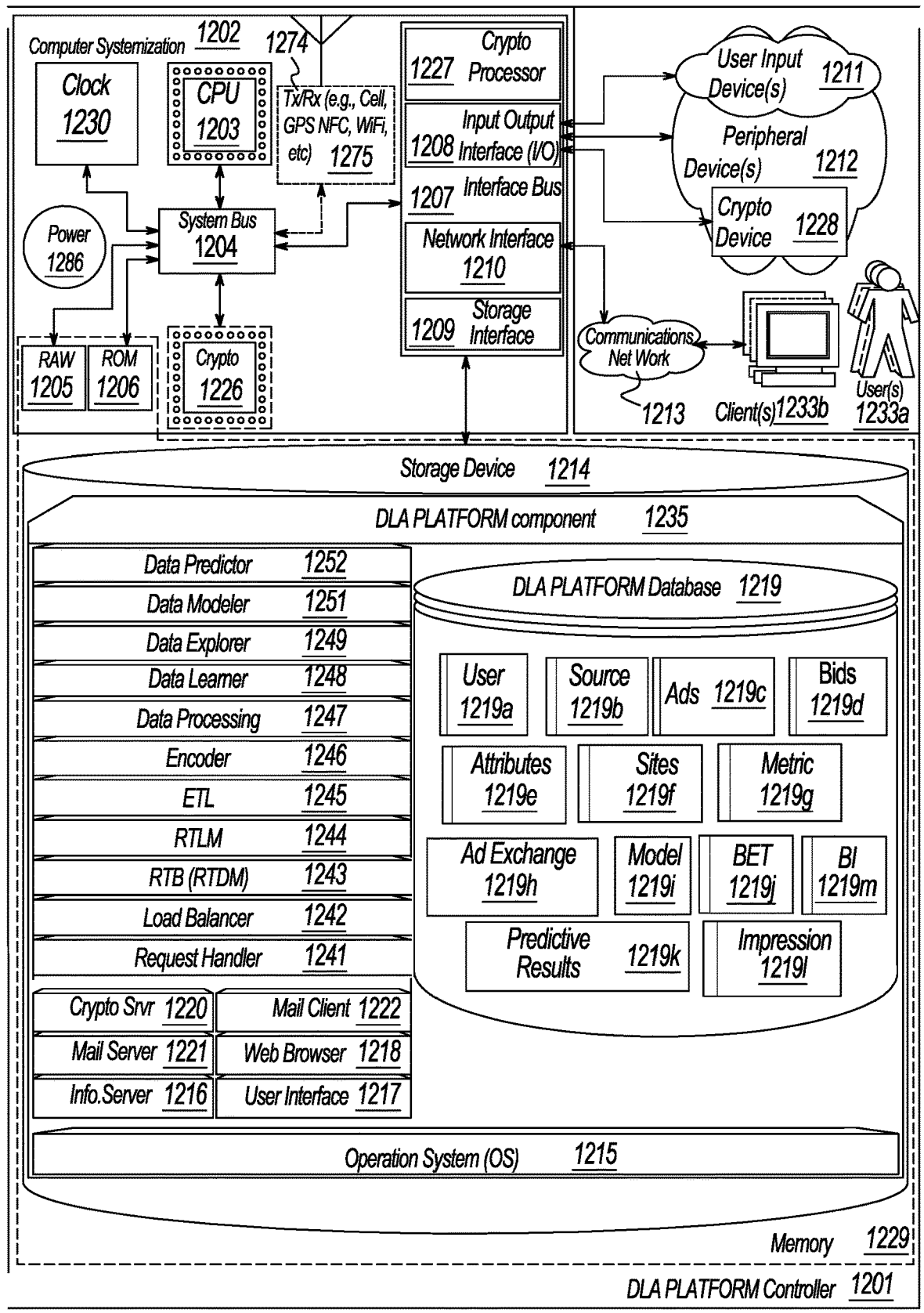
FIG. 12 shows a block diagram illustrating example aspects of a DLA controller.

FIG. 12 shows a block diagram illustrating example aspects of a DLA controller 1201. In this embodiment, the DLA controller 1201 may serve to aggregate, process, store, search, serve, identify, instruct, generate, match, and/or facilitate interactions with a computer through various technologies, and/or other related data.

Users, e.g., 1233a, which may be people and/or other systems, may engage information technology systems (e.g., computers) to facilitate information processing. In turn, computers employ processors to process information; such processors 1203, May be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DLA controller 1201 may be connected to and/or communicate with entities such as, but not limited to: one or more users from user input devices 1211; peripheral devices 1212; an optional cryptographic processor device 1228; and/or a communications network 1213. For example, the DLA controller 1201, May be connected to and/or communicate with users, e.g., 1233a, operating client device(s), e.g., 1233b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DLA controller 1201 may be based on computer systems that May comprise, but are not limited to, components such as: a computer systemization 1202 connected to memory 1229.

Computer Systemization

A computer systemization 1202 may comprise a clock 1230, central processing unit ("CPU(s)" and/or "processor(s)" (these terms are used interchangeably throughout the disclosure unless noted to the contrary))

1203, a memory 1229 (e.g., a read only memory (ROM) 1206, a random access memory (RAM) 1205, etc.), and/or an interface bus 1207, and most frequently, although not necessarily, are all interconnected and/or communicating through a system bus 1204 on one or more (mother)board(s) 1202 having conductive and/or otherwise transportive circuit pathways through which instructions (e.g., binary encoded signals) may travel to effectuate communications, operations, storage, etc. The computer systemization may be connected to a power source 1286; e.g., optionally the power source may be internal. Optionally, a cryptographic processor 1226 and/or transceivers (e.g., ICs) 1274 may be connected to the system bus. In another embodiment, the cryptographic processor and/or transceivers may be connected as either internal and/or external peripheral devices 1212 via the interface bus I/O. In turn, the transceivers may be connected to antenna(s) 1275, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing DLA controller to determine its location)); Broadcom BCM4329FKUBG transceiver chip (e.g., providing 802.11n, Bluetooth 2.1+ EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc., and even specialized processing sub-units like graphics processing units, digital signal processing units, and/or the like. Additionally, processors may include internal fast access addressable memory, and be capable of mapping and addressing memory 1229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor may construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), embedded and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the DLA controller and beyond through various interfaces. Should processing requirements dictate a greater amount speed and/or capacity, distributed processors (e.g., Distributed DLA), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the DLA may be achieved by implementing a microcontroller such as CAST's R8051XC2 microcontroller; Intel's MCS 51 (i.e., 8051 microcontroller); and/or the like. Also, to implement certain features of the DLA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DLA component collection (distributed or otherwise) and/or features may be implemented via the microprocessor and/or via embedded components; e.g., via ASIC, coprocessor, DSP, FPGA, and/or the like. Alternately, some implementations of the DLA may be implemented with embedded components that are configured and used to achieve a variety of features or signal processing.

Depending on the particular implementation, the embedded components may include software solutions, hardware solutions, and/or some combination of both hardware/software solutions. For example, DLA features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects may be programmed by the customer or designer, after the FPGA is manufactured, to implement any of the DLA features. A hierarchy of programmable interconnects allow logic blocks to be interconnected as needed by the DLA system designer/administrator, somewhat like a one-chip programmable breadboard. An FPGA's logic blocks may be programmed to perform the operation of basic logic gates such as AND, and XOR, or more complex combinational operators such as decoders or simple mathematical operations. In most FPGAs, the logic blocks also include memory elements, which May be circuit flip-flops or more complete blocks of memory. In some circumstances, the DLA may be developed on regular FPGAs and then migrated into a fixed version that more resembles ASIC implementations. Alternate or coordinating implementations May migrate DLA controller features to a final ASIC instead of or in addition to FPGAs. Depending on the implementation all of the aforementioned embedded components and microprocessors may be considered the "CPU" and/or "processor" for the DLA.

Power Source

The power source 1286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1286 is connected to at least one of the interconnected subsequent components of the DLA thereby providing an electric current to all the interconnected components. In one example, the power source 1286 is connected to the system bus component 1204. In an alternative embodiment, an outside power source 1286 is provided through a connection across the I/O 1208 interface. For example, a USB and/or IEEE 1394 connection carries both data and power across the connection and is therefore a suitable source of power.

Interface Adapters

Interface bus(ses) 1207 may accept, connect, and/or communicate to a number of interface adapters, frequently, although not necessarily in the form of adapter cards, such as but not limited to: input output interfaces (I/O) 1208, storage interfaces 1209, network interfaces 1210, and/or the like. Optionally, cryptographic processor interfaces 1227 similarly may be connected to the interface bus. The interface bus provides for the communications of interface adapters with one another as well as with other components of the computer systemization. Interface adapters are adapted for a compatible interface bus. Interface adapters may connect to the interface bus via expansion and/or slot architecture. Various expansion and/or slot architectures may be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 1209 may accept, communicate, and/or connect to a number of storage devices such as, but not limited to: storage devices 1214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 1210 may accept, communicate, and/ or connect to a communications network 1213. Through a communications network 1213, the DLA controller is accessible through remote clients 1233*b* (e.g., computers with web browsers) by users 1233*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DLA), architectures may similarly be employed to pool, load balance, and/or otherwise increase the communicative bandwidth required by the DLA controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1210 may be used to engage with various communications network types 1213. For example, multiple network interfaces may be employed to allow for the communication over broadcast, multicast, and/or unicast networks.

Input Output interfaces (I/O) 1208 may accept, communicate, and/or connect to user input devices 1211, peripheral devices 1212, cryptographic processor devices 1228, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, DisplayPort, Digital Visual Interface (DVI), high-definition multimedia interface (HDMI), RCA, RF antennae, S-Video, VGA, and/ or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 1211 often are a type of peripheral device 1212 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1212 may be connected and/or communicate to I/O and/or other facilities of the like such as network interfaces, storage interfaces, directly to the interface bus, system bus, the CPU, and/or the like. Peripheral devices may be external, internal and/or part of the DLA controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 1228), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the DLA controller may be embodied as an embedded, dedicated, and/or monitor-less (i.e., headless) device, wherein access may be provided over a network interface connection.

Cryptographic units such as, but not limited to, microcontrollers, processors 1226, interfaces 1227, and/or devices 1228 may be attached, and/or communicate with the DLA controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1229. However, memory is a fungible technology and resource, thus, any number of memory embodiments may be employed in lieu of or in concert with one another. It is to be understood that the DLA controller and/or a computer systemization may employ various forms of memory 1229. For example, a computer systemization may be configured wherein the operation of on-chip CPU memory (e.g., registers), RAM, ROM, and any other storage devices are provided by a paper punch tape or paper punch card mechanism; however, such an embodiment may result in an extremely slow rate of operation. In one configuration, memory 1229 may include ROM 1206, RAM 1205, and a storage device 1214. A storage device 1214 may employ any number of computer storage devices/systems. Storage devices may include a drum; a (fixed and/or removable) magnetic disk drive; a magneto-optical drive; an optical drive (i.e., Blueray, CD ROM/RAM/ReccoDLAble (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1229 may contain a collection of program and/or database components and/or data such as, but not limited to: operating system component(s) 1215 (operating system); information server component(s) 1216 (information server); user interface component(s) 1217 (user interface); Web browser component(s) 1218 (Web browser); database(s) 1219; mail server component(s) 1221; mail client component(s) 1222; cryptographic server component(s) 1220 (cryptographic server); the DLA component(s) 1235 which includes a request handler component 1241 (e.g., see 641 in FIG. 6, etc.), load balancer 1242 (e.g., see 1001 in FIGS. 10C-D, etc.), RTB 1243 (e.g., see FIGS. 3A-3B, etc.), RTLM 1244 (e.g., see 455 in FIG. 4B, etc.), ETL 1245 (e.g., 445 in FIG. 4B, etc.), Encoder 1246 (e.g., 835 in FIG. 8B, etc.), Data Processing Unit 1247 (e.g., see 845 in FIG. 8B, etc.), Data Learner 1248 (e.g., see 840 in FIG. 8B, etc.), Data Explorer 1249 (e.g., see 855 in FIG. 8B, etc.), Data Modeler 1151 (e.g., see 865 in FIG. 8B, etc.), Data Predictor 1152 (e.g., see 860 in FIG. 8B, etc.), etc.; and/or the like (i.e., collectively a component collection). These components may be stored and accessed from the storage devices and/or from storage devices accessible through an interface bus. Although non-conventional program components such as those in the component collection may be stored in a local storage device 1214, they may also be loaded and/or stored in memory such as: peripheral devices, RAM, remote storage facilities through a communications network, ROM, various forms of memory, and/or the like.

Operating System

The operating system component 1215 is an executable program component facilitating the operation of the DLA controller. The operating system May facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. In addition, emobile operating systems such as Apple's iOS, Google's Android, Hewlett Packard's WebOS, Microsofts Windows Mobile, and/or the like may be employed. Any of these operating systems may be embedded within the hardware of the NICK controller, and/or stored/loaded into memory/storage. An operating system May communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DLA controller to communicate with other entities through a communications network 1213. Various communication protocols may be used by the DLA controller as a subcarrier transport mechanism for interaction, such as, but not limited to: multicast, TCP/IP, UDP, unicast, and/or the like.

Information Server

An information server component 1216 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DLA controller based on the remainder of the HTTP request. For example, a request such as http://123.124.125.126/myInformation-.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DLA database 1219, operating systems, other program components, user interfaces, Web browsers, and/or the like.

Access to the DLA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DLA. In one embodiment, the information server may provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DLA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XP/Vista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 1217 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1218 is a stored program component that is executed by a CPU. The Web browser may be a hypertext viewing application such as Goofle's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application may similarly effect the obtaining and the provision of information to users, user agents, and/or the like from the DLA equipped nodes. The combined application may be nugatory on systems employing standard Web browsers.

Mail Server

A mail server component 1221 is a stored program component that is executed by a CPU 1203. The mail server may be an Internet mail server such as, but not limited to Apple's Mail Server (3), dovect, sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server may route, forward, and process incoming and outgoing mail messages that have been sent, relayed and/or otherwise traversing through and/or to the DLA.

Access to the DLA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1222 is a stored program component that is executed by a CPU 1203. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1220 is a stored program component that is executed by a CPU 1203, cryptographic processor 1226, cryptographic processor interface 1227, cryptographic processor device 1228, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DLA may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DLA component to engage in secure transactions if so desired. The cryptographic component facilitates the secure accessing of resources on the DLA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DLA Database

The DLA database component 1219 may be embodied in a database and its stored data. The database is a stored program component, which is executed by the CPU; the stored program component portion configuring the CPU to process the stored data. The database may be any of a number of fault tolerant, relational, scalable, secure databases, such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database.

More precisely, they uniquely identify rows of a table on the "one" side of a one-to-many relationship.

Alternatively, the DLA database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases May include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DLA database is implemented as a data-structure, the use of the DLA database 1219 may be integrated into another component such as the DLA component 1235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1219 includes several tables 1219*a-m*. A Users table 1219*a* may include fields such as, but not limited to: user_id, user_device_id, username, password, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a DLA. A Data Source table 1219*b* May include fields such as, but not limited to: source_ID, source_name, source_server_IP, device_domain, source_url, source_security_protocol, source_ftp, device_securekey, and/or the like. An Ads table 1219*c* may include fields such as, but not limited to: ads_ID, ads_name, ads_type, ads_sponsor, ads_channel, ads_time, ads_geo, ads_attribute, ads_format, and/or the like. A Bid table 1219*d* may include fields such as, but not limited to: bid_id, bid_exchange, bid_OS, bid_target, bid_timestamp, bid_price, bid_impression_id, bid_model_id, bid_score, and/or the like. An attribute table 1219*e* may include fields such as, but not limited to: ad_exchange, OS-type, geo-location, industry, target parameter, publisher, industry_advertisers, ad_size, ad_format (e.g., banner, audio, video, content synthesis, demographic synthesized ads, intended audience demographics, etc.), media_channels (e.g., TV, video, mobile, search, dialogue, glasses, billboards, social, radio, print, atmospherics, weather, events, etc.), ad-device_types (e.g., browser, mobile, etc.), search_channel, time, duration, news_events, and/or the like. A publisher site table 1219*f* may include fields such as, but not limited to: publisher_id, publisher_address, publisher_url, publisher_tag, publisher_industry, publisher_name, publisher_description, site_domain, site_url, site_content, site_tag, site_context, site_impression, site_visits, site_headline, site_page, site_ad_price, site_placement, site_position, and/or the like. A Metrics table 1219*g* may include fields such as, but not limited to: metric_id, metric_name, metric_value, metric_model_id, metric_data_variable, metric_CPC, metric_CPA, metric_CPM, metric_CTR, and/or the like. An Ad Exchange table 1219*h* may include fields such as, but not limited to: ax_id, ax_name, ax_timestamp, ax_price, ax_server, ax_port_number, and/or the like. A Model table 1219*i* may include fields such as, but not limited to: model_id, model_name (e.g., the model names may be stored as a sub-table, see the MasterTable 644 in FIG. 6), model_metric, BET_id, model_data, model_coefficients, model_independent, model_dependent, and/or the like. A BET table 1219*j* may include fields such as, but not limited to: BET_id, BET_timestamp, BET_attributes, BET_variables, BET_column, BET_row, BET_value, BET_components, and/or the like. A Predictive Results table 1219*k* may include fields such as, but not limited to: results_type, results_name, results_model_id, results_timestamp, results_BET_id, results_value, results_score, results_bid_id, and/or the like. An Impression table 1219*l* may include fields such as, but not limited to: impression_id, impression_name, impression_ax, impression_os, impression_geo, impression_action, impression_click, impression_publisher_id, impression_publisher_url, impression_timestamp, and/or the like. A Business Intelligence table 1219*m* may include fields such as, but not limited to: BI_id, BI_name, BI_address, BI_description, BI_name, BI_reports, and/or the like.

In one embodiment, the DLA database may interact with other database systems. For example, employing a distributed database system, queries and data access by search DLA component may treat the combination of the DLA database, an integrated data security layer database as a single database entity.

In one embodiment, user programs may contain various user interface primitives, which may serve to update the DLA. Also, various accounts may require custom database tables depending upon the environments and the types of clients the DLA may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1219*a-m*. The DLA may be configured to keep track of various settings, inputs, and parameters via database controllers.

The DLA database may communicate to and/or with other components in a component collection, including itself, and/or facilities of the like. Most frequently, the DLA database communicates with the DLA component, other program components, and/or the like. The database may contain, retain, and provide information regarding other nodes and data.

The DLAs

The DLA component 1235 is a stored program component that is executed by a CPU. In one embodiment, the DLA component incorporates any and/or all combinations of the aspects of the DLA discussed in the previous figures. As such, the DLA affects accessing, obtaining and the provision of information, services, transactions, and/or the like across various communications networks. The features and embodiments of the DLA discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DLA's features and facilities, and in many cases reduce the costs, energy consumption/ requirements, and extend the life of DLA's underlying infrastructure; this has the added benefit of making the DLA more reliable. Similarly, many of the features and mechanisms are designed to be easier for users to use and access, thereby broadening the audience that may enjoy/employ and exploit the feature sets of the DLA; such ease of use also helps to increase the reliability of the DLA. In addition, the feature sets include heightened security as noted via the Cryptographic components 1220, 1226, 1228 and throughout, making access to the features and data more reliable and secure.

The DLA component may transform an ad impression event (e.g., see 202 in FIG. 2, etc.), a bidding invite (e.g., 424*a* in FIG. 4B, etc.) via DLA components, such as but not limited to request handler component 1241 (e.g., see 641 in FIG. 6, etc.), load balancer 1242 (e.g., see 1001 in FIGS. 10C-D, etc.), RTB 1243 (e.g., see FIGS. 3A-3B, etc.), RTLM 1244 (e.g., see 455 in FIG. 4B, etc.), ETL (e.g., 445 in FIG. 4B, etc.), Encoder 1246 (e.g., 835 in FIG. 8B, etc.), Data Processing Unit 1247 (e.g., see 845 in FIG. 8B, etc.), Data Learner 1248 (e.g., see 840 in FIG. 8B, etc.), Data Explorer 1249 (e.g., see 855 in FIG. 8B, etc.), Data Modeler 1151 (e.g., see 865 in FIG. 8B, etc.), Data Predictor 1152 (e.g., see 860 in FIG. 8B, etc.), and/or the like into real-time mobile bid (e.g., see 215 in FIG. 2, etc.), mobile ad placement (e.g., 223 in FIG. 2, etc.), and/or the like and use of the DLA.

The DLA component enabling access of information between nodes May be developed by employing standard development tools and languages such as, but not limited to: Apache components, Assembly, ActiveX, binary executables, (ANSI) (Objective–) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); Representational State Transfer (REST); SWFObject; Yahoo! User Interface; and/or the like), WebObjects, and/or the like. In one embodiment, the DLA server employs a cryptographic server to encrypt and decrypt communications. The DLA component may communicate to and/or with other components in a component collection, including itself, and/or facilities of the like. Most frequently, the DLA component communicates with the DLA database, operating systems, other program components, and/or the like. The DLA may contain, communicate, generate, obtain, and/or provide program component, system, user, and/or data communications, requests, and/or responses.

Distributed DLAs

The structure and/or operation of any of the DLA node controller components may be combined, consolidated, and/or distributed in any number of ways to facilitate development and/or deployment. Similarly, the component collection May be combined in any number of ways to facilitate deployment and/or development. To accomplish this, one may integrate the components into a common code base or in a facility that may dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DLA controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DLA controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<? PHP
header ('Content-Type: text/plain');
//set ip address and port to listen to for incoming data
$address='192.168.0.100';
$port=255;
//create a server-side SSL socket, listen for/accept incoming communication $sock=socket_create (AF_INET, SOCK_STREAM, 0);
socket_bind ($sock, $address, $port) or die ('Could not bind to address');
socket_listen ($sock);
$client=socket_accept ($sock);
//read input data from client device in 1024 byte blocks until end of message do {
    $input=" ";
    $input=socket_read ($client, 1024);
    $data.=$input;
} while ($input !=" ");
//parse data to extract variables
$obj=json_decode ($data, true);
//store input data in a database
mysql_connect ("201.408.185.132", $DBserver, $password);//access database server
mysql_select ("CLIENT_DB. SQL");//select database to append
mysql_query ("INSERT INTO UserTable (transmission) VALUES ($data)");//add data to UserTable table in a CLIENT database
mysql_close ("CLIENT_DB. SQL");//close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm .IBMDI.doc/referenceguide295.htm and other parser implementations:
http://publib.boulder.ibm.com/infocenter/tivihelp/v2r1/index.jsp?topic=/com.ibm .IBMDI.doc/referenceguide259.htm
all of which are hereby expressly incorporated by reference herein.

Additional embodiments of the DLA may comprise:

1. A processor-implemented real-time event assessment method embodiment, comprising:
    obtaining a real-time event assessment request including a plurality of data attributes relating to a real-time event;
    obtaining a real-time event assessment target metric;
    retrieving from a database real-time event assessment structures;
    querying for a real-time event assessment structure based on the obtained real-time event assessment target metric and one or more data attributes associated with the real-time event;
    selecting input data variables for the real-time event assessment structure from the one or more data attributes;
    feeding the selected input data variables into the real-time event assessment structure;
    instantiating the real-event assessment structure with the selected input data variables;
    obtaining a real-time event assessment target metric output value from the instantiation of the real-time event assessment structure with the selected input data variables;
    determining a bidding price for the real-time event based on the real-time event assessment target metric output value; and
    generating a real-time bid message for the real-time event including the bidding price in response to the real-time event assessment request.

2. The method of embodiment 1, wherein the real-time event assessment request is received from a mobile ad exchange.

3. The method of embodiment 1, wherein the real-time event assessment request comprises an invite to bid for a mobile ad placement opportunity.

4. The method of embodiment 3, wherein the mobile ad placement opportunity is provided by a publisher server when an Internet user attempts to load a webpage of the publisher server.

5. The method of embodiment 1, wherein the plurality of data attributes comprise any of: a mobile ad exchange name, a user operating system type and a user geo-location.

6. The method of embodiment 1, wherein the plurality of data attributes further comprise any of: publisher information, webpage information and user action information.

7. The method of embodiment 3, wherein the real-time event assessment request comprises a request for performance prediction of the mobile ad placement opportunity.

8. The method of embodiment 3, wherein the real-time event assessment request comprises a request for a bidding price for the mobile ad placement opportunity.

9. The method of embodiment 1, wherein the real-time event assessment target metric comprises any of a target click-through-rate, a target cost per click, a target cost per action, and a target cost per mile.

10. The method of embodiment 9, wherein any of the target click-through-rate, a target cost per click, a target cost per action, and a target cost per mile is associated with a mobile ad placement opportunity with the real-time event.

11. The method of embodiment 1, wherein the retrieved real-time event assessment structures are segmented by the real-time event assessment target metric.

12. The method of embodiment 1, wherein the real-time event assessment structures are searchable via a real-time event assessment structure name table.

13. The method of embodiment 12, wherein a real-time event assessment structure name comprises a concatenation of mobile ad exchange name, user operating system type and a user geo-location.

14. The method of embodiment 1, wherein the querying for a real-time event assessment structure comprises a progressive query based on a hierarchy of data attributes.

15. The method of embodiment 14, wherein the hierarchy of data attributes comprises a first level data attribute of real-time event assessment metrics, a second level attribute of mobile ad exchange names, a third level attribute of user operating system types, and a fourth level attribute of user geo-location.

16. The method of embodiment 14, wherein the hierarchy of data attributes further comprises additional levels of attributes.

17. The method of embodiment 1, wherein the plurality of data attributes are extracted from the real-time event assessment request and formatted in compliance with a pre-defined data format via a data extraction, transformation and loading (ETL) component.

18. The method of embodiment 17, wherein the ETL component retrieves ad impression data from cloud storage.

19. The method of embodiment 18, wherein the ETL component cleans and filters the plurality of data attributes.

20. The method of embodiment 1, further comprising determining an encoder type for one or more data attributes.

21. The method of embodiment 20, further comprising encoding the one or more data attributes based on the determined encoder type by mapping a textual publisher name to a numeric value.

22. The method of embodiment 21, wherein the numeric value is obtained based on the real-time event assessment target metric.

23. The method of embodiment 1, wherein the queried real-time event assessment structure is associated with a basic element table.

24. The method of embodiment 23, further comprising updating the queried real-time event assessment structure and the basic element table.

25. The method of embodiment 24, wherein the updating the basic element table comprises computing and adding new data entries to the basic element table.

26. The method of embodiment 24, wherein updating the queried real-time event assessment structure further includes computing regression coefficients based on the basic element table.

27. The method of embodiment 1, wherein the real-time event assessment structure comprises a regression structure having a plurality of regression coefficients.

28. The method of embodiment 1, wherein the real-time event assessment target metric output value comprises any of an estimated probability value of ad click-through, an estimated cost per click, an estimated cost per action, and an estimated cost per mile.

29. The method of embodiment 1, wherein the obtaining a real-time event assessment target metric output value is used to determine whether place a bid for the real-time event.

30. The method of embodiment 1, further comprising:
receiving a bidding result in response to the real-time bid message; and
providing the bidding result to an advertiser.

31. A real-time event assessment system embodiment, comprising:
means for obtaining a real-time event assessment request including a plurality of data attributes relating to a real-time event;
means for obtaining a real-time event assessment target metric;
means for retrieving from a database real-time event assessment structures;
means for querying for a real-time event assessment structure based on the obtained real-time event assessment target metric and one or more data attributes associated with the real-time event;
means for selecting input data variables for the real-time event assessment structure from the one or more data attributes;
means for feeding the selected input data variables into the real-time event assessment structure;
means for instantiating the real-event assessment structure with the selected input data variables;
means for obtaining a real-time event assessment target metric output value from the instantiation of the real-time event assessment structure with the selected input data variables;
means for determining a bidding price for the real-time event based on the real-time event assessment target metric output value; and means for generating a real-time bid message for the real-time event including the bidding price in response to the real-time event assessment request.

32. The system of embodiment 31, wherein the real-time event assessment request is received from a mobile ad exchange.

33. The system of embodiment 31, wherein the real-time event assessment request comprises an invite to bid for a mobile ad placement opportunity.

34. The system of embodiment 33, wherein the mobile ad placement opportunity is provided by a publisher server when an Internet user attempts to load a webpage of the publisher server.

35. The system of embodiment 31, wherein the plurality of data attributes comprise any of: a mobile ad exchange name, a user operating system type and a user geo-location.

36. The system of embodiment 31, wherein the plurality of data attributes further comprise any of: publisher information, webpage information and user action information.

37. The system of embodiment 33, wherein the real-time event assessment request comprises a request for performance prediction of the mobile ad placement opportunity.

38. The system of embodiment 33, wherein the real-time event assessment request comprises a request for a bidding price for the mobile ad placement opportunity.

39. The system of embodiment 31, wherein the real-time event assessment target metric comprises any of a target click-through-rate, a target cost per click, a target cost per action, and a target cost per mile.

40. The system of embodiment 39, wherein any of the target click-through-rate, a target cost per click, a target cost per action, and a target cost per mile is associated with a mobile ad placement opportunity with the real-time event.

41. The system of embodiment 31, wherein the retrieved real-time event assessment structures are segmented by the real-time event assessment target metric.
42. The system of embodiment 31, wherein the real-time event assessment structures are searchable via a real-time event assessment structure name table.
43. The system of embodiment 42, wherein a real-time event assessment structure name comprises a concatenation of mobile ad exchange name, user operating system type and a user geo-location.
44. The system of embodiment 31, wherein the querying for a real-time event assessment structure comprises a progressive query based on a hierarchy of data attributes.
45. The system of embodiment 44, wherein the hierarchy of data attributes comprises a first level data attribute of real-time event assessment metrics, a second level attribute of mobile ad exchange names, a third level attribute of user operating system types, and a fourth level attribute of user geo-location.
46. The system of embodiment 44, wherein the hierarchy of data attributes further comprises additional levels of attributes.
47. The system of embodiment 31, wherein the plurality of data attributes are extracted from the real-time event assessment request and formatted in compliance with a pre-defined data format via a data extraction, transformation and loading (ETL) component.
48. The system of embodiment 47, wherein the ETL component retrieves ad impression data from cloud storage.
49. The system of embodiment 48, wherein the ETL component cleans and filters the plurality of data attributes.
50. The system of embodiment 31, further comprising determining an encoder type for one or more data attributes.
51. The system of embodiment 50, further comprising means for encoding the one or more data attributes based on the determined encoder type by mapping a textual publisher name to a numeric value.
52. The system of embodiment 51, wherein the numeric value is obtained based on the real-time event assessment target metric.
53. The system of embodiment 31, wherein the queried real-time event assessment structure is associated with a basic element table.
54. The system of embodiment 53, further comprising updating the queried real-time event assessment structure and the basic element table.
55. The system of embodiment 54, wherein the updating the basic element table comprises computing and adding new data entries to the basic element table.
56. The system of embodiment 54, wherein updating the queried real-time event assessment structure further includes computing regression coefficients based on the basic element table.
57. The system of embodiment 31, wherein the real-time event assessment structure comprises a regression structure having a plurality of regression coefficients.
58. The system of embodiment 31, wherein the real-time event assessment target metric output value comprises any of an estimated probability value of ad click-through, an estimated cost per click, an estimated cost per action, and an estimated cost per mile.
59. The system of embodiment 31, wherein the obtaining a real-time event assessment target metric output value is used to determine whether place a bid for the real-time event.
60. The system of embodiment 31, further comprising:
means for receiving a bidding result in response to the real-time bid message; and
means for providing the bidding result to an advertiser.
61. A real-time event assessment apparatus embodiment, comprising:
a processor; and
a memory disposed in communication with the processor and storing processor-issuable instructions to:
obtain a real-time event assessment request including a plurality of data attributes relating to a real-time event;
obtain a real-time event assessment target metric;
retrieve from a database real-time event assessment structures;
query for a real-time event assessment structure based on the obtained real-time event assessment target metric and one or more data attributes associated with the real-time event;
select input data variables for the real-time event assessment structure from the one or more data attributes;
feed the selected input data variables into the real-time event assessment structure;
instantiate the real-event assessment structure with the selected input data variables;
obtain a real-time event assessment target metric output value from the instantiation of the real-time event assessment structure with the selected input data variables;
determine a bidding price for the real-time event based on the real-time event assessment target metric output value; and
generate a real-time bid message for the real-time event including the bidding price in response to the real-time event assessment request.
62. The apparatus of embodiment 61, wherein the real-time event assessment request is received from a mobile ad exchange.
63. The apparatus of embodiment 61, wherein the real-time event assessment request comprises an invite to bid for a mobile ad placement opportunity.
64. The apparatus of embodiment 63, wherein the mobile ad placement opportunity is provided by a publisher server when an Internet user attempts to load a webpage of the publisher server.
65. The apparatus of embodiment 61, wherein the plurality of data attributes comprise any of: a mobile ad exchange name, a user operating system type and a user geo-location.
66. The apparatus of embodiment 61, wherein the plurality of data attributes further comprise any of: publisher information, webpage information and user action information.
67. The apparatus of embodiment 63, wherein the real-time event assessment request comprises a request for performance prediction of the mobile ad placement opportunity.
68. The apparatus of embodiment 63, wherein the real-time event assessment request comprises a request for a bidding price for the mobile ad placement opportunity.

69. The apparatus of embodiment 61, wherein the real-time event assessment target metric comprises any of a target click-through-rate, a target cost per click, a target cost per action, and a target cost per mile.
70. The apparatus of embodiment 69, wherein any of the target click-through-rate, a target cost per click, a target cost per action, and a target cost per mile is associated with a mobile ad placement opportunity with the real-time event.
71. The apparatus of embodiment 61, wherein the retrieved real-time event assessment structures are segmented by the real-time event assessment target metric.
72. The apparatus of embodiment 61, wherein the real-time event assessment structures are searchable via a real-time event assessment structure name table.
73. The apparatus of embodiment 62, wherein a real-time event assessment structure name comprises a concatenation of mobile ad exchange name, user operating system type and a user geo-location.
74. The apparatus of embodiment 61, wherein the querying for a real-time event assessment structure comprises a progressive query based on a hierarchy of data attributes.
75. The apparatus of embodiment 64, wherein the hierarchy of data attributes comprises a first level data attribute of real-time event assessment metrics, a second level attribute of mobile ad exchange names, a third level attribute of user operating system types, and a fourth level attribute of user geo-location.
76. The apparatus of embodiment 64, wherein the hierarchy of data attributes further comprises additional levels of attributes.
77. The apparatus of embodiment 61, wherein the plurality of data attributes are extracted from the real-time event assessment request and formatted in compliance with a pre-defined data format via a data extraction, transformation and loading (ETL) component.
78. The apparatus of embodiment 67, wherein the ETL component retrieves ad impression data from cloud storage.
79. The apparatus of embodiment 68, wherein the ETL component cleans and filters the plurality of data attributes.
80. The apparatus of embodiment 61, wherein the processor further issues instructions to determine an encoder type for one or more data attributes.
81. The apparatus of embodiment 80, wherein the processor further issues instructions to encode the one or more data attributes based on the determined encoder type by mapping a textual publisher name to a numeric value.
82. The apparatus of embodiment 81, wherein the numeric value is obtained based on the real-time event assessment target metric.
83. The apparatus of embodiment 61, wherein the queried real-time event assessment structure is associated with a basic element table.
84. The apparatus of embodiment 83, further comprising updating the queried real-time event assessment structure and the basic element table.
85. The apparatus of embodiment 84, wherein the updating the basic element table comprises computing and adding new data entries to the basic element table.
86. The apparatus of embodiment 84, wherein updating the queried real-time event assessment structure further includes computing regression coefficients based on the basic element table.
87. The apparatus of embodiment 61, wherein the real-time event assessment structure comprises a regression structure having a plurality of regression coefficients.
88. The apparatus of embodiment 61, wherein the real-time event assessment target metric output value comprises any of an estimated probability value of ad click-through, an estimated cost per click, an estimated cost per action, and an estimated cost per mile.
89. The apparatus of embodiment 61, wherein the obtaining a real-time event assessment target metric output value is used to determine whether place a bid for the real-time event.
90. The apparatus of embodiment 61, wherein the processor further issues instructions to:
receive a bidding result in response to the real-time bid message; and
provide the bidding result to an advertiser.
91. A real-time event assessment non-transitory storage processor-readable medium embodiment storing processor-executable instructions executable by a processor to:
obtain a real-time event assessment request including a plurality of data attributes relating to a real-time event;
obtain a real-time event assessment target metric;
retrieve from a database real-time event assessment structures;
query for a real-time event assessment structure based on the obtained real-time event assessment target metric and one or more data attributes associated with the real-time event;
select input data variables for the real-time event assessment structure from the one or more data attributes;
feed the selected input data variables into the real-time event assessment structure;
instantiate the real-event assessment structure with the selected input data variables;
obtain a real-time event assessment target metric output value from the instantiation of the real-time event assessment structure with the selected input data variables;
determine a bidding price for the real-time event based on the real-time event assessment target metric output value; and
generate a real-time bid message for the real-time event including the bidding price in response to the real-time event assessment request.
92. The medium of embodiment 91, wherein the real-time event assessment request is received from a mobile ad exchange.
93. The medium of embodiment 91, wherein the real-time event assessment request comprises an invite to bid for a mobile ad placement opportunity.
94. The medium of embodiment 63, wherein the mobile ad placement opportunity is provided by a publisher server when an Internet user attempts to load a webpage of the publisher server.
95. The medium of embodiment 91, wherein the plurality of data attributes comprise any of: a mobile ad exchange name, a user operating system type and a user geo-location.
96. The medium of embodiment 91, wherein the plurality of data attributes further comprise any of: publisher information, webpage information and user action information.

97. The medium of embodiment 93, wherein the real-time event assessment request comprises a request for performance prediction of the mobile ad placement opportunity.

98. The medium of embodiment 93, wherein the real-time event assessment request comprises a request for a bidding price for the mobile ad placement opportunity.

99. The medium of embodiment 91, wherein the real-time event assessment target metric comprises any of a target click-through-rate, a target cost per click, a target cost per action, and a target cost per mile.

100. The medium of embodiment 99, wherein any of the target click-through-rate, a target cost per click, a target cost per action, and a target cost per mile is associated with a mobile ad placement opportunity with the real-time event.

101. The medium of embodiment 91, wherein the retrieved real-time event assessment structures are segmented by the real-time event assessment target metric.

102. The medium of embodiment 91, wherein the real-time event assessment structures are searchable via a real-time event assessment structure name table.

103. The medium of embodiment 92, wherein a real-time event assessment structure name comprises a concatenation of mobile ad exchange name, user operating system type and a user geo-location.

104. The medium of embodiment 91, wherein the querying for a real-time event assessment structure comprises a progressive query based on a hierarchy of data attributes.

105. The medium of embodiment 94, wherein the hierarchy of data attributes comprises a first level data attribute of real-time event assessment metrics, a second level attribute of mobile ad exchange names, a third level attribute of user operating system types, and a fourth level attribute of user geo-location.

106. The medium of embodiment 94, wherein the hierarchy of data attributes further comprises additional levels of attributes.

107. The medium of embodiment 91, wherein the plurality of data attributes are extracted from the real-time event assessment request and formatted in compliance with a pre-defined data format via a data extraction, transformation and loading (ETL) component.

108. The medium of embodiment 107, wherein the ETL component retrieves ad impression data from cloud storage.

109. The medium of embodiment 108, wherein the ETL component cleans and filters the plurality of data attributes.

110. The medium of embodiment 91, wherein the processor further issues instructions to determine an encoder type for one or more data attributes.

111. The medium of embodiment 100, wherein the processor further issues instructions to encode the one or more data attributes based on the determined encoder type by mapping a textual publisher name to a numeric value.

112. The medium of embodiment 111, wherein the numeric value is obtained based on the real-time event assessment target metric.

113. The medium of embodiment 91, wherein the queried real-time event assessment structure is associated with a basic element table.

114. The medium of embodiment 113, wherein the processor-executable instructions are further executable by the processor to update the queried real-time event assessment structure and the basic element table.

115. The medium of embodiment 114, wherein the updating the basic element table comprises computing and adding new data entries to the basic element table.

116. The medium of embodiment 114, wherein updating the queried real-time event assessment structure further includes computing regression coefficients based on the basic element table.

117. The medium of embodiment 91, wherein the real-time event assessment structure comprises a regression structure having a plurality of regression coefficients.

118. The medium of embodiment 91, wherein the real-time event assessment target metric output value comprises any of an estimated probability value of ad click-through, an estimated cost per click, an estimated cost per action, and an estimated cost per mile.

119. The medium of embodiment 91, wherein the obtaining a real-time event assessment target metric output value is used to determine whether place a bid for the real-time event.

120. The medium of embodiment 91, wherein the processor-executable instructions are further executable by the processor to:
receive a bidding result in response to the real-time bid message; and
provide the bidding result to an advertiser.

121. A processor-implemented real-time mobile ad bidding method embodiment, comprising:
receiving a real-time bidding opportunity event message including a plurality of data attributes from a mobile ad exchange for placing a mobile ad targeted at a mobile user;
obtaining a mobile ad performance metric;
retrieving a database of real-time bidding opportunity event assessment structures;
querying for a real-time bidding opportunity event assessment structure based on the obtained real-time event assessment target metric and one or more data attributes associated with the real-time bidding opportunity event,
and one or more data attributes including a name of the mobile ad exchange, a user operating system type and a user geo-location;
extracting the plurality of data attributes from the real-time bidding opportunity event r and transforming the extracted data attributes in compliance with a pre-defined data format;
determining an encoder type based on the mobile ad performance metric;
encoding the one or more data attributes by mapping a textual data attribute into a numeric value based on the mobile ad performance metric;
updating the queried real-time bidding opportunity event assessment structure with the transformed data attributes including the encoded one or more data attributes;
obtaining updated real-time bidding opportunity event assessment structure regression coefficients;
selecting a plurality of regression input data variables for the real-time event assessment structure from the transformed data attributes including the encoded one or more data attributes;
instantiating the real-time bidding opportunity event assessment structure with the updated real-time bidding opportunity event assessment structure regression coefficients;

feeding the selected regression input data variables into the updated real-time bidding opportunity event assessment structure;

obtaining a real-time bidding opportunity event assessment target metric output value;

determining the real-time bidding opportunity event assessment target metric output value is desirable;

determining a bidding price for the mobile ad targeted at the mobile user based on real-time bidding opportunity event assessment target metric output value; and sending a mobile ad bid message including the bidding price to the mobile ad exchange in response to the real-time bidding opportunity event message.

Further embodiments of the DLA comprise:

1. A processor-implemented real-time streaming data predictive structure building method embodiment, comprising:

obtaining a predictive structure building request including a target prediction metric from a requestor;

determining a predictive structure type requiring a plurality of coefficients based on the target prediction metric;

obtaining an incoming stream of data variables associated with one or more real-time events,
   each data variable belonging to a data attribute that describes the one or more real-time events;

formatting the incoming stream of data variables in compliance with a pre-defined data format;

determining an encoder type based on the target prediction metric;

encoding one or more data variables into numeric representations via the encoder based on the target prediction metric;

creating an additive and reusable basic element table indicative of joint occurrence counts of pairs of data attributes based on the data variables included the encoded one or more data variables;

calculating the plurality of coefficients required by the predictive structure type based on cell values of the basic element table; and establishing a predictive structure with the calculated plurality of coefficients and the basic element table; and providing the established predictive structure to the requestor.

2. The method of embodiment 1, wherein the target prediction metric is identified by a user.

3. The method of embodiment 1, wherein the target prediction metric comprises any of a target click-through-rate, a target cost per click, a target cost per action, and a target cost per mile.

4. The method of embodiment 1, wherein the predictive structure building request comprises a request to generate a numeric evaluative value reflecting an estimate of the target prediction metric.

5. The method of embodiment 1, wherein the predictive structure type requiring a plurality of coefficients comprises a linear regression formula.

6. The method of embodiment 5, wherein the linear regression formula employs one or more data attributes as independent regression variables.

7. The method of embodiment 1, wherein the incoming stream of data variables is received in any of the following manner: one-by-one, periodic, continuous, and in a batch.

8. The method of embodiment 1, wherein the encoding comprises mapping textual values of the one or more data variables to numeric values.

9. The method of embodiment 8, wherein the numeric values are obtained based on a data attribute value associated with a real-time event,
   said data attribute value indicative of the target prediction metric.

10. The method of embodiment 1, wherein the basic element table is an orthogonal matrix.

11. The method of embodiment 1, wherein each cell of the basic element table is calculated by taking a summation of a first order and a second order power series of two data variables.

12. The method of embodiment 1, wherein the basic element table is updated by calculating new power series of new pairs of data variables and adding the calculated new power series to each cell without re-building the basic element table.

13. The method of embodiment 1, further comprising:
calculating a covariance table based on the basic element table.

14. The method of embodiment 13, further comprising:
calculating a correlation table based on the covariance table.

15. The method of embodiment 13, further comprising:
calculating a frequency table for a Markov Chain model based on the covariance table.

16. The method of embodiment 14, further comprising:
calculating the plurality of coefficients based on the correlation table.

17. The method of embodiment 15, further comprising:
calculating the plurality of coefficients for the Markov Chain model based on the frequency table.

18. The method of embodiment 1, wherein the plurality of coefficients are calculated based on any of the following models:
Bayesian, Linear Discriminant Analysis (LDA), Multiple Linear Regression (MLR), Principal Component Analysis (PCA), Principal Component Regression (PCR), Support Vector Machine (SVM), Markov Chain, Hidden Markov Chain, Support Vector Regression (SVR), Quadratic Discriminant Analysis (QDA), and Regression 19. The method of embodiment 1, wherein the predictive structure type any of the following models:
non-linear regression, linear classification, on-linear classification, robust Bayesian classification, naïve Bayesian classification, Markov chains, hidden Markov models, principal component analysis, principal component regression, partial least squares, and decision tree.

20. The method of embodiment 1, further comprising:
selecting regression inputs from the incoming stream of data variables.

21. The method of embodiment 20, further comprising:
receiving a new real-time event having new data variables with respect to the selected regression inputs.

22. The method of embodiment 21, further comprising:
instantiating the established predictive structure;
feeding the new data variables with respect to the selected regression inputs into the established predictive structure;
obtaining a predictive output value from the established predictive structure.

23. The method of embodiment 1, wherein the established predictive structure is searchable in the database by a hierarchy of data attribute labels.

24. The method of embodiment 1, wherein the established predictive structure is named by one or more data attributes.

25. The method of embodiment 1, further comprising:
obtaining a request to update the predictive structure with a new data variable;
retrieving the basic element table;
calculating a new joint occurrence count for the new data variable;
adding the new joint occurrence count to the basic element table; and
obtaining an updated basic element table without rebuilding the basic element table.

26. The method of embodiment 1, further comprising:
obtaining a new data attribute;
retrieving the basic element table;
adding a new column and a new row to the basic element table;
calculating new joint occurrence counts between existing data attributes and the new data attribute;
adding the new joint occurrence counts to the new column and the new row; and
obtaining an updated basic element table without rebuilding the basic element table.

27. The method of embodiment 1, further comprising:
retrieving a first predictive structure built upon a first basic element table;
retrieving a second predictive structure built upon a second basic element table;
creating a new basic element table by adding the first basic element table to the second basic element table; and
calculating new coefficients for a new predictive structure based on the new basic element table.

28. The method of embodiment 1, further comprising:
obtaining a request to update the predictive structure to remove a data variable;
retrieving the basic element table;
identifying joint occurrence count components having the data variable;
subtracting the joint occurrence count components from the basic element table; and
obtaining an updated basic element table without rebuilding the basic element table.

29. The method of embodiment 1, further comprising:
obtaining a request to update the predictive structure to remove a data attribute;
retrieving the basic element table;
identifying a row and a column of joint occurrence counts having the data attribute;
removing the identified row and column from the basic element table; and
obtaining an updated basic element table without rebuilding the basic element table.

30. The method of embodiment 1, further comprising storing the established predictive structure labeled by one or more data attributes in a database.

31. A real-time streaming data predictive structure building system embodiment, comprising:
means for obtaining a predictive structure building request including a target prediction metric from a requestor;
means for determining a predictive structure type requiring a plurality of coefficients based on the target prediction metric;
means for obtaining an incoming stream of data variables associated with one or more real-time events, each data variable belonging to a data attribute that describes the one or more real-time events;
means for formatting the incoming stream of data variables in compliance with a pre-defined data format;
means for determining an encoder type based on the target prediction metric;
means for encoding one or more data variables into numeric representations via the encoder based on the target prediction metric;
means for creating an additive and reusable basic element table indicative of joint occurrence counts of pairs of data attributes based on the data variables included the encoded one or more data variables;
means for calculating the plurality of coefficients required by the predictive structure type based on cell values of the basic element table; and
means for establishing a predictive structure with the calculated plurality of coefficients and the basic element table; and
means for providing the established predictive structure to the requestor.

32. The system of embodiment 31, wherein the target prediction metric is identified by a user.

33. The system of embodiment 31, wherein the target prediction metric comprises any of a target click-through-rate, a target cost per click, a target cost per action, and a target cost per mile.

34. The system of embodiment 31, wherein the predictive structure building request comprises a request to generate a numeric evaluative value reflecting an estimate of the target prediction metric.

35. The system of embodiment 31, wherein the predictive structure type requiring a plurality of coefficients comprises a linear regression formula.

36. The system of embodiment 35, wherein the linear regression formula employs one or more data attributes as independent regression variables.

37. The system of embodiment 31, wherein the incoming stream of data variables is received in any of the following manner: one-by-one, periodic, continuous, and in a batch.

38. The system of embodiment 31, wherein the encoding comprises mapping textual values of the one or more data variables to numeric values.

39. The system of embodiment 8, wherein the numeric values are obtained based on a data attribute value associated with a real-time event, said data attribute value indicative of the target prediction metric.

40. The system of embodiment 31, wherein the basic element table is an orthogonal matrix.

41. The system of embodiment 31, wherein each cell of the basic element table is calculated by taking a summation of a first order and a second order power series of two data variables.

42. The system of embodiment 31, wherein the basic element table is updated by calculating new power series of new pairs of data variables and adding the calculated new power series to each cell without rebuilding the basic element table.

43. The system of embodiment 31, further comprising means for:
calculating a covariance table based on the basic element table.

44. The system of embodiment 43, further comprising means for:
calculating a correlation table based on the covariance table.

45. The system of embodiment 13, further comprising means for:

calculating a frequency table for a Markov Chain model based on the covariance table.

46. The system of embodiment 44, further comprising means for:
calculating the plurality of coefficients based on the correlation table.

47. The system of embodiment 45, further comprising means for:
calculating the plurality of coefficients for the Markov Chain model based on the frequency table.

48. The system of embodiment 31, wherein the plurality of coefficients are calculated based on any of the following models:
Bayesian, Linear Discriminant Analysis (LDA), Multiple Linear Regression (MLR), Principal Component Analysis (PCA), Principal Component Regression (PCR), Support Vector Machine (SVM), Markov Chain, Hidden Markov Chain, Support Vector Regression (SVR), Quadratic Discriminant Analysis (QDA), and Regression 49. The system of embodiment 31, wherein the predictive structure type any of the following models:
non-linear regression, linear classification, on-linear classification, robust Bayesian classification, naïve Bayesian classification, Markov chains, hidden Markov models, principal component analysis, principal component regression, partial least squares, and decision tree.

50. The system of embodiment 31, further comprising means for:
selecting regression inputs from the incoming stream of data variables.

51. The system of embodiment 50, further comprising means for:
receiving a new real-time event having new data variables with respect to the selected regression inputs.

52. The system of embodiment 51, further comprising means for:
instantiating the established predictive structure;
feeding the new data variables with respect to the selected regression inputs into the established predictive structure;
obtaining a predictive output value from the established predictive structure.

53. The system of embodiment 31, wherein the established predictive structure is searchable in the database by a hierarchy of data attribute labels.

54. The system of embodiment 31, wherein the established predictive structure is named by one or more data attributes.

55. The system of embodiment 31, further comprising means for:
obtaining a request to update the predictive structure with a new data variable;
retrieving the basic element table;
calculating a new joint occurrence count for the new data variable;
adding the new joint occurrence count to the basic element table; and
obtaining an updated basic element table without rebuilding the basic element table.

56. The system of embodiment 31, further comprising means for:
obtaining a new data attribute;
retrieving the basic element table;
adding a new column and a new row to the basic element table;
calculating new joint occurrence counts between existing data attributes and the new data attribute;
adding the new joint occurrence counts to the new column and the new row; and
obtaining an updated basic element table without rebuilding the basic element table.

57. The system of embodiment 31, further comprising means for:
retrieving a first predictive structure built upon a first basic element table;
retrieving a second predictive structure built upon a second basic element table;
creating a new basic element table by adding the first basic element table to the second basic element table; and
calculating new coefficients for a new predictive structure based on the new basic element table.

58. The system of embodiment 31, further comprising means for:
obtaining a request to update the predictive structure to remove a data variable;
retrieving the basic element table;
identifying joint occurrence count components having the data variable;
subtracting the joint occurrence count components from the basic element table; and
obtaining an updated basic element table without rebuilding the basic element table.

59. The system of embodiment 31, further comprising means for:
obtaining a request to update the predictive structure to remove a data attribute;
retrieving the basic element table;
identifying a row and a column of joint occurrence counts having the data attribute;
removing the identified row and column from the basic element table; and
obtaining an updated basic element table without rebuilding the basic element table.

60. The system of embodiment 31, further comprising means for storing the established predictive structure labeled by one or more data attributes in a database.

61. A real-time streaming data predictive structure building apparatus embodiment, comprising:
a processor; and
a memory disposed in communication with the processor and storing processor-issuable instructions to:
obtain a predictive structure building request including a target prediction metric from a requestor;
determine a predictive structure type requiring a plurality of coefficients based on the target prediction metric;
obtain an incoming stream of data variables associated with one or more real-time events,
each data variable belonging to a data attribute that describes the one or more real-time events;
format the incoming stream of data variables in compliance with a pre-defined data format;
determine an encoder type based on the target prediction metric;
encode one or more data variables into numeric representations via the encoder based on the target prediction metric;
create an additive and reusable basic element table indicative of joint occurrence counts of pairs of data attributes based on the data variables included the encoded one or more data variables;

calculate the plurality of coefficients required by the predictive structure type based on cell values of the basic element table; and establish a predictive structure with the calculated plurality of coefficients and the basic element table; and provide the established predictive structure to the requestor.

62. The apparatus of embodiment 61, wherein the target prediction metric is identified by a user.

63. The apparatus of embodiment 61, wherein the target prediction metric comprises any of a target click-through-rate, a target cost per click, a target cost per action, and a target cost per mile.

64. The apparatus of embodiment 61, wherein the predictive structure building request comprises a request to generate a numeric evaluative value reflecting an estimate of the target prediction metric.

65. The apparatus of embodiment 61, wherein the predictive structure type requiring a plurality of coefficients comprises a linear regression formula.

66. The apparatus of embodiment 65, wherein the linear regression formula employs one or more data attributes as independent regression variables.

67. The apparatus of embodiment 61, wherein the incoming stream of data variables is received in any of the following manner: one-by-one, periodic, continuous, and in a batch.

68. The apparatus of embodiment 61, wherein the encoding comprises mapping textual values of the one or more data variables to numeric values.

69. The apparatus of embodiment 8, wherein the numeric values are obtained based on a data attribute value associated with a real-time event,
said data attribute value indicative of the target prediction metric.

70. The apparatus of embodiment 61, wherein the basic element table is an orthogonal matrix.

71. The apparatus of embodiment 61, wherein each cell of the basic element table is calculated by taking a summation of a first order and a second order power series of two data variables.

72. The apparatus of embodiment 61, wherein the basic element table is updated by calculating new power series of new pairs of data variables and adding the calculated new power series to each cell without re-building the basic element table.

73. The apparatus of embodiment 61, wherein the processor further issues instructions to:
calculate a covariance table based on the basic element table.

74. The apparatus of embodiment 73, wherein the processor further issues instructions to:
calculate a correlation table based on the covariance table.

75. The apparatus of embodiment 73, wherein the processor further issues instructions to:
calculate a frequency table for a Markov Chain model based on the covariance table.

76. The apparatus of embodiment 74, wherein the processor further issues instructions to:
calculate the plurality of coefficients based on the correlation table.

77. The apparatus of embodiment 75, wherein the processor further issues instructions to:
calculate the plurality of coefficients for the Markov Chain model based on the frequency table.

78. The apparatus of embodiment 61, wherein the plurality of coefficients are calculated based on any of the following models:
Bayesian, Linear Discriminant Analysis (LDA), Multiple Linear Regression (MLR), Principal Component Analysis (PCA), Principal Component Regression (PCR), Support Vector Machine (SVM), Markov Chain, Hidden Markov Chain, Support Vector Regression (SVR), Quadratic Discriminant Analysis (QDA), and Regression 79. The apparatus of embodiment 61, wherein the predictive structure type any of the following models:
non-linear regression, linear classification, on-linear classification, robust Bayesian classification, naïve Bayesian classification, Markov chains, hidden Markov models, principal component analysis, principal component regression, partial least squares, and decision tree.

80. The apparatus of embodiment 61, wherein the processor further issues instructions to:
select regression inputs from the incoming stream of data variables.

81. The apparatus of embodiment 80, wherein the processor further issues instructions to:
receive a new real-time event having new data variables with respect to the selected regression inputs.

82. The apparatus of embodiment 81, wherein the processor further issues instructions to:
instantiate the established predictive structure;
feed the new data variables with respect to the selected regression inputs into the established predictive structure; and
obtain a predictive output value from the established predictive structure.

83. The apparatus of embodiment 61, wherein the established predictive structure is searchable in the database by a hierarchy of data attribute labels.

84. The apparatus of embodiment 61, wherein the established predictive structure is named by one or more data attributes.

85. The apparatus of embodiment 61, wherein the processor further issues instructions to:
obtain a request to update the predictive structure with a new data variable;
retrieve the basic element table;
calculate a new joint occurrence count for the new data variable;
add the new joint occurrence count to the basic element table; and
obtain an updated basic element table without re-building the basic element table.

86. The apparatus of embodiment 61, wherein the processor further issues instructions to:
obtain a new data attribute;
retrieve the basic element table;
add a new column and a new row to the basic element table;
calculate new joint occurrence counts between existing data attributes and the new data attribute;
add the new joint occurrence counts to the new column and the new row; and
obtain an updated basic element table without re-building the basic element table.

87. The apparatus of embodiment 61, wherein the processor further issues instructions to:
retrieve a first predictive structure built upon a first basic element table;

retrieve a second predictive structure built upon a second basic element table;
create a new basic element table by adding the first basic element table to the second basic element table; and
calculate new coefficients for a new predictive structure based on the new basic element table.

88. The apparatus of embodiment 61, wherein the processor further issues instructions to:
obtain a request to update the predictive structure to remove a data variable;
retrieve the basic element table;
identify joint occurrence count components having the data variable;
subtract the joint occurrence count components from the basic element table; and
obtain an updated basic element table without re-building the basic element table.

89. The apparatus of embodiment 61, wherein the processor further issues instructions to:
obtain a request to update the predictive structure to remove a data attribute;
retrieve the basic element table;
identify a row and a column of joint occurrence counts having the data attribute;
remove the identified row and column from the basic element table; and
obtain an updated basic element table without re-building the basic element table.

90. The apparatus of embodiment 61, wherein the processor further issues instructions to store the established predictive structure labeled by one or more data attributes in a database.

61. A real-time streaming data predictive structure building apparatus embodiment, comprising:
a processor; and
a memory disposed in communication with the processor and storing processor-issuable instructions to:
obtain a predictive structure building request including a target prediction metric from a requestor;
determine a predictive structure type requiring a plurality of coefficients based on the target prediction metric;
obtain an incoming stream of data variables associated with one or more real-time events,
each data variable belonging to a data attribute that describes the one or more real-time events;
format the incoming stream of data variables in compliance with a pre-defined data format;
determine an encoder type based on the target prediction metric;
encode one or more data variables into numeric representations via the encoder based on the target prediction metric;
create an additive and reusable basic element table indicative of joint occurrence counts of pairs of data attributes based on the data variables included the encoded one or more data variables;
calculate the plurality of coefficients required by the predictive structure type based on cell values of the basic element table; and
establish a predictive structure with the calculated plurality of coefficients and the basic element table; and
provide the established predictive structure to the requestor.

62. The apparatus of embodiment 61, wherein the target prediction metric is identified by a user.

63. The apparatus of embodiment 61, wherein the target prediction metric comprises any of a target click-through-rate, a target cost per click, a target cost per action, and a target cost per mile.

64. The apparatus of embodiment 61, wherein the predictive structure building request comprises a request to generate a numeric evaluative value reflecting an estimate of the target prediction metric.

65. The apparatus of embodiment 61, wherein the predictive structure type requiring a plurality of coefficients comprises a linear regression formula.

66. The apparatus of embodiment 65, wherein the linear regression formula employs one or more data attributes as independent regression variables.

67. The apparatus of embodiment 61, wherein the incoming stream of data variables is received in any of the following manner: one-by-one, periodic, continuous, and in a batch.

68. The apparatus of embodiment 61, wherein the encoding comprises mapping textual values of the one or more data variables to numeric values.

69. The apparatus of embodiment 8, wherein the numeric values are obtained based on a data attribute value associated with a real-time event,
said data attribute value indicative of the target prediction metric.

70. The apparatus of embodiment 61, wherein the basic element table is an orthogonal matrix.

71. The apparatus of embodiment 61, wherein each cell of the basic element table is calculated by taking a summation of a first order and a second order power series of two data variables.

72. The apparatus of embodiment 61, wherein the basic element table is updated by calculating new power series of new pairs of data variables and adding the calculated new power series to each cell without re-building the basic element table.

73. The apparatus of embodiment 61, wherein the processor further issues instructions to:
calculate a covariance table based on the basic element table.

74. The apparatus of embodiment 73, wherein the processor further issues instructions to:
calculate a correlation table based on the covariance table.

75. The apparatus of embodiment 73, wherein the processor further issues instructions to:
calculate a frequency table for a Markov Chain model based on the covariance table.

76. The apparatus of embodiment 74, wherein the processor further issues instructions to:
calculate the plurality of coefficients based on the correlation table.

77. The apparatus of embodiment 75, wherein the processor further issues instructions to:
calculate the plurality of coefficients for the Markov Chain model based on the frequency table.

78. The apparatus of embodiment 61, wherein the plurality of coefficients are calculated based on any of the following models:
Bayesian, Linear Discriminant Analysis (LDA), Multiple Linear Regression (MLR), Principal Component Analysis (PCA), Principal Component Regression (PCR), Support Vector Machine (SVM), Markov Chain, Hidden Markov Chain, Support Vector Regression (SVR), Quadratic Discriminant Analysis (QDA), and Regression 79. The apparatus of embodiment 61, wherein the predictive structure type any of the following models:

non-linear regression, linear classification, on-linear classification, robust Bayesian classification, naïve Bayesian classification, Markov chains, hidden Markov models, principal component analysis, principal component regression, partial least squares, and decision tree.

80. The apparatus of embodiment 61, wherein the processor further issues instructions to:
select regression inputs from the incoming stream of data variables.

81. The apparatus of embodiment 80, wherein the processor further issues instructions to:
receive a new real-time event having new data variables with respect to the selected regression inputs.

82. The apparatus of embodiment 81, wherein the processor further issues instructions to:
instantiate the established predictive structure;
feed the new data variables with respect to the selected regression inputs into the established predictive structure; and
obtain a predictive output value from the established predictive structure.

83. The apparatus of embodiment 61, wherein the established predictive structure is searchable in the database by a hierarchy of data attribute labels.

84. The apparatus of embodiment 61, wherein the established predictive structure is named by one or more data attributes.

85. The apparatus of embodiment 61, wherein the processor further issues instructions to:
obtain a request to update the predictive structure with a new data variable;
retrieve the basic element table;
calculate a new joint occurrence count for the new data variable;
add the new joint occurrence count to the basic element table; and
obtain an updated basic element table without re-building the basic element table.

86. The apparatus of embodiment 61, wherein the processor further issues instructions to:
obtain a new data attribute;
retrieve the basic element table;
add a new column and a new row to the basic element table;
calculate new joint occurrence counts between existing data attributes and the new data attribute;
add the new joint occurrence counts to the new column and the new row; and
obtain an updated basic element table without re-building the basic element table.

87. The apparatus of embodiment 61, wherein the processor further issues instructions to:
retrieve a first predictive structure built upon a first basic element table;
retrieve a second predictive structure built upon a second basic element table;
create a new basic element table by adding the first basic element table to the second basic element table; and
calculate new coefficients for a new predictive structure based on the new basic element table.

88. The apparatus of embodiment 61, wherein the processor further issues instructions to:
obtain a request to update the predictive structure to remove a data variable;
retrieve the basic element table;
identify joint occurrence count components having the data variable;
subtract the joint occurrence count components from the basic element table; and
obtain an updated basic element table without re-building the basic element table.

89. The apparatus of embodiment 61, wherein the processor further issues instructions to:
obtain a request to update the predictive structure to remove a data attribute;
retrieve the basic element table;
identify a row and a column of joint occurrence counts having the data attribute;
remove the identified row and column from the basic element table; and
obtain an updated basic element table without re-building the basic element table.

90. The apparatus of embodiment 61, wherein the processor further issues instructions to store the established predictive structure labeled by one or more data attributes in a database.

91. A real-time streaming data predictive structure building non-transitory storage processor-readable medium embodiment, storing processor-executable instructions executable by a processor to:
obtain a predictive structure building request including a target prediction metric from a requestor;
determine a predictive structure type requiring a plurality of coefficients based on the target prediction metric;
obtain an incoming stream of data variables associated with one or more real-time events,
each data variable belonging to a data attribute that describes the one or more real-time events;
format the incoming stream of data variables in compliance with a pre-defined data format;
determine an encoder type based on the target prediction metric;
encode one or more data variables into numeric representations via the encoder based on the target prediction metric;
create an additive and reusable basic element table indicative of joint occurrence counts of pairs of data attributes based on the data variables included the encoded one or more data variables;
calculate the plurality of coefficients required by the predictive structure type based on cell values of the basic element table; and
establish a predictive structure with the calculated plurality of coefficients and the basic element table; and
provide the established predictive structure to the requestor.

92. The medium of embodiment 91, wherein the target prediction metric is identified by a user.

93. The medium of embodiment 91, wherein the target prediction metric comprises any of a target click-through-rate, a target cost per click, a target cost per action, and a target cost per mile.

94. The medium of embodiment 91, wherein the predictive structure building request comprises a request to generate a numeric evaluative value reflecting an estimate of the target prediction metric.

95. The medium of embodiment 91, wherein the predictive structure type requiring a plurality of coefficients comprises a linear regression formula.

96. The medium of embodiment 95, wherein the linear regression formula employs one or more data attributes as independent regression variables.

97. The medium of embodiment 91, wherein the incoming stream of data variables is received in any of the following manner: one-by-one, periodic, continuous, and in a batch.
98. The medium of embodiment 91, wherein the encoding comprises mapping textual values of the one or more data variables to numeric values.
99. The medium of embodiment 98, wherein the numeric values are obtained based on a data attribute value associated with a real-time event, said data attribute value indicative of the target prediction metric.
100. The medium of embodiment 91, wherein the basic element table is an orthogonal matrix.
101. The medium of embodiment 91, wherein each cell of the basic element table is calculated by taking a summation of a first order and a second order power series of two data variables.
102. The medium of embodiment 91, wherein the basic element table is updated by calculating new power series of new pairs of data variables and adding the calculated new power series to each cell without re-building the basic element table.
103. The medium of embodiment 91, wherein the processor further issues instructions to:
calculate a covariance table based on the basic element table.
104. The medium of embodiment 103, wherein the processor further issues instructions to:
calculate a correlation table based on the covariance table.
105. The medium of embodiment 103, wherein the processor further issues instructions to:
calculate a frequency table for a Markov Chain model based on the covariance table.
106. The medium of embodiment 104, wherein the processor further issues instructions to:
calculate the plurality of coefficients based on the correlation table.
107. The medium of embodiment 105, wherein the processor further issues instructions to:
calculate the plurality of coefficients for the Markov Chain model based on the frequency table.
108. The medium of embodiment 91, wherein the plurality of coefficients are calculated based on any of the following models:
Bayesian, Linear Discriminant Analysis (LDA), Multiple Linear Regression (MLR), Principal Component Analysis (PCA), Principal Component Regression (PCR), Support Vector Machine (SVM), Markov Chain, Hidden Markov Chain, Support Vector Regression (SVR), Quadratic Discriminant Analysis (QDA), and Regression
109. The medium of embodiment 91, wherein the predictive structure type any of the following models:
non-linear regression, linear classification, on-linear classification, robust Bayesian classification, naïve Bayesian classification, Markov chains, hidden Markov models, principal component analysis, principal component regression, partial least squares, and decision tree.
110. The medium of embodiment 91, wherein the processor further issues instructions to:
select regression inputs from the incoming stream of data variables.
111. The medium of embodiment 110, wherein the processor further issues instructions to:
receive a new real-time event having new data variables with respect to the selected regression inputs.
112. The medium of embodiment 111, wherein the processor further issues instructions to:
instantiate the established predictive structure;
feed the new data variables with respect to the selected regression inputs into the established predictive structure; and
obtain a predictive output value from the established predictive structure.
113. The medium of embodiment 91, wherein the established predictive structure is searchable in the database by a hierarchy of data attribute labels.
114. The medium of embodiment 91, wherein the established predictive structure is named by one or more data attributes.
115. The medium of embodiment 91, wherein the processor further issues instructions to:
obtain a request to update the predictive structure with a new data variable;
retrieve the basic element table;
calculate a new joint occurrence count for the new data variable;
add the new joint occurrence count to the basic element table; and
obtain an updated basic element table without re-building the basic element table.
116. The medium of embodiment 91, wherein the processor further issues instructions to:
obtain a new data attribute;
retrieve the basic element table;
add a new column and a new row to the basic element table;
calculate new joint occurrence counts between existing data attributes and the new data attribute;
add the new joint occurrence counts to the new column and the new row; and
obtain an updated basic element table without re-building the basic element table.
117. The medium of embodiment 91, wherein the processor further issues instructions to:
retrieve a first predictive structure built upon a first basic element table;
retrieve a second predictive structure built upon a second basic element table;
create a new basic element table by adding the first basic element table to the second basic element table; and
calculate new coefficients for a new predictive structure based on the new basic element table.
118. The medium of embodiment 91, wherein the processor further issues instructions to:
obtain a request to update the predictive structure to remove a data variable;
retrieve the basic element table;
identify joint occurrence count components having the data variable;
subtract the joint occurrence count components from the basic element table; and
obtain an updated basic element table without re-building the basic element table.
119. The medium of embodiment 91, wherein the processor further issues instructions to:
obtain a request to update the predictive structure to remove a data attribute;
retrieve the basic element table;
identify a row and a column of joint occurrence counts having the data attribute;
remove the identified row and column from the basic element table; and obtain an updated basic element table without re-building the basic element table.

120. The medium of embodiment 91, wherein the processor further issues instructions to store the established predictive structure labeled by one or more data attributes in a database.

In order to address various issues and advance the art, the entirety of this application for DATA LEARNING AND ANALYTICS APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that May execute asynchronously, concurrently, in parallel, simultaneously, synchronously, and/or the like are also contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DLA individual and/or enterprise user, database configuration and/or relational model, data type, data transmission and/or network framework, syntax structure, and/or the like, various embodiments of the DLA may be implemented that allow a great deal of flexibility and customization. For example, aspects of the DLA may be adapted for data network bandwidth management. While various embodiments and discussions of the DLA have been directed to data learning of real-time event updates, however, it is to be understood that the embodiments described herein may be readily configured and/or customized for a wide variety of other applications and/or implementations.

What is claimed is:

1. A real-time streaming data analytical structure building method, including processing processor-executable instructions via at least one processor from a component collection stored in at least one memory, the component collection storage structured with processor-executable instructions comprising:
    obtaining an analytical structure building request including a target analytical metric from a requestor,
        in which the target analytical metric includes any of: ad click through rate (CTR), ad cost per mile (CPM), ad cost per click (CPC), ad cost per action (CPA);
    determining an analytical structure type requiring a plurality of coefficients based on the target analytical metric;
    obtaining an incoming stream of data variables associated with one or more real-time events, each data variable belonging to a data attribute that describes the one or more real-time events;
    formatting the incoming stream of data variable in compliance with a pre-defined data format;
    determining an encoder type based on the target analytical metric;
    encoding at least one data variable into numeric representations by mapping the formatted stream of data variables to the target analytical metric;
    compositing the data variables including the encoded at least one data variable creating an additive and reusable basic element data structure indicative of joint occurrence counts of pairs of data attributes based on the composited data variables;
    calculating the plurality of coefficients required by the analytical structure type based on cell values of the additive and reusable basic element table data structure; and
    establishing an analytical structure with the calculated plurality of coefficients and the additive and reusable basic element table data structure; and
    providing the established analytical data structure to the requestor.

2. The method of claim 1, in which the target analytical metric is identified by a user.

3. The method of claim 1, in which the target analytical metric comprises any of a target click-through-rate, a target cost per click, a target cost per action, and a target cost per mile.

4. The method of claim 1, in which the analytical structure building request comprises a request to generate a numeric evaluative value reflecting an estimate of the target analytical metric.

5. The method of claim 1, in which the analytical structure type requiring a plurality of coefficients comprises a linear regression formula.

6. The method of claim 5, in which the linear regression formula employs one or data attributes as independent regression variables.

7. The method of claim 1, in which the incoming stream of data variables is received in any of the following manner: one-by-one, periodic, continuous, and in a batch.

8. The method of claim 1, in which the encoding comprises mapping textual values of the one or more data variables to numeric values.

9. The method of claim 8, in which the numeric values are obtained based on a data attribute value associated with a real-time event, said data attribute value indicative of the target analytical metric.

10. The method of claim 1, in which the basic element table is an orthogonal matrix.

11. The method of claim 1, in which each cell of the basic element table is calculated by taking a summation of a first order and a second order power series of two data variables.

12. The method of claim 1, in which the basic element table is updated by calculating new power series of new pairs of data variables and adding the calculated new power series to each cell without re-building the basic element table.

13. The method of claim 1, further comprising:
calculating a covariance table based on the basic element table.

14. The method of claim 13, further comprising:
calculating a correlation table based on the covariance table.

15. The method of claim 1, further comprising:
obtaining a request to update the analytical structure with a new data variable;
retrieving the basic element table;
calculating a new joint occurrence count for the new data variable;
adding the new joint occurrence count to the basic element table; and
obtaining an updated basic element table without re-building the basic element table.

16. The method of claim 1, further comprising:
obtaining a new data attribute;
retrieving the basic element table;
adding a new column and a new row to the basic element table;
calculating new joint occurrence counts between existing data attributes and the new data attribute;
adding the new joint occurrence counts to the new column and the new row; and
obtaining an undated basic element table without re-building the basic element table.

17. The method of claim 1, further comprising:
retrieving a first analytical structure built upon a first basic element table;
retrieving a second analytical structure built upon a second basic element table;
creating a new basic element table by adding the first basic element table to the second basic element table; and
calculating new coefficients for a new analytical structure based on the new basic element table.

18. A real-time streaming data analytical structure building system, comprising:
means to store a component collection;
means to process processor-executable instructions from the component collection, the component collection storage structured with processor-executable instructions including:
obtain an analytical structure building request including a target analytical metric from a requestor,
in which the target analytical metric includes any of: ad click through rate (CTR), ad cost per mile (CPM), ad cost per click (CPC), ad cost per action (CPA);
determine an analytical structure type requiring a plurality of coefficients based on the target analytical metric;
obtain an incoming stream of data variables associated with one or more real-time events, each data variable belonging to a data attribute that describes the one or more real-time events;
format the incoming stream of data variables in compliance with a pre-defined data format;
determine an encoder type based on the target analytical metric;
encode at least one data variables into numeric representations by mapping the formatted stream of data variables to the target analytical metric;
composite the data variables including the encoded at least one data variable creating an additive and reusable basic element data structure indicative of joint occurrence counts of pairs of data attributes based on the composited data variables;
calculate the plurality of coefficient required by the analytical structure type based on cell values of the additive and reusable basic element table data structure; and
establish a analytical structure with the calculated plurality of coefficients and the additive and reusable basic element table data structure; and
provide the established analytical data structure to the requestor.

19. A real-time streaming data analytical structure building apparatus, comprising:
at least one memory;
a component collection stored in the at least one memory;
at least one processor disposed in communication with the at least one memory, the at least one processor executing processor-executable instructions from the component collection, the component collection storage structured with processor-executable instructions comprising:
obtain an analytical structure building request including a target analytical metric from a requestor,
in which the target analytical metric includes any of: ad click through rate (CTR), ad cost per mile (CPM), ad cost per click (CPC), ad cost per action (CPA);
determine a analytical structure type requiring a plurality of coefficients based on the target analytical metric;
obtain an incoming stream of data variables associated with one or more real-time events, each data variable belonging to a data attribute that describes the one or more real-time events;
format the incoming stream of data variables in compliance with a pre-defined data format;
determine an encoder type based on the target analytical metric;
encode at least one data variable into numeric representations by mapping the formatted stream of data variables to the target analytical metric;
composite the data variables including the encoded at least one data variable creating an additive and reusable basic element data structure indicative of joint occurrence counts of pairs of data attributes based on the composited data variables;

calculate the plurality of coefficients required by the analytical structure type based on cell values of the additive and reusable basic element table data structure, and establish a analytical structure with the calculated plurality of coefficients and the additive and reusable basic element table data structure; and provide the established analytical structure to the requestor.

20. A real-time streaming data analytical structure building processor-readable, non-transient medium, the medium storing a component collection, the component collection storage structured with processor-executable instructions comprising:

obtain a analytical structure building request including a target analytical metric from a requestor,
  in which the target analytical metric includes any of: ad click through rate (CTR), ad cost per mile (CPM), ad cost per click (CPC), ad cost per action (CPA);

determine a analytical structure type requiring a plurality of coefficients based on the target analytical metric;

obtain an incoming stream of data variables associated with one or more real-time events, each data variable belonging to a data attribute that describes the one or more real-time events;

format the incoming stream of data variables in compliance with a pre-defined data format;

determine an encoder type based on the target analytical metric;

encode at least one data variable into numeric representations by mapping the formatted stream of data variables to the target analytical metric;

composite the data variables including the encoded at least one data variable creating an additive and reusable basic element data structure indicative of joint occurrence counts of pairs of data attributes based on the composited data variables;

calculate the plurality of coefficients required by the analytical structure type based on cell values of the additive and reusable basic element table data structure; and establish a analytical structure with the calculated plurality of coefficients and the additive and reusable basic element table data structure; and provide the established analytical structure to the requestor.

* * * * *